(12) United States Patent
Kurai

(10) Patent No.: US 11,560,715 B2
(45) Date of Patent: Jan. 24, 2023

(54) FIBER-REINFORCED PLASTIC PANEL MATERIAL

(71) Applicant: Nissan Motor Co., Ltd., Kanagawa (JP)

(72) Inventor: Shohei Kurai, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 45 days.

(21) Appl. No.: 17/055,752

(22) PCT Filed: May 17, 2018

(86) PCT No.: PCT/IB2018/000625
§ 371 (c)(1),
(2) Date: Nov. 16, 2020

(87) PCT Pub. No.: WO2019/220160
PCT Pub. Date: Nov. 21, 2019

(65) Prior Publication Data
US 2021/0207374 A1 Jul. 8, 2021

(51) Int. Cl.
*E04C 2/22* (2006.01)
*E04C 2/32* (2006.01)
(Continued)

(52) U.S. Cl.
CPC ............... *E04C 2/22* (2013.01); *B32B 3/02* (2013.01); *B32B 3/30* (2013.01); *B32B 5/12* (2013.01);
(Continued)

(58) Field of Classification Search
CPC ... E04C 2/22; E04C 2/326; B32B 3/02; B32B 3/30; B32B 5/12; B32B 7/03;
(Continued)

(56) References Cited

U.S. PATENT DOCUMENTS

| 6,540,367 | B1 * | 4/2003 | Benson | G02B 5/124 428/156 |
| 2003/0148082 | A1 * | 8/2003 | Bompard | B32B 5/12 428/292.1 |

FOREIGN PATENT DOCUMENTS

JP   3438101 B2   8/2003

OTHER PUBLICATIONS

International Search Report issued in International Application No. PCT/IB2018/000625, dated Sep. 4, 2018 (4 pages).
(Continued)

*Primary Examiner* — David Sample
*Assistant Examiner* — Donald M Flores, Jr.
(74) *Attorney, Agent, or Firm* — Osha Bergman Watanabe & Burton LLP

(57) ABSTRACT

An FRP panel material includes reinforcing fibers oriented in predetermined orientation directions near the surface. In the surface of the panel material, a plurality of either or both of protrusions and depressions having shapes of congruent regular triangular pyramids are provided. The bases of the regular triangular pyramids are arranged on a virtual reference plane along the surface with no gap or overlap so that each vertex of an equilateral triangle constituting each base is shared by six of the bases as vertices thereof. Each of the orientation directions of the reinforcing fibers is parallel to any lateral edge of each regular triangular pyramid as seen in the thickness direction of the panel material.

9 Claims, 32 Drawing Sheets

(51) Int. Cl.
  *B32B 3/02*      (2006.01)
  *B32B 7/03*      (2019.01)
  *B32B 3/30*      (2006.01)
  *B32B 5/12*      (2006.01)

(52) U.S. Cl.
  CPC ............... *B32B 7/03* (2019.01); *E04C 2/326* (2013.01); *B32B 2260/023* (2013.01); *B32B 2305/08* (2013.01); *Y10T 428/24479* (2015.01); *Y10T 428/24661* (2015.01)

(58) Field of Classification Search
  CPC ....... B32B 2260/023; Y10T 428/24479; Y10T 428/24661
  See application file for complete search history.

(56) References Cited

OTHER PUBLICATIONS

Written Opinion issued in International Application No. PCT/IB2018/000625; dated Sep. 4, 2018 (3 pages).

\* cited by examiner

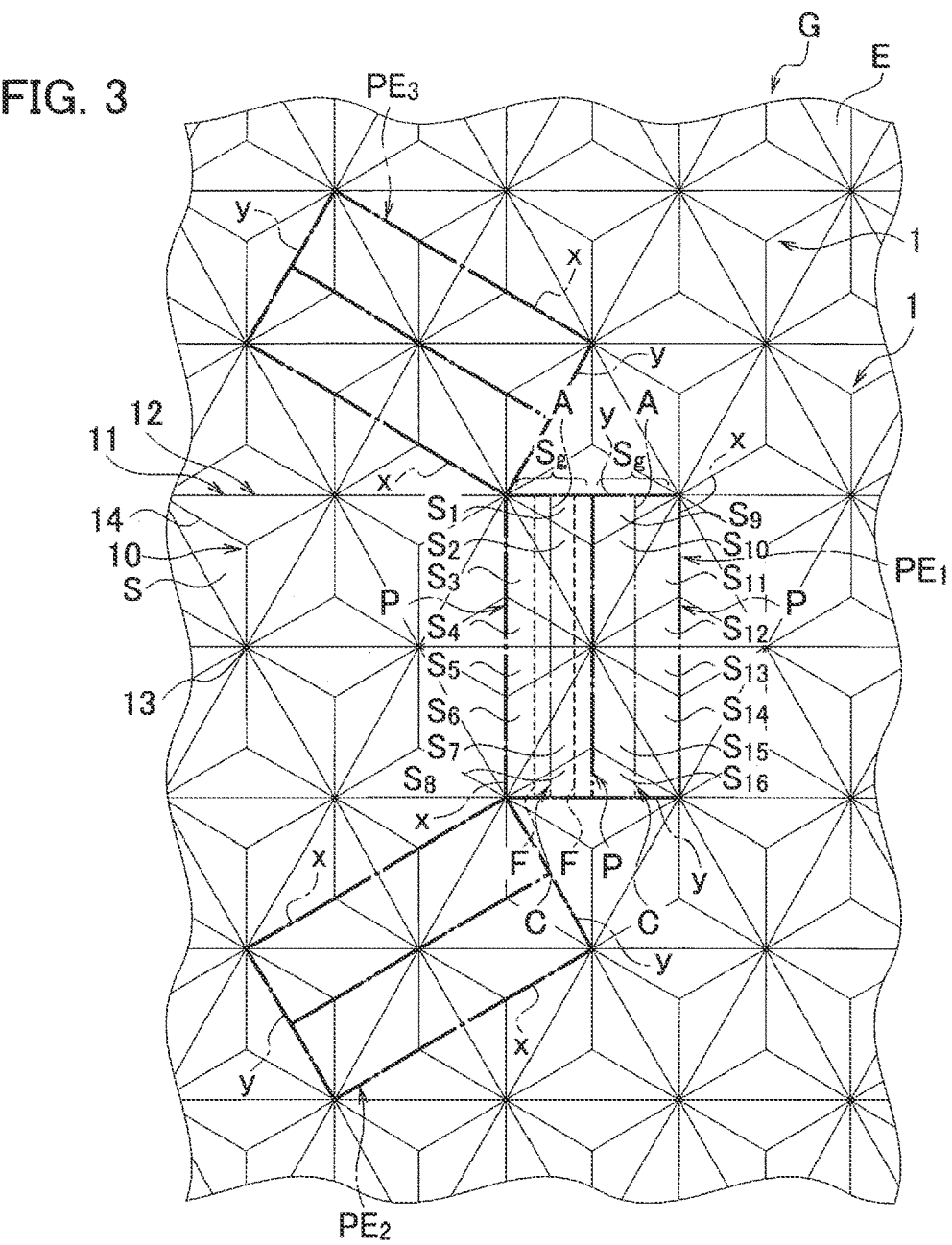
FIG. 3
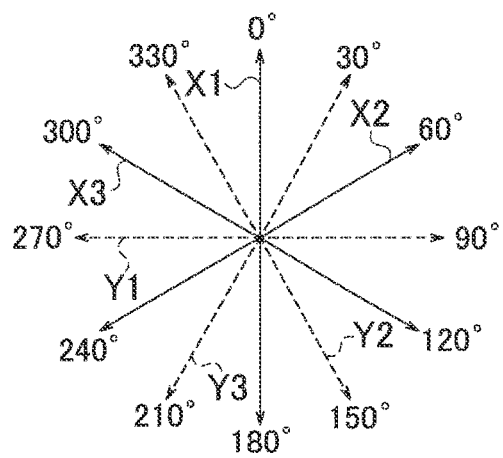

US 11,560,715 B2

FIBER-REINFORCED PLASTIC PANEL MATERIAL

TECHNICAL FIELD

The present invention relates to a panel material made of fiber-reinforced plastic (hereinafter, referred to as an FRP panel material), and more specifically relates to an FRP panel material provided with a plurality of either or both of protrusions and depressions, in the surface by embossing, for example.

BACKGROUND ART

Japanese Patent No. 3438101 discloses an FRP panel as a floor material, with the surface embossed to prevent slippage.

SUMMARY OF INVENTION

Technical Problem

When protrusions are provided in the surface of an FRP panel material including reinforcing fibers oriented in predetermined directions, for example, among reinforcing fibers oriented in the same predetermined direction, some of the fibers passing through tops of the protrusions can be misaligned in the fiber direction, from the other fibers passing through other than the tops. In other words, which part of each protrusion each reinforcing fiber passes through can produce a difference in how far the reinforcing fiber reaches in the oriented direction thereof. The same applies to reinforcing fibers passing through depressions. Providing protrusions or depressions in the surface of the aforementioned panel material, therefore, is likely to form irregularities of positions of the edges of the panel material or wrinkles in the surface.

An object of the present invention is to prevent irregularities of positions of edges of the FRP panel or wrinkles in the surface from forming at the process of providing protrusions or depressions in the surface of the FRP panel.

Solution to Problem

An aspect of the present invention is an FRP panel material including reinforcing fibers oriented in predetermined orientation directions near the surface. In the surface of the panel material, a plurality of either or both of protrusions and depressions having shapes of congruent regular triangular pyramids are provided. The bases of the regular triangular pyramids are arranged on a virtual reference plane along the surface with no gap or overlap so that each vertex of an equilateral triangle constituting each base is shared by six of the bases as vertices thereof. Each of the orientation directions of the reinforcing fibers is parallel to any lateral edge of each regular triangular pyramid as seen in the thickness direction of the panel material.

Advantageous Effects of Invention

According to the aforementioned panel material, it is possible to prevent irregularities of positions of edges of the panel material or wrinkles in the surface from forming at the process of providing protrusions or depressions in the surface.

BRIEF DESCRIPTION OF DRAWINGS

FIG. 3 is a view of main part of a texture pattern according to the first embodiment.

DESCRIPTION OF EMBODIMENTS

The following describes FRP panel materials PM according to some embodiments with reference to the drawings. In the following description, the terms representing directions, including "upper", "lower", "right", and "left" are determined for easy explanation of positional relationships between elements and will not limit attachment orientations of the panel materials PM and the like during usage.

First Embodiment

Figure 1:
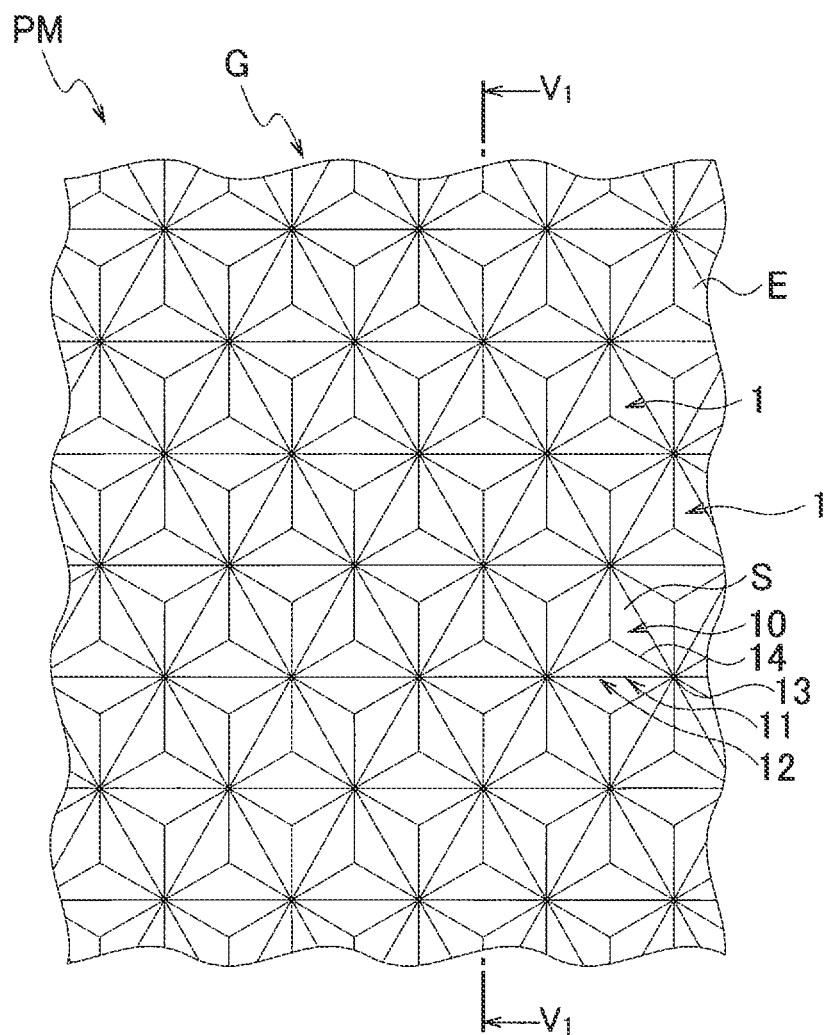
FIG. 1 is a plan view of a panel material according to a first embodiment.
Figure 1:
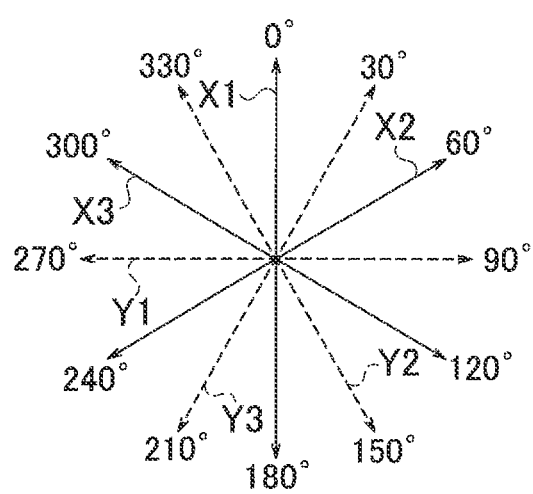
Figure 2:
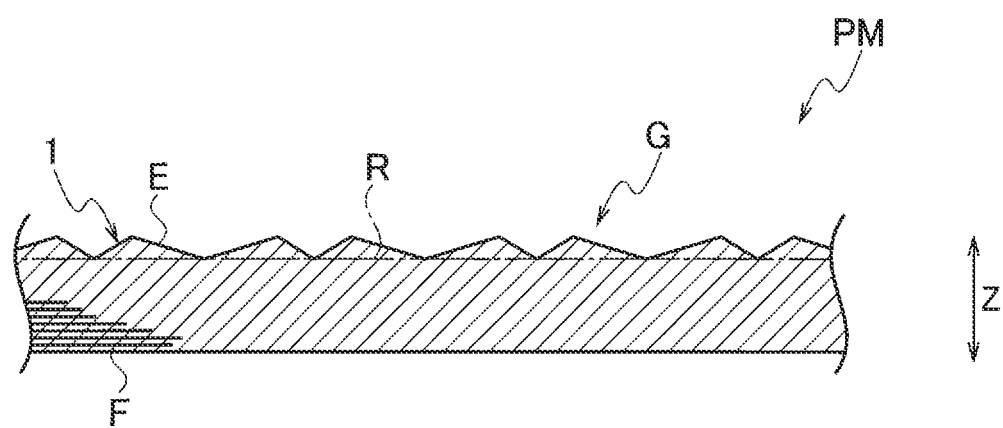
FIG. 2 is a cross-sectional view taken along a line $V_1$-$V_1$ in FIG. 1.

As illustrated in FIGS. 1 to 3, a panel material PM according to the first embodiment is a panel material made of FRP. The panel material PM is a plate-shaped member including reinforcing fibers F and matrix resin. The panel material PM illustrated in the drawings has a plate-like shape, but the shape thereof can be properly selected depending on the intended use thereof. The panel material PM may be curved, for example.

The reinforcing fibers F are continuous fibers that extend in planar directions e panel material PM, or in the perpendicular directions to a thickness direction Z (hereinafter, referred to as a Z direction). Each layer of reinforcing fibers arranged in one direction is placed on top of one another in varied directions to form a layered structure or a woven structure, for example.

In the first embodiment, the reinforcing fibers F are oriented in three predetermined orientation directions as seen in the Z direction. Specifically, the reinforcing fibers F are oriented in the direction 0°-180°, the direction 60°-240°, and the direction 120°-300°. In the following description, the direction 0°-180° is referred to as an X1 direction; the direction 60°-240° is referred to as an X2 direction; and the direction 120°-300° is referred to as an X3 direction. As seen in the Z direction, the direction 90°-270°, which is perpendicular to the X1 direction, is referred to as a Y1 direction; the direction 150°-330°, which is perpendicular to the X2 direction, is referred to as a Y2 direction; and the direction 30°-210°, which is perpendicular to the X3 direction, is referred to as a Y3 direction. These directions perpendicular to the orientation directions are collectively referred to as orientation perpendicular directions.

The reinforcing fibers F may be of various types, and examples thereof are carbon fibers, glass fibers, polyaramid fibers, alumina fibers, silicon carbide fibers, boron fibers, and silicon carbide fibers. The carbon fibers are polyacrylonitrile (PAN)-based carbon fibers, pitch-based carbon fibers, cellulose-based carbon fibers, vapor-grown carbon fibers produced through hydrocarbon, graphitic fibers, for example. The reinforcing fibers F may include a combination of two or more types of those fibers. Some of the reinforcing fibers F may be short fibers.

The matrix resin may be of various types. The matrix resin can be publicly-known thermosetting resin or thermoplastic resin, such as epoxy resin, phenol resin, unsaturated polyester resin, vinyl ester resin, polyimide resin, polycarbonate resin, polyamide resin, and polyphenylene sulfide (PPS) resin, for example.

As illustrated in FIGS. 1 and 2, in a surface E of the panel material PM, a plurality of protrusions 1 that protrude upward with respect to a virtual reference plane R (outward in the Z direction). The plurality of protrusions 1 form a geographically repeating texture pattern G in the surface E. The texture pattern G can be formed through a publicly-known process, such as RTM or press molding, using a mold the molding surface profile of which is the inverse of the texture profile of the texture pattern G. The processing to give the texture pattern G to the surface E is sometimes referred to as embossing or debossing.

At least some of the reinforcing fibers F extend along the surface E near the surface E. The nearest fiber layer to the surface E among the reinforcing fibers F is undulating following the texture profile of the texture pattern G.

The virtual reference plane R is a plane parallel to the surface E of the panel material PM not provided with the texture pattern G. The virtual reference plane R is a plane extending in planar directions along the surface E in the first embodiment. When the panel material PM is curved, the virtual reference plane R is a curved plane bending and extending along the surface E. In the following description, the virtual reference plane R is just referred to as a reference plane R.

As illustrated in FIGS. 1 to 3, the protrusions 1 have shapes of congruent regular triangular pyramids 10 with bases on the reference plane R. The bases 11 of the regular triangular pyramids 10 are arranged on the reference plane R with no overlap or gap so that each vertex 13 of an equilateral triangle 12 that constitutes each base 11 is shared by six of the bases 11 as vertices 13 thereof.

As illustrated in FIGS. 1 and 3, each of the three orientation directions (the X1, X2, and X3 directions) of the reinforcing fibers F is parallel to any lateral edge 14 of each regular triangular pyramid 10 as seen in the Z direction. The lateral edges 14 of each regular triangular pyramid 10 are lines of intersection of lateral faces S of the regular triangular pyramid 10.

The texture pattern G includes patterns each corresponding to the core thereof (hereinafter, referred to as pattern elements $PE_n$ (n is a natural number not less than 1)). The pattern elements $PE_n$ are closely arranged in planar directions with the same orientation. As illustrated in FIG. 3, the texture pattern G of the first embodiment includes pattern elements $PE_1$ closely arranged in the X1 and Y1 directions with the same orientation, patterns elements $PE_2$ closely arranged in the X2 and Y2 directions with the same orientation, or pattern elements $PE_3$ closely arranged in the X3 and Y3 directions with the same orientation.

The orientation and shape of the pattern elements $PE_n$ are selected arbitrarily. In this specification, for convenience of explanation, one of the pattern elements $PE_n$ is selected for each orientation direction of the reinforcing fibers F, and the shape and size thereof are specified as follows.

(A1) Shape of Pattern Element $PE_n$

The pattern elements $PE_n$ are identical in shape across all the embodiments. Each of the pattern elements $PE_n$ has a rectangular shape defined by sides parallel to any orientation direction of the reinforcing fibers F (hereinafter, sides x) and sides parallel to the corresponding orientation perpendicular direction (hereinafter, sides y). The pattern elements $PE_1$ to $PE_3$ of the first embodiment: are also rectangular. In the following description, a direction parallel to the sides x of each pattern element $PE_n$ is sometimes referred to as an x direction, and a direction (the orientation perpendicular direction) parallel to the sides y of each pattern element $PE_n$ is sometimes referred to as a y direction.

(A2) Size of Pattern Element $PE_n$,

The pattern elements $PE_n$ of each embodiment are identical in size. In the patterns $PE_1$ to $PE_3$ of the first embodiment, the length of each side y corresponds to the side length of each equilateral triangle 12, and the length of each side x corresponds to double the height of each equilateral triangle 12.

In this specification, furthermore, for lateral edges of regular pyramids which are included in each pattern element and are parallel to the sides x, planes P including the respective lateral edges of the regular pyramids and extend parallel to the Z direction are defined. Regions separated by the planes P in each pattern element $PE_n$ are referred to as segments Sg. In each segment Sg, the plane equidistant from two planes P that define the same segment Sg is referred to as a center plane C, and the line of intersection of the center plane C and reference plane R is referred to as a central axis A. In plural planar elements (lateral faces of regular pyramids and the like) located within each segment Sg, a pair of planar elements having plane-symmetric shapes with respect to the center plane C or a pair of planar elements having axisymmetric shapes with respect to the central axis A is defined as a symmetrical pair.

In the pattern element $PE_1$ of the first embodiment, for example, three planes P, which are parallel to the Z direction and include lateral edges 14 of the regular triangle pyramids 10 that are parallel to the sides x, are set as illustrated in FIG. 3. The pattern element $PE_1$ is divided into two segments Sg by the planes P.

(A3) Symmetry of Planar Element in Each Segment Sg

As illustrated in FIG. 3, the planar elements of each segment Sg include only symmetrical pairs. In other words, every planar element in each segment Sg constitutes a symmetrical pair with another planar element included in the same segment Sg with no overlap. In the left segment Sg of the pattern element $PE_1$, for example, lateral faces $S_1$ and $S_5$ have plane-symmetric shapes with respect to the center plane C of the segment Sg including the lateral faces $S_1$ and $S_5$ and constitute a symmetrical pair. In a similar manner, lateral faces $S_2$ and $S_6$, lateral faces $S_3$ and $S_7$, and faces $S_4$ and $S_8$ constitute symmetrical pairs. In the right segment Sg of the pattern element $PE_1$, lateral faces $S_9$ and $S_{13}$ have plane-symmetric shapes with respect to the center plane C of the segment Sg including the lateral faces $S_9$ and $S_{13}$ and constitute a symmetrical pair. In a similar manner, lateral faces $S_{10}$ and $S_{14}$, lateral faces $S_{11}$ and $S_5$, and faces $S_{12}$ and $S_{16}$ constitute symmetrical pairs. None of the segment Sg includes any lateral face that does not constitute a symmetrical pair.

Planar elements constituting each symmetrical pair as described above both extend over the entire width in the y direction, of the segment Sg including the same planar elements. In other words, both planar elements of each symmetrical pair individually abut on two planes P that sandwich the same segment Sg. In each segment Sg, every reinforcing fiber F oriented in the x direction always passes through both of the planar elements of each symmetrical pair (irrespective of the position of the reinforcing fiber F in the y direction). Alternatively, the reinforcing fibers F that pass through one of the planar elements constituting a symmetrical pair always pass through the other planar element of the same symmetrical pair.

In the left segment Sg of the pattern element $PE_1$, for example, the lateral faces $S_1$ and $S_5$, that constitute a symmetrical pair, individually extend over the entire width of the same segment Sg in the Y1 direction. In a similar manner, the lateral faces $S_2$ and $S_6$, the lateral faces $S_3$ and $S_7$, and the lateral faces $S_4$ and $S_8$ individually extend over the entire width of the same segment Sg in the Y1 direction. As for the symmetrical pair of the lateral faces $S_1$ and $S_5$, reinforcing fibers F indicated by dashed lines, for example, therefore pass through both of the lateral faces $S_1$ and $S_5$ constituting the same symmetrical pair and, as for the symmetrical pair of the lateral faces $S_2$ and $S_6$, pass through both of the lateral faces $S_2$ and $S_6$ constituting the same symmetrical pair.

Since the planar elements constituting each symmetrical pair have plane-symmetric shapes with respect to the center plane C or axisymmetric shapes with respect to the central axis A, the reinforcing fibers F passing through one symmetrical pair are identical in overall actual length irrespective of the positions thereof in the y direction. The total length of part of each reinforcing fiber F laid in one of the planar elements of each symmetrical pair and part of the reinforcing fiber F laid in the other planar element does not depend on the position of the reinforcing fiber F in the y direction.

In the left segment Sg of the pattern element $PE_1$, for example, the sum of the actual length of part of a reinforcing fiber F to the left of the center plane C (indicated by a dashed line) that is laid in the lateral face $S_1$ and the actual length of part thereof that is laid in the lateral face $S_5$ is the same as the sum of the actual length of part of a reinforcing fiber F to the right of the center plane C (indicated by a dashed line) that is laid in the lateral face $S_1$ and the actual length of part thereof that is laid in the lateral face $S_5$. In a similar manner, the sum of the actual length of part of the reinforcing fiber F to the left of the center plane C (indicated by the dashed line) that is laid in the lateral face $S_2$ and the actual length of part thereof that is laid in the lateral face $S_6$ is the same as the sum of the actual length of part of the reinforcing fiber F to the right of the center plane C (indicated by the dashed line) that is laid in the lateral face $S_2$ and the actual length of part thereof that is laid in the lateral face $S_6$. The positional relationship between the reinforcing fibers F indicated by the dashed lines and the center plane C is not limited to that illustrated in the drawing. Herein, the actual length refers to the actual length of each reinforcing fiber F extending along the surface E near the surface E, which is substantially equal to the length of the line of intersection of the surface E and a plane that includes the reinforcing fiber F of interest and is parallel to the Z direction.

(A4) Uniformity of Actual Length of Reinforcing Fiber F in Each Pattern Element $PE_n$ In each segment Sg, since the planar elements in the segment Sg include only symmetrical pairs (the segment Sg does not include any planar element that does not constitute a symmetrical pair), the overall actual lengths of the reinforcing fibers F laid in the x direction as seen in the Z direction are identical irrespective of the positions thereof in the y direction. Furthermore, the overall actual lengths of the reinforcing fibers F laid in the x direction are identical across the segments Sg adjacent to each other. This is because the surface E is continuous in the y direction across the boundary between the segments Sg adjacent to each other. In other words, in each pattern element $PE_n$, the actual lengths of the reinforcing fibers F which are oriented in the x direction and extend between the sides y are identical irrespective of the positions of the reinforcing fibers F in the y direction throughout the pattern element $PE_n$. In the following description, the reinforcing fibers F that are oriented in the x direction and are laid in the x direction as seen in the Z direction in the pattern elements $PE_n$ or segments Sg are also referred to as reinforcing fibers Fx.

(A5) Uniformity of Apparent Length of Reinforcing Fiber F in Each Pattern Element $PE_n$ Since the pattern elements $PE_n$ are rectangular, in each pattern element $PE_n$, apparent lengths as seen in the Z direction (hereinafter referred to as apparent lengths), of the reinforcing fibers Fx extending between the sides y are identical irrespective of the positions thereof in the y direction. Each apparent length is substantially equal to the length in planar directions, of the line of intersection of the surface E and the plane that includes the reinforcing fiber F and is parallel to the Z direction.

(A6) Uniformity of Apparent Shrinkage Rate for Each Orientation Direction

The reinforcing fibers Fx that extend between the sides y in each pattern element $PE_n$ are therefore identical in ratio of apparent length to actual length irrespective of the positions of the reinforcing fibers Fx in the y direction.

Specifically, in the pattern element $PE_1$, the apparent length to actual length ratios of the reinforcing fibers F oriented in the X1 direction are identical irrespective of the positions thereof in the Y1 direction. In the entire texture pattern G, therefore, the apparent length to actual length ratios of the reinforcing fibers F oriented in the X1 direction (hereinafter, also referred to as apparent shrinkage rates of the reinforcing fibers F in the X1 direction at the process of forming the texture pattern G in the surface E) are identical irrespective of the positions thereof in the Y1 direction. This means that the apparent shrinkage rates of the reinforcing fibers F in the X1 direction are identical irrespective of which sections of each protrusion 1 the reinforcing fibers F oriented in the X1 direction pass through.

In the pattern element $PE_2$, the apparent length to actual length ratios of the reinforcing fibers F oriented in the X2 direction are identical irrespective of the positions thereof in the Y2 direction. In the entire texture pattern G, therefore, the apparent length to actual length ratios of the reinforcing fibers F oriented in the X2 direction (hereinafter, also referred to as apparent shrinkage rates of the reinforcing fibers F in the X2 direction at the process of forming the texture pattern G in the surface E) are identical irrespective of the positions thereof in the Y2 direction. This means that the apparent shrinkage rates of the reinforcing fibers F in the X2 direction are identical irrespective of which sections of each protrusion 1 the reinforcing fibers F oriented in the X2 direction pass through.

In the pattern element $PE_3$, the apparent length to actual length ratios of the reinforcing fibers F oriented in the X3 direction are identical irrespective of the positions thereof in the Y3 direction. In the entire texture pattern G, therefore, the apparent length to actual length ratios of the reinforcing fibers F oriented in the X3 direction (hereinafter, also referred to as apparent shrinkage rates of the reinforcing fibers F in the X3 direction at the process of forming the texture pattern G in the surface E) are identical irrespective of the positions thereof in the Y3 direction. This means that the apparent shrinkage rates of the reinforcing fibers F in the X3 direction are identical irrespective of which sections of each protrusion 1 the reinforcing fibers F oriented in the X3 direction pass through.

(A7) Commonality of Actual Length of Reinforcing Fiber F Across Pattern Elements $PE_n$ Next, the actual lengths of the reinforcing fibers F oriented in each orientation direction are compared against those of the reinforcing fibers F oriented in the other orientation directions, or the actual lengths of the reinforcing fibers Fx in each patter element $PE_n$ are compared against those in the other pattern elements $PE_n$. For example, the actual length of each reinforcing fiber Fx in the pattern element $PE_1$ is the sum of two lateral edges 14 of the regular triangular pyramids 10 and the heights of two lateral faces S of the regular triangular pyramids 10 as calculated from the length of part of the line of intersection of the surface E and the plane P corresponding to one side x in the pattern element $PE_1$. The same applies to the actual lengths of the reinforcing fibers Fx in the pattern element $PE_2$ and the actual lengths of the reinforcing fibers Fx in the pattern element $PE_3$. The actual lengths of the reinforcing fibers Fx are thus identical across the pattern elements $PE_n$.

(A8) Commonality of Apparent Length of Reinforcing Fiber F Across Pattern Element $PE_n$ Since the pattern elements $PE_1$, $PE_2$, and $PE_3$ are identical in shape and size as described above, the apparent lengths of the reinforcing fibers Fx are identical across the pattern elements $PE_n$ (A9) Isotropy of Apparent Shrinkage Rate of Reinforcing Fiber F The apparent length to actual length ratios of the reinforcing fibers F are therefore identical across the reinforcing fibers F oriented in the different directions. The apparent shrinkage rates of the reinforcing fibers F in planar directions at the process of forming the texture pattern G in the surface B are thus isotropic.

In the first embodiment, in the surface E of the panel material PM including the reinforcing fibers F oriented in the predetermined three orientation directions, the plurality of protrusions 1, which protrude upward with respect to the reference plane R along the surface E, are provided. The protrusions 1 have the shapes of the congruent regular triangular pyramids 10 with the bases 11 on the reference plane R. The bases 11 of the regular triangular pyramids 10 are arranged on the reference plane R with no overlap or gap so that each vertex 13 of the equilateral triangle 12 constituting each base 11 is shared by six of the bases 11 as the vertices 13 thereof. Each of the three orientation directions of the reinforcing fibers F is parallel to any lateral edge 14 of each regular triangular pyramid 10 as seen in the Z direction.

According to this configuration, as described above, the apparent length to actual length ratios of the reinforcing fibers are identical irrespective of which sections of each protrusion 1 the reinforcing fibers F pass through. This prevents irregularities of positions of the edges of the panel material PM and wrinkles in the surface E from forming at the process of forming the protrusions 1 in the surface E of the panel material PM including the reinforcing fibers F.

According to the aforementioned configuration, furthermore, the apparent length to actual length ratios of the reinforcing fibers F are identical across the reinforcing fibers F oriented in the three orientation directions. The apparent shrinkage rates of the reinforcing fibers F in the process of forming the texture pattern U, which includes the plural protrusions 1, in the surface E are therefore isotropic. This ensures to prevent wrinkles from forming in the surface E.

<Modification>

Figure 4:
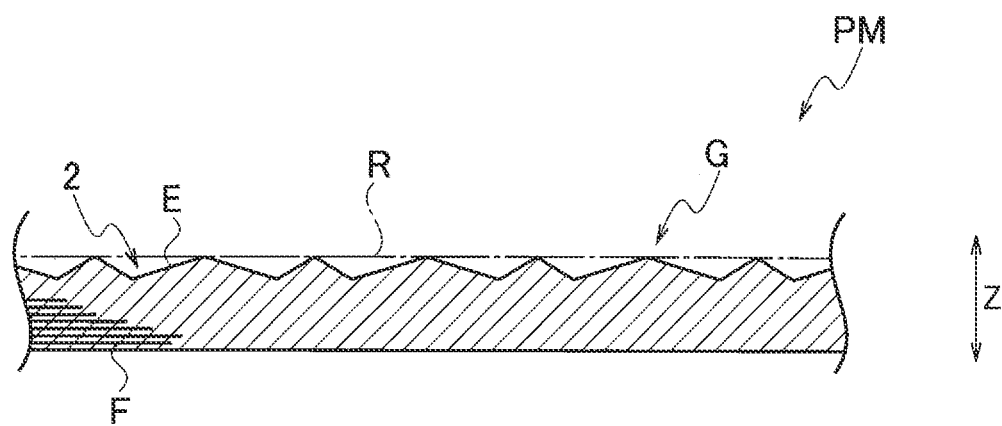
FIG. 4 is a cross-sectional view of a first modification of the first embodiment, corresponding to FIG. 2.
Figure 5:
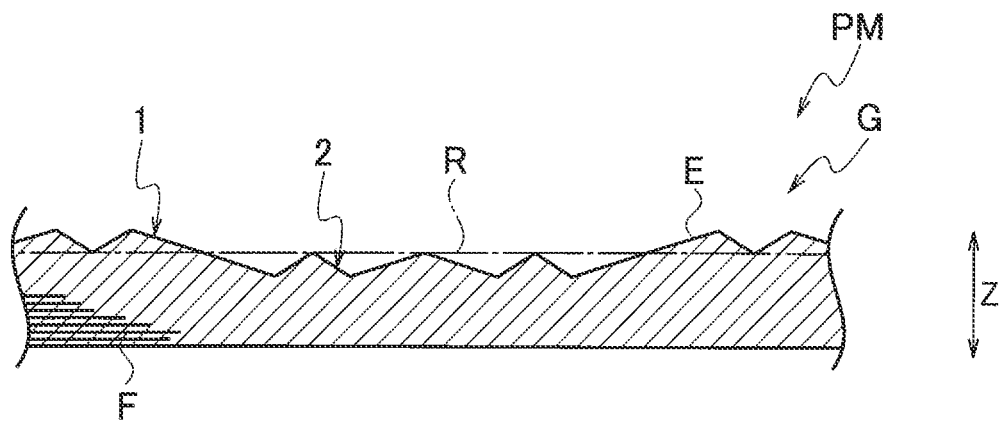
FIG. 5 is a cross-sectional view of a second modification of the first embodiment, corresponding to FIG. 2.

In the first embodiment, the plurality of protrusions 1, which protrude upward with respect to the reference plane R, are provided in the surface E. The panel material PM may be provided with a plurality of depressions 2, which are depressed downward with respect to the reference plane R (that is, inward in the Z direction) as illustrated in FIG. 4. This modification is referred to as a first modification. Alternatively, the panel material PM may be provided with both of the protrusions 1 and depressions 2 as illustrated in FIG. 5. This modification is referred to as a second modification.

The plural depressions 2 according to the first modification have the shapes of the congruent regular triangular pyramids 10 with the bases 11 on the reference plane R. The plural protrusions 1 and depressions 2 according to the second modification have the shapes of the congruent regular triangular pyramids 10 with the bases 11 on the reference plane R. The bases 11 of the regular triangular pyramids 10 are arranged on the reference plane R with no gap or overlap so that each vertex 13 of the equilateral triangle 12 constituting each base 11 is shared by six of the bases 11 as vertices 13 thereof. Each of the three orientation directions of the reinforcing fibers F is parallel to any lateral edge 14 of each regular triangular pyramid 10 as seen in the Z direction. The regular triangular pyramid 10 of each depression 2 and the regular triangular pyramid 10 of each protrusion 1 have plane-symmetric shapes with respect to the reference plane R.

In the second modification, the positional relationship (the order of arrangement) between the protrusions 1 and depressions 2 is not limited. Irrespective of in which order the protrusions 1 and depressions 2 are arranged, the planar elements of each segment Sg include only symmetrical pairs, so that the symmetry of the planar elements in each segment Sg (see (A3) above) is maintained.

In the pattern element $PE_1$ illustrated in FIG. 3, for example, it is assumed that the regular triangular pyramid 10 including the lateral faces $S_1$, $S_2$, $S_9$, and $S_{10}$ is one of the depressions 2. In the left segment Sg of the pattern element $PE_1$, the lateral faces $S_1$ and $S_5$ have axisymmetric shapes with respect to the central axis A of the segment Sg including the lateral faces $S_1$ and $S_5$ and constitute a symmetrical pair. In a similar manner, the lateral faces $S_2$ and $S_6$ constitute a symmetrical pair that is axisymmetric with respect to the central axis A. In the right segment Sg of the pattern element $PE_1$, the lateral faces $S_9$ and $S_{13}$ have axisymmetric shapes with respect to the central axis A of the segment Sg including the lateral faces $S_9$ and $S_{13}$ and constitute a symmetrical pair. In a similar manner, the lateral faces $S_{10}$ and $S_{14}$ constitute a symmetrical pair that is axisymmetric with respect to the central axis A. In such a manner, the planar elements of each segment Sg include only symmetrical pairs irrespective of which protrusions 1 in the first embodiment are replaced with the depressions 2.

The uniformity of the actual lengths of the reinforcing fibers F in each pattern element $PE_n$ (see (A4) above) is therefore maintained irrespective of the order of arrangement of the protrusions 1 and depressions 2. The other configurations (see (A1), (A2), and (A5) to (A9) above) are the same as those of the first embodiment. The second modification therefore provides the same effects as the first embodiment.

As for the first modification, the description of the first embodiment is incorporated in the description of the first modification by replacing the protrusions 1 with the depressions 2. The first modification thus provides the same effects as the first embodiment.

Second Embodiment

A panel material PM according to a second embodiment is described with reference to FIGS. 6 and 7. In the second embodiment, different configurations from the first embodiment are described, and the configurations including the same functions as those of the configurations already described are given the same reference numerals and are not described. In the embodiments described below, including the second embodiment, the planes P, center planes C, and central axes A are defined for each pattern element $PE_n$ and each segment Sg in a similar manner to the first embodiment and the first and second modifications thereof but are not illustrated in the drawings in order to avoid complicated illustrations.

Figure 6:
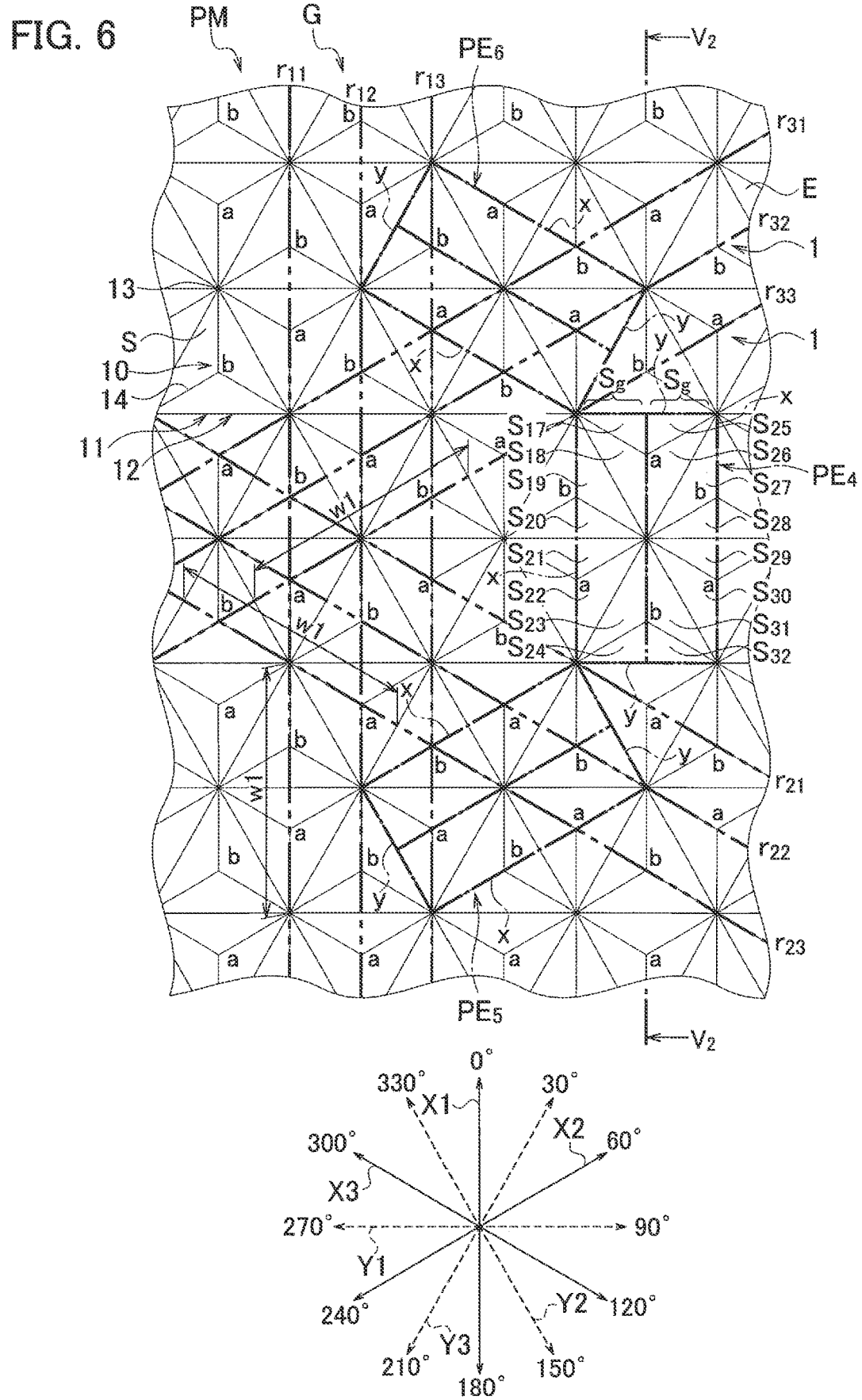
FIG. 6 is a view of main part of a texture pattern according to a second embodiment.
Figure 7:
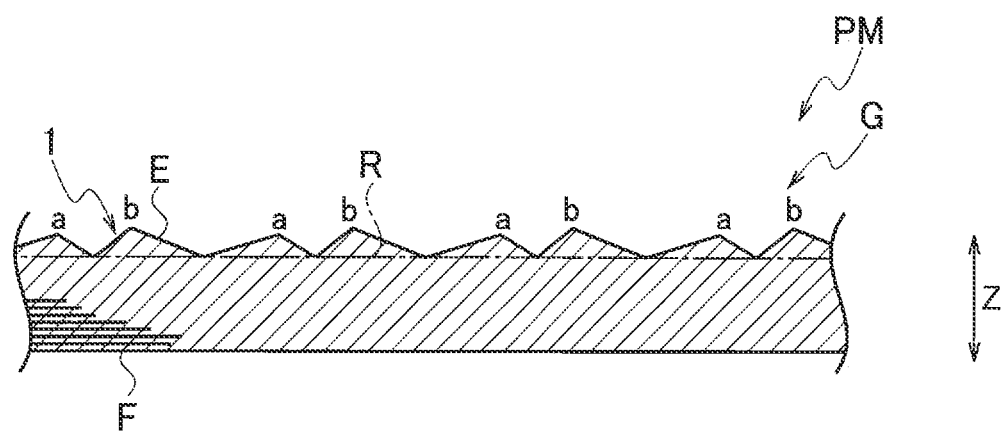
FIG. 7 is a cross-sectional view taken along a line $V_2$-$V_2$ in FIG. 6.

In the second embodiment, a plurality of protrusions 1 constituting the texture pattern G have shapes of regular triangular pyramids 10 with bases 11 on the reference plane R as illustrated in FIGS. 6 and 7. The bases 11 of the regular triangular pyramids 10 are plural congruent equilateral triangles 12 that are arranged on the reference plane R with no gap or overlap so that each vertex 13 is shared by six of the equilateral triangles 12 as vertices 13 thereof. The regular triangular pyramids 10 are not identical in height.

In the second embodiment, ratios $L_2/L_1$, which are defined for respective lines (i is a natural number not less than 1 and not greater than 3; and j is an integer) including medians of the corresponding equilateral triangles 12, are identical across the lines n. Herein, $L_1$ is the length of each section w1 corresponding to the core in the X1, X2, or X3 direction in the texture pattern G, on the line of intersection of the surface F and a plane that includes the corresponding line $r_{ij}$ and is parallel to the Z direction. $L_1$ is substantially equal to the actual length of a reinforcing fiber F extending along the section w1 near the surface E in the section w1. $L_2$ is the apparent length of the section w1 as seen in the Z direction, which is equal to the length of each side x of each pattern element $PE_n$. $L_2$ is also substantially equal to the apparent length of a reinforcing fiber F extending along the section w1 near the surface E in the section w1. The i values of the lines $r_{ij}$ correspond to the respective orientation directions. The lines $r_{ij}$ with the same i value are parallel to each other. Specifically, the lines $r_{ij}$ include lines $r_{11}$ to $r_{13}$, $r_{21}$ to $r_{23}$, and $r_{31}$ to $r_{33}$ illustrated in FIG. 6. The lines $r_{ij}$ with j values of not greater than 0 and not less than 4 are not illustrated.

FIGS. 6 and 7 illustrate an example in which the ratios $L_2/L_1$ are identical across the lines In these drawings, the regular triangular pyramids 10 given a same alphabetic character are identical in height (or distance from the apex of each regular triangular pyramid 10 to the base 11 on the reference plane R in the Z direction). The relationship in height between the regular triangular pyramids 10 given a reference symbol a and the regular triangular pyramids 10 given a reference symbol b is not limited and can be set arbitrarily.

(B1) Shape of Pattern Element $PE_n$

Each of pattern elements $PE_4$ to $PE_6$ of the second embodiment has a rectangular shape defined by sides x parallel to any orientation direction of the reinforcing fibers F and sides y parallel to the corresponding orientation perpendicular direction in a similar manner to the pattern elements $PE_1$ to $PE_3$ of the first embodiment.

(B2) Size of Pattern Element $PE_n$,

The patterns $PE_4$ to $PE_6$ are identical in size across the three orientation directions (X1, X2, and X3 directions). As illustrated in FIG. 6, the length of each side y corresponds to the side length of each equilateral triangle 12 while the length of each side x corresponds to double the height of each equilateral triangle 12.

(B3) Symmetry of Planar Element in Each Segment Sg

As illustrated in FIG. 6, the planar elements of each segment Sg include only symmetrical pairs also in the second embodiment. In the left segment Sg of the pattern element $PE_4$, for example, lateral faces $S_{17}$ and $S_{21}$ have plane-symmetric shapes and constitute a symmetrical pair. In a similar manner, lateral faces $S_{18}$ and $S_{22}$, lateral faces $S_{19}$ and $S_{23}$, and faces $S_{20}$ and $S_{24}$ constitute symmetrical pairs. In the right segment Sg of the pattern element $PE_4$, lateral faces $S_{25}$ and $S_{29}$ have plane-symmetric shapes and constitute a symmetrical pair. In a similar manner, lateral faces $S_{26}$ and $S_{30}$, lateral faces $S_{27}$ and $S_{31}$, and faces $S_{28}$ and $S_{32}$ constitute symmetrical pairs.

(B4) Uniformity of Apparent Shrinkage Rate in Each Segment Sg

In each segment Sg, the overall actual lengths of the reinforcing fibers Fx are identical irrespective of the positions thereof in the y direction. Furthermore, the pattern elements $PE_n$ are rectangular, and the segments Sg are also rectangular. In each segment Sg, therefore, the apparent lengths of the reinforcing fibers Fx extending between the sides y are identical irrespective of the positions thereof in the y direction. In each segment Sg, the reinforcing fibers Fx that extend between the sides y are identical in ratio of apparent length to actual length irrespective of the positions of the reinforcing fibers Ex in the y direction.

(B5) Uniformity of Apparent Shrinkage Rate in Each Pattern Element $PE_n$

Since the ratios $L_2/L_1$ are identical across the lines the apparent length to actual length ratios of the reinforcing fibers Fx that extend between the sides y are identical on the boundaries between the segments Sg. In each pattern element $PE_n$, the apparent length to actual length ratios of the reinforcing fibers Fx that extend between the sides y are identical irrespective of the positions of the reinforcing fibers Fx in the y direction throughout the pattern element $PE_n$.

(B6) Uniformity of Apparent Shrinkage Rate for Each Orientation Direction

In the entire texture pattern G, therefore, the apparent shrinkage rates of the reinforcing fibers Fx in the X1 direction are identical irrespective of the positions of the reinforcing fibers Fx in the Y1 direction, the apparent shrinkage rates in the X2 direction irrespective of the positions in the Y2 direction, and the apparent shrinkage rates in the X3 direction are identical irrespective of the positions in the Y3 direction. This means that the apparent shrinkage rates of the reinforcing fibers F in each orientation direction are identical irrespective of which sections of each protrusion 1 the reinforcing fibers pass through.

(B7) Isotropy of Apparent Shrinkage Rate of Reinforcing Fibers F

Since the ratios $L_2/L_1$ are identical across the lines $r_{1j}$, $r_{2j}$, and $r_{3j}$ (j is an integer), the apparent length to actual length ratios of the reinforcing fibers F are identical across the reinforcing fibers F oriented in the different directions. The apparent shrinkage rates of the reinforcing fibers F in planar directions at the process of forming the texture pattern G in the surface E are therefore isotropic.

In the second embodiment, in the surface E of the panel material PM including the reinforcing fibers F oriented in the predetermined three orientation directions, the plurality of protrusions 1, which protrude upward with respect to the reference plane R along the surface E, are provided. The protrusions 1 have the shapes of the regular triangular pyramids 10 with the bases 11 on the reference plane R. The bases 11 of the regular triangular pyramids 10 are the plural congruent equilateral triangles 12 that are arranged on the reference plane R with no gap or overlap so that each vertex 13 is shared by six of the equilateral triangles 12 as vertices 13 thereof. Each of the three orientation directions of the reinforcing fibers F is parallel to any lateral edge 14 of each regular triangular pyramid 10 as seen in the Z direction. Furthermore, the ratios $L_2/L_1$ defined for the respective lines $r_{ij}$ including medians of the equilateral triangles 12 are identical across the lines $r_{ij}$.

According to this configuration, as described above, the apparent length to actual length ratios of the reinforcing fibers F are identical irrespective of which sections of each protrusion 1 the reinforcing fibers F pass through. This prevents irregularities of positions of the edges of the panel material PM and wrinkles in the surface E from forming at the process of forming the protrusions 1 in the surface E of the panel material PM including the reinforcing fibers F.

According to the aforementioned configuration, furthermore, the apparent length to actual length ratios of the reinforcing fibers F are identical across the reinforcing fibers F oriented in the three orientation directions. The apparent shrinkage rates of the reinforcing fibers F at the process of forming the texture pattern G, which includes the plural protrusions 1, in the surface E are therefore isotropic. This ensures to prevent wrinkles in the surface E from forming.

<Modification>

Figure 8:
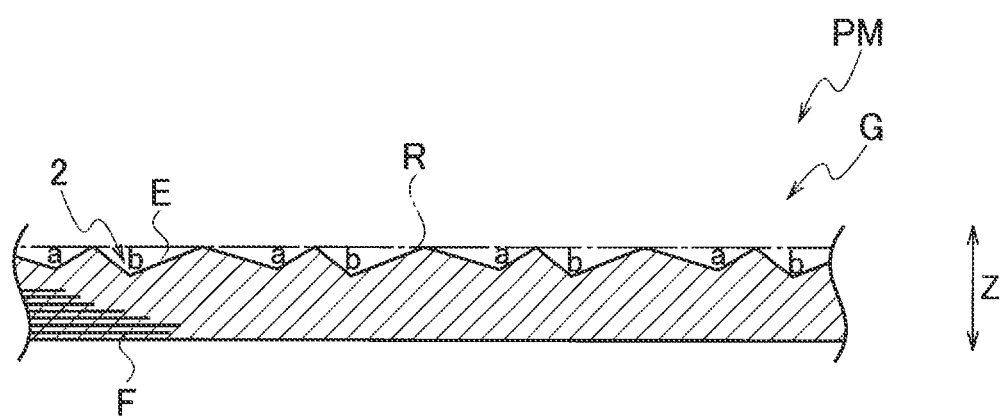
FIG. 8 is a cross-sectional view of a first modification of the second embodiment, corresponding to FIG. 7.
Figure 9:
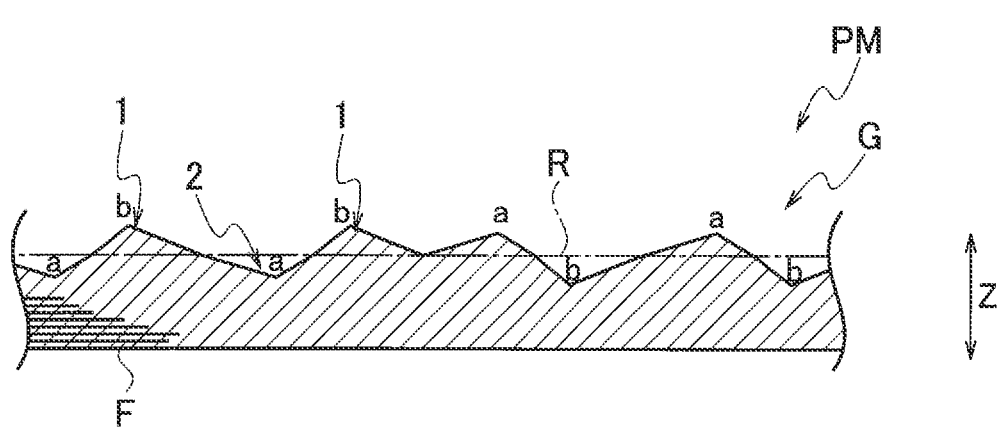
FIG. 9 is a cross-sectional view of a second modification of the second embodiment, corresponding to FIG. 7.

In the second embodiment, the plurality of protrusions 1, which protrude upward with respect to the reference plane R, are provided in the surface E. The panel material PM may be provided with a plurality of depressions 2, which are depressed downward with respect to the reference plane R as illustrated in FIG. 8. This modification is referred to as a first modification. Alternatively, the panel material PM may be provided with both of the protrusions 1 and depressions 2 as illustrated in FIG. 9. This modification is referred to as a second modification.

The plural depressions 2 according to the first Modification have the shapes of the congruent regular triangular pyramids 10 with the bases 11 on the reference plane R. The plural protrusions 1 and depressions 2 according to the second modification have the shapes of the congruent regular triangular pyramids 10 with the bases 11 on the reference plane R. The bases 11 of the regular triangular pyramids 10 are the plural congruent equilateral triangles 12, which are arranged on the reference plane R with no gap or overlap so that each vertex 13 is shared by six of the equilateral triangles 12 as the vertices 13 thereof. Each of the three orientation directions of the reinforcing fibers F is parallel to any lateral edge 14 of each regular triangular pyramid 10 as seen in the Z direction. The ratios $L_2/L_1$, which are defined for the respective lines $r_{ij}$ including medians of the equilateral triangles 12, are identical across the lines $r_{ij}$. The regular triangular pyramid 10 of each depression 2 and the regular triangular pyramid 10 of each protrusion 1 have plane-symmetric shapes with respect to the reference plane R.

In the second modification, the positional relationship (the order of arrangement) between the protrusions 1 and depressions 2 is not limited. Irrespective of in which order the protrusions 1 and depressions 2 are arranged, the planar elements of each segment Sg include only symmetrical pairs, so that the symmetry of the planar elements in each segment Sg (see (B3) above) is maintained.

In the pattern element $PE_4$ illustrated in FIG. 6, for example, it is assumed that the regular triangular pyramid 10 including the lateral faces $S_{17}$, $S_{18}$, $S_{25}$, and $S_{26}$ is one of the depressions 2. In the left segment Sg of the pattern element $PE_4$, the lateral faces $S_{17}$ and $S_{21}$ have axisymmetric shapes with respect to the central axis A of the segment Sg including the lateral faces $S_{17}$ and $S_{21}$ and constitute a symmetrical pair. In a similar manner, the lateral faces $S_{18}$ and $S_{22}$ constitute a symmetrical pair that is axisymmetric with respect to the central axis A. In the right segment Sg of the pattern element $PE_4$, the lateral faces $S_{24}$ and $S_{29}$ have axisymmetric shapes with respect to the central axis A of the segment Sg including the lateral faces $S_{25}$ and $S_{29}$ and constitute a symmetrical pair. In a similar manner, the lateral faces $S_{26}$ and $S_{30}$ constitute a symmetrical pair that is axisymmetric with respect to the central axis A. In such a manner, the planar elements of each segment Sg include only symmetrical pairs irrespective of which protrusions 1 in the second embodiment are replaced with the depressions 2.

The uniformity of the apparent shrinkage rates in each segment Sg (see (B4) above) is maintained irrespective of the order of arrangement of the protrusions 1 and depressions 2. The other configurations (see (B1), (B2), and (B5) to (B7) above) are the same as those of the second embodiment. The second modification therefore provides the same effects as the second embodiment.

As for the first modification, the description of the second embodiment is incorporated in the description of the first modification by replacing the protrusions 1 with the depressions 2. The first modification thus provides the same effects as the second embodiment.

Third Embodiment

A panel material PM according to a third embodiment is described with reference to FIGS. 10 to 12. In the third embodiment, different configurations from the second embodiment are described, and the configurations including the same functions as those of the configurations already described are given the same reference numerals and are not described.

In the third embodiment, in a similar manner to the second embodiment, ratios $L_2/L_1$, which are defined for respective lines $r_{ij}$ (i is a natural number not less than 1 and not greater than 3; and j is an integer) including medians of the equilateral triangles 12, are identical across the lines $r_{ij}$. Herein, $L_1$ is the length of each section w2 corresponding to the core in the X1, X2, or X3 direction in the texture pattern G, on the line of intersection of the surface E and a plane that includes the corresponding line and is parallel to the Z direction. $L_1$ is substantially equal to the actual length of a reinforcing fiber F extending along the section w2 near the surface E in the section w2. $L_2$ is the apparent length of the section w2 as seen in the Z direction, which is equal to the length of one side x of each pattern element $PE_n$. $L_2$ is also substantially equal to the apparent length of the reinforcing fiber F extending along the section w2 near the surface E in the section W2. The regular triangular pyramids 10 of the third embodiment include three types of regular triangular pyramids 10 different in height, unlike the second embodiment.

Figure 10:
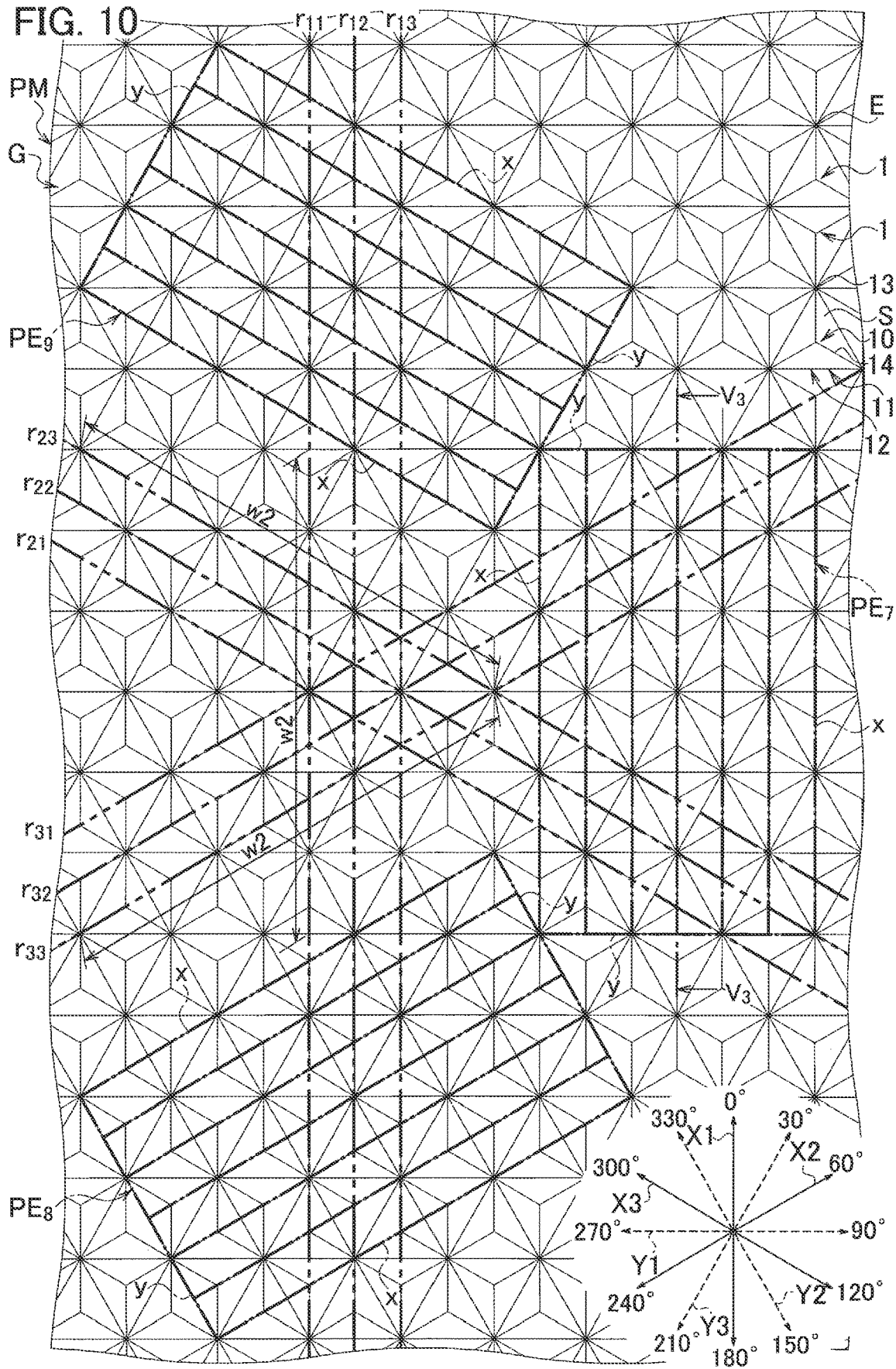
FIG. 10 is a view of main part of a texture pattern according to a third embodiment.
Figure 11:
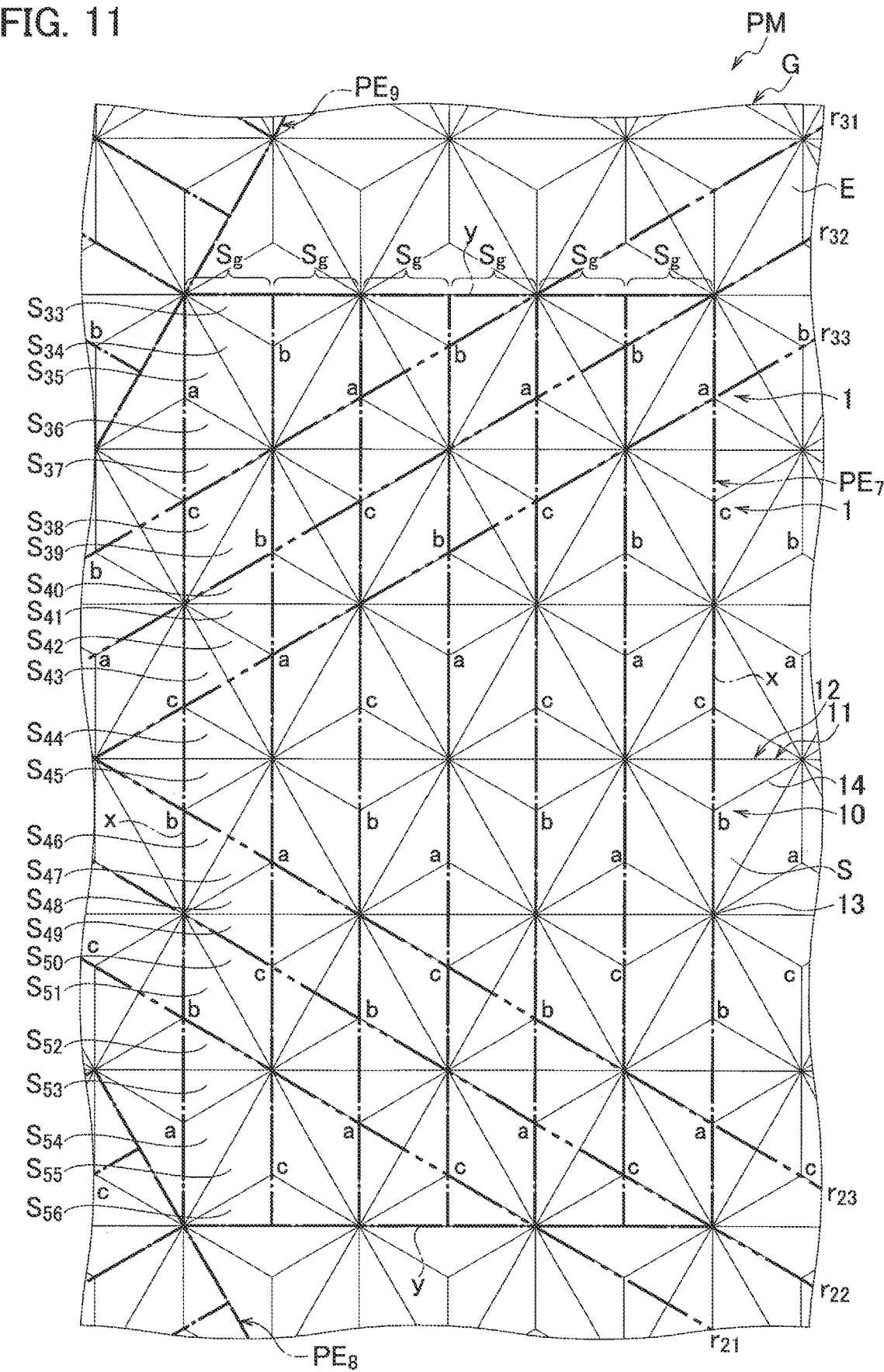
FIG. 11 is an enlarged view of main part of the texture pattern in FIG. 10.
Figure 12:
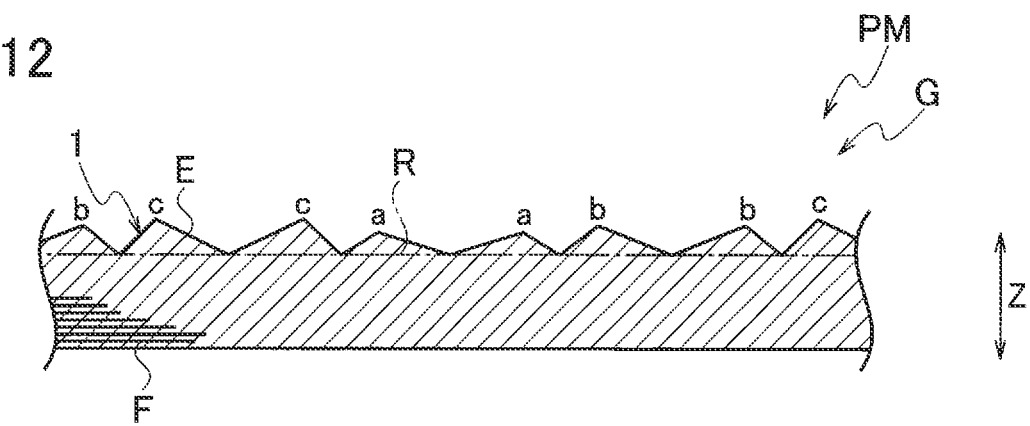
FIG. 12 is a cross-sectional view taken along a line $V_3$-$V_3$ in FIG. 10.

FIGS. 10 to 12 illustrate an example in which the ratios $L_2/L_1$ are identical across the lines $r_{ij}$. In these drawings, the regular triangular pyramids 10 given the same alphabetic character are identical in height (or distance from the apex of each regular triangular pyramid 10 to the base 11 on the reference plane R in the Z direction). The relationship in height between the regular triangular pyramids 10 given a reference symbol a, the regular triangular pyramids 10 given a reference symbol b, and the regular triangular pyramids 10 given a reference symbol c is not limited and can be set arbitrarily.

(B1) Shape of Pattern Element $PE_n$

Each of pattern elements $PE_7$ to $PE_9$ of the third embodiment has a rectangular shape defined by sides x parallel to any orientation direction of the reinforcing fibers F and sides y parallel to the corresponding orientation perpendicular direction, in a similar manner to the pattern elements $PE_4$ to $PE_6$ of the second embodiment.

(B2) Size of Pattern Element $PE_n$.

The pattern elements $PE_7$ to $PE_9$ are identical in size across the three orientation directions (X1, X2, and X3 directions). As illustrated in FIGS. 10 and 11, the length of each side y corresponds to three times the side length of each equilateral triangle 12, and the length of each side x, corresponds to six times the height of each equilateral triangle 12.

(B3) Symmetry of Planar Element in Each Segment Sg

As illustrated in FIG. 11, the planar elements of each segment Sg include only symmetrical pairs also in the third embodiment. In the leftmost segment Sg of the pattern element $PE_7$, for example, lateral faces $S_k$ and $S_{k\pm12}$ (k is a natural number not less than 33 and not more than 44) have plane-symmetric shapes and individually constitute symmetrical pairs.

The configurations relating to the uniformity of the apparent shrinkage rates in each segment Sg, the uniformity of the apparent shrinkage rates in each pattern element $PE_n$, the uniformity of the apparent shrinkage rates for each orientation direction, and the isotropy of the apparent shrinkage rates of the reinforcing fibers F are the same as those described in (B4) to (B7) of the second embodiment, and the description thereof is omitted. The operation effects of the third embodiment are the same as those of the second embodiment, and the description thereof is omitted.

<Modification>

Figure 13:
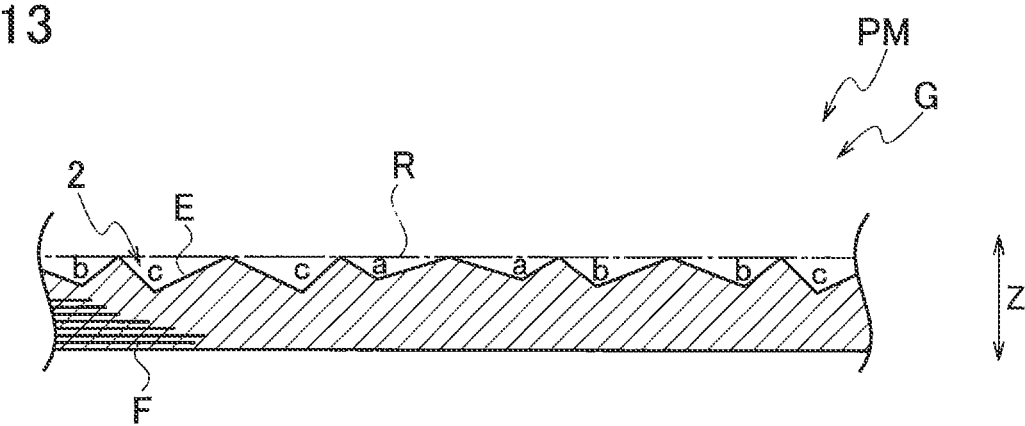
FIG. 13 is a cross-sectional view of a first modification of the third embodiment, corresponding to FIG. 12.
Figure 14:
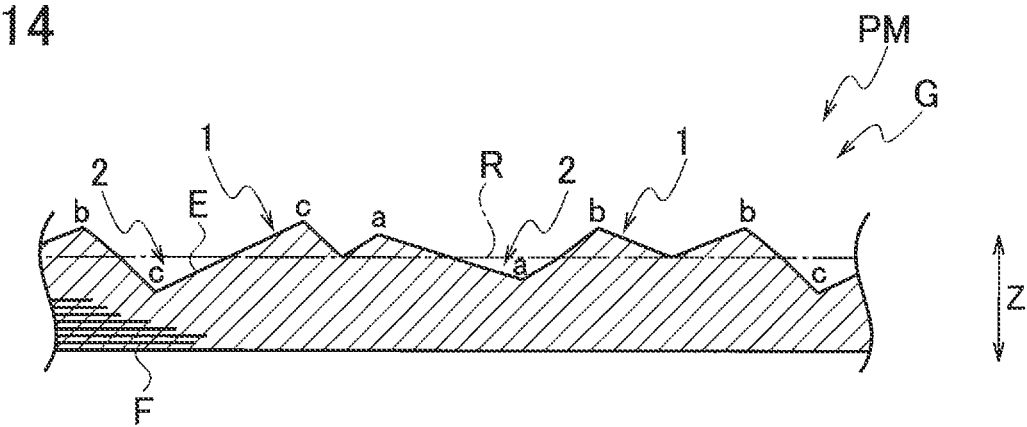
FIG. 14 is a cross-sectional view of a second modification of the third embodiment, corresponding to FIG. 12.

In the third embodiment, the plurality of protrusions 1, which protrude upward with respect to the reference plane R, are provided in the surface E. The panel material PM may be provided with a plurality of depressions 2 which are depressed downward with respect to the reference plane R as illustrated in FIG. 13. This modification is referred to as a first modification. Alternatively, the panel material PM may be provided with both of the protrusions 1 and depressions 2 as illustrated in FIG. 14. This modification is referred to as a second modification.

The relationship between the plural protrusions 1 of the third embodiment and the plural depressions 2 of the first modification is the same as that of the second embodiment, and the description thereof is omitted. The relationship between the plural protrusions 1 of the third embodiment and the plural protrusions 1 and depressions 2 of the second modification is the same as that of the second embodiment, and the description thereof is omitted.

<Other Modification>

In the first to third embodiments and the modifications thereof, the reinforcing fibers F are oriented in the three orientation directions parallel to the reference plane R, or in the X1, X2, and X3 directions. However, the reinforcing fibers F may be oriented in one or two of those three orientation directions.

In addition, the regular triangular pyramids 10 denoted by any two of the reference symbols a, b, and c according to the third embodiment and the modifications thereof may be identical in height.

Furthermore, the regular triangular pyramids 10 denoted by any one of the reference symbols a and b according to the second embodiment and the modifications thereof or the regular triangular pyramids 10 denoted by any one or two of the reference symbols a, b, and c according to the third embodiment and the modifications may have a height of 0. In the regions of the surface E corresponding to the regular triangular pyramids 10 with a height of 0, equilateral triangular planes exist at the level of the reference plane R.

The regular triangular pyramids 10 according to the second and third embodiments and the modifications thereof include two or three types of regular triangular pyramids 10 different in height from each other. However, the number of types of regular triangular pyramids 10 is not limited to two or three. The regular triangular pyramids 10 may include four or more types of regular triangular pyramids 10 different in height from each other as long as the ratios $L_2/L_1$ are identical across the lines $r_{ij}$.

Fourth Embodiment

A panel material PM according to a fourth embodiment is described with reference to FIGS. 15 to 17. In the fourth embodiment, different configurations from the first embodiment are described, and the configurations including the same functions as those of the configurations already described are given the same reference numerals and are not described.

Figure 15:
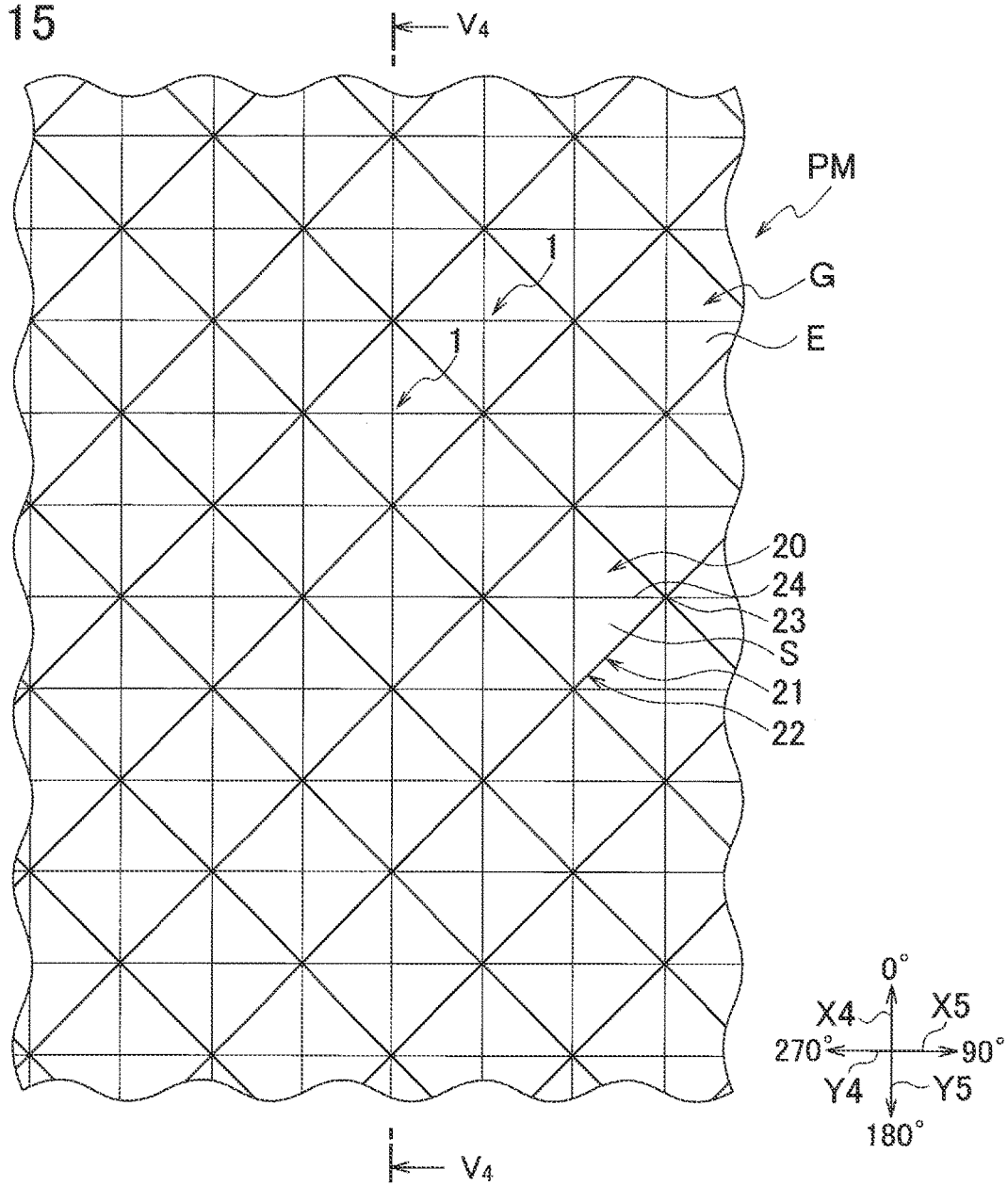
FIG. 15 is a plan view of a panel material according to a fourth embodiment.
Figure 17:
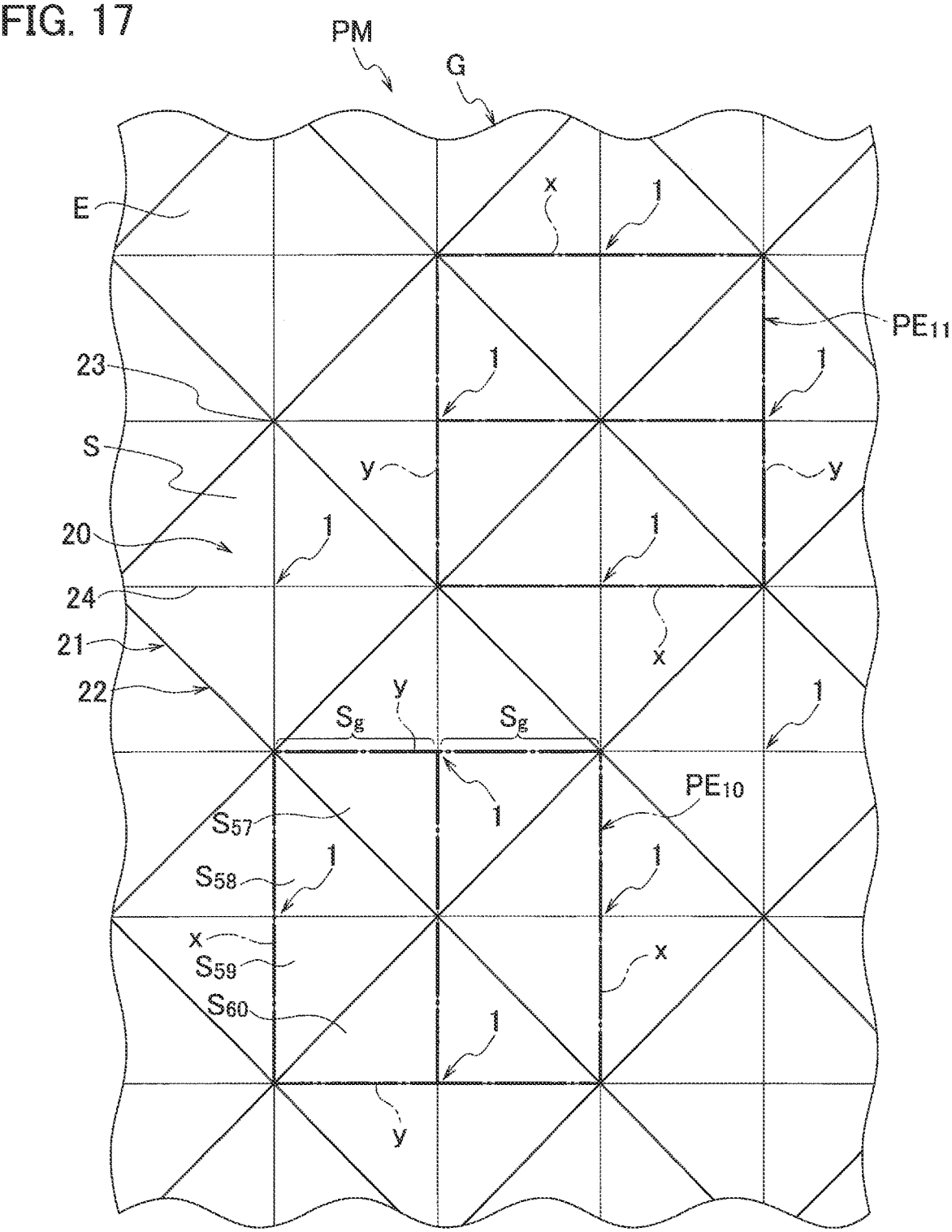
FIG. 17 is a view of main part of a texture pattern according to the fourth embodiment.
Figure 17:
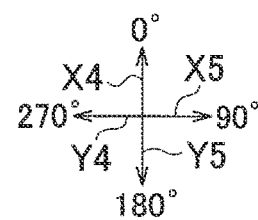

In the fourth embodiment, reinforcing fibers F are oriented in predetermined two orientation directions as seen in the Z direction as illustrated in FIGS. 15 and 17. Specifically, the reinforcing fibers F are oriented in the direction 0°-180° and the direction 90°-270°. In the following description, the direction 0°-180° is referred to as an X4 direction; and the direction 90°-270° is referred to as an X5 direction. As seen in the Z direction, the direction 90°-270°, which is perpendicular to the X4 direction, is referred to as a Y4 direction, and the direction 0°-180°, which is perpendicular to the X5 direction, is referred to as a Y5 direction. These directions perpendicular to the orientation directions are collectively referred to as y directions.

Figure 16:
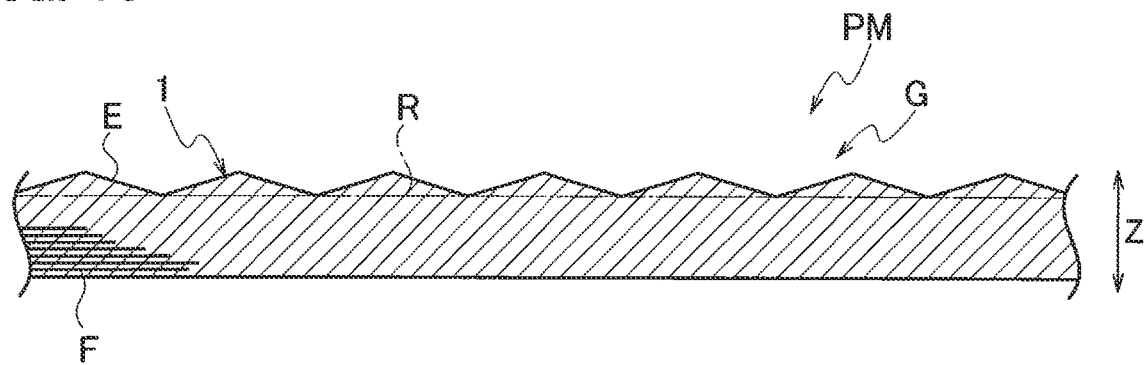
FIG. 16 is a cross-sectional view taken along a line $V_4$-$V_4$ in FIG. 15.

As illustrated in FIGS. 15 to 17, a plurality of protrusions 1 constituting the texture pattern G have shapes of congruent regular square pyramids 20 with bases on the reference plane R. The bases 21 of the regular square pyramids 20 are arranged on the reference plane R with no gap or overlap so that each vertex 23 of the square 22 constituting each base 21 is shared by four of the bases 21 as vertices 23 thereof.

As illustrated in FIGS. 15 and 17, each of the two orientation directions (the X4 and X5 directions) of the reinforcing fibers F is parallel to any lateral edge 24 of each regular square pyramid 20 as seen in the Z direction. The lateral edges 24 of each regular square pyramid 20 are lines of intersection of lateral faces S of the regular square pyramid 20.

As illustrated in FIG. 17, the texture pattern G includes pattern elements $PE_{10}$ closely arranged in the X4 and Y4 directions with the same orientation or pattern elements $PE_{11}$ closely arranged in the X5 and Y5 directions with the same orientation.

(C1) Shape of Pattern Element $PE_n$

Each of the pattern elements $PE_{10}$ and $PE_{11}$ of the fourth embodiment has a rectangular shape defined by sides x parallel to any orientation direction of the reinforcing fibers F and sides y parallel to the corresponding orientation perpendicular direction in a similar manner to the pattern elements $PE_1$ to $PE_3$ of the first embodiment.

(C2) Size of Pattern Element $PE_n$

The pattern elements $PE_{10}$ and $PE_{11}$ are identical in size across the two orientation directions (the X4 and X5 directions). As illustrated in FIG. 17, the lengths of the sides x and y individually correspond to the diagonal length of each square 22.

(C3) Symmetry of Planar Element in Each Segment Sg

As illustrated in FIG. 17, the planar elements of each segment Sg include only symmetrical pairs also in the fourth embodiment. In the left segment Sg of the pattern element $PE_{10}$, for example, lateral faces $S_{57}$ and $S_{59}$ have plane-symmetric shapes and constitute a symmetrical pair. In a similar manner, lateral faces $S_{58}$ and $S_{60}$ constitute a symmetrical pair.

(C4) Uniformity of Actual Length of Reinforcing Fiber F in Each Pattern Element $PE_n$ In each segment Sg, therefore, the overall actual lengths of the reinforcing fibers Ex are identical irrespective of the positions thereof in the y direction. Furthermore, the overall actual lengths of the reinforcing fibers Fx are identical across the segments Sg adjacent to each other. This is because the surface E is continuous in the y direction across the boundary between the segments Sg adjacent to each other. In other words, in each pattern element $PE_n$, the actual lengths of the reinforcing fibers Fx extending between the sides y are identical irrespective of the positions thereof in the y direction throughout the pattern element $PE_n$.

(C5) Uniformity of Apparent Length of Reinforcing Fiber F in Each Pattern Element $PE_n$ Since the pattern elements $PE_n$ are rectangular, the apparent lengths of the reinforcing fibers Fx extending between the sides y are identical irrespective of the positions thereof in the y direction in each pattern element $PE_n$.

(C6) Uniformity of Apparent Shrinkage Rate for Each Orientation Direction

The reinforcing fibers Fx that extend between the sides y in each pattern element $PE_n$ are therefore identical in ratio of apparent length to actual length irrespective of the positions thereof in the y direction. In the entire texture pattern G, therefore, the apparent length to actual length ratios of the reinforcing fibers F oriented in the X4 direction (hereinafter, also referred to as apparent shrinkage rates of the reinforcing fibers F in the X4 direction at the process of forming the texture pattern G in the surface E) are identical irrespective of the positions thereof in the Y4 direction. This means that the apparent shrinkage rates of the reinforcing fibers F in the X4 direction are identical irrespective of which sections of each protrusion 1 the reinforcing fibers F oriented in the X4 direction pass through.

In addition, in the entire G pattern, the apparent length to actual length ratios of the reinforcing fibers F oriented in the X5 direction (hereinafter, also referred to as apparent shrinkage rates of the reinforcing fibers F in the X5 direction at the process of forming the texture pattern G in the surface E) are therefore identical irrespective of the positions thereof in the Y5 direction. This means that the apparent shrinkage rates of the reinforcing fibers F in the X5 direction are identical irrespective of which sections of each protrusion 1 the reinforcing fibers F oriented in the X5 direction pass through.

(C7) Commonality of Actual Length of Reinforcing Fiber F Across Pattern Elements $PE_n$ Next, the actual lengths of the reinforcing fibers F oriented in each orientation direction are compared against those of the reinforcing fibers F oriented in the other orientation directions, or the actual lengths of the reinforcing fibers Fx in each patter element $PE_n$ are compared against those in the other pattern elements $PE_n$. For example, the actual length of each reinforcing fiber Fx in the pattern element $PE_{10}$ corresponds to two lateral edges 24 of the regular square pyramids 20 as calculated from the length of part corresponding to one side x, on the line of intersection of the surface E and any plane P in the pattern element $PE_{10}$. The same applies to the actual lengths of the reinforcing fibers Fx in the pattern element $PE_{11}$. The actual lengths of the reinforcing fibers Fx are therefore identical across the pattern elements $PE_n$.

(C8) Commonality of Apparent Length of Reinforcing Fiber F Across Pattern Element $PE_n$ Since the pattern elements $PE_{10}$ and $PE_{11}$ are identical in shape and size as described above, the apparent lengths of the reinforcing fibers Fx are identical across the two pattern elements $PE_n$.

(C9) Isotropy of Apparent Shrinkage Rate of Reinforcing Fiber F

The apparent length to actual length ratios of reinforcing fibers F are therefore identical across the reinforcing fibers F oriented in the two orientation directions. The apparent shrinkage rates of the reinforcing fibers F in planar directions at the process of forming the texture pattern G in the surface E are thus isotropic.

In the fourth embodiment, in the surface E of the panel material PM including the reinforcing fibers F oriented in the predetermined two orientation directions, the plurality of protrusions 1, which protrude upward with respect to the reference plane R along the surface E, are provided. The protrusions 1 have the shapes of the congruent regular square pyramids 20 with the bases 21 on the reference plane R. The bases 21 of the regular square pyramids 20 are arranged on the reference plane R with no overlap or gap so that each vertex 23 of the square 22 constituting each base 21 is shared by four of the bases 21 as vertices 23 thereof. Each of the two orientation directions of the reinforcing fibers F is parallel to any lateral edge 24 of each regular square pyramid 20 as seen in the Z direction.

According to this configuration, as described above, the apparent length to actual length ratios of the reinforcing fibers F are identical irrespective of which sections of each protrusion 1 the reinforcing fibers F pass through. This prevents irregularities of positions of the edges of the panel material PM and wrinkles in the surface E from forming at the process of forming the protrusions 1 in the surface E of the panel material PM including the reinforcing fibers F.

According to the aforementioned configuration, furthermore, the apparent length to actual length ratios of the reinforcing fibers F are identical across the reinforcing fibers F oriented in the two orientation directions. The apparent shrinkage rates of the reinforcing fibers F at the process of forming the texture pattern G, which includes the plural protrusions 1 in the surface E, are therefore isotropic. This ensures to prevent wrinkles in the surface E from forming.

According to the aforementioned configuration, still furthermore, each protrusion 1 is provided with four lateral edges. The number of lateral edges of each protrusion 1 of the fourth embodiment is greater than that of the aforementioned embodiments and modifications thereof, which is three. If the projected area of each protrusion 1 of the fourth embodiment is the same as that of the aforementioned embodiments and modifications thereof as seen in the Z direction, employing the configuration of the fourth embodiment increases the density of lateral edges (the number of lateral edges per unit area of the suffice E), thereby improving the surface stiffness of the panel material PM or shifting the resonance frequency to a higher frequency.

<Modification>

Figure 18:
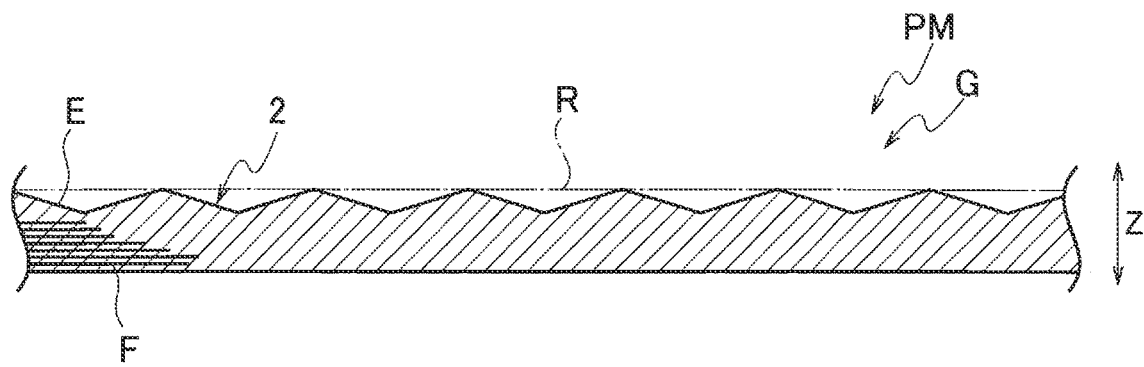
FIG. 18 is a cross-sectional view of a first modification of the fourth embodiment, corresponding to FIG. 16.
Figure 19:
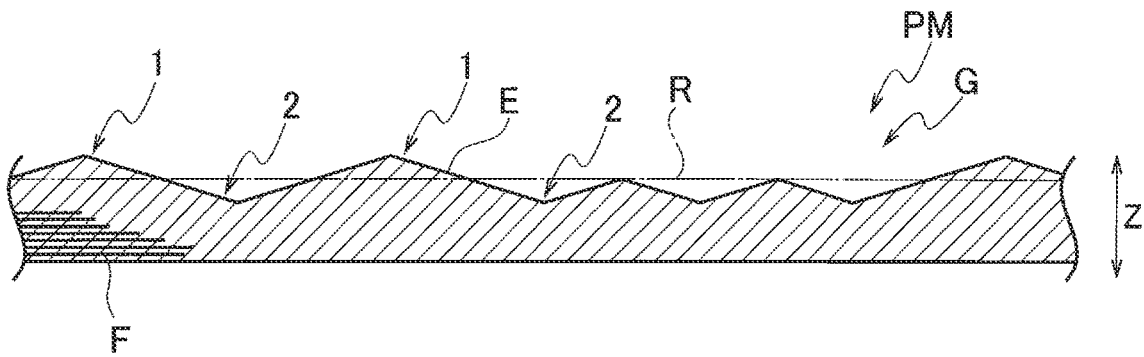
FIG. 19 is a cross-sectional view of a second modification of the fourth embodiment, corresponding to FIG. 16.

In the fourth embodiment, the plurality of protrusions 1, which protrude upward with respect to the reference plane R, are provided in the surface E. The panel material PM may be provided with a plurality of depressions 2, which are depressed downward with respect to the reference plane R as illustrated in FIG. 18. This modification is referred to as a first modification. Alternatively, the panel material PM may be provided with both of the protrusions 1 and depressions 2 as illustrated in FIG. 19. This modification is referred to as a second modification.

The plural depressions 2 according to the first modification have the shapes of the congruent regular square pyramids 20 with the bases 21 on the reference plane R. The plural protrusions 1 and depressions 2 according to the second modification have the shapes of the congruent regular square pyramids 20 with the bases 21 on the reference plane R. The bases 21 of the regular square pyramids 20 are arranged on the reference plane R with no gap or overlap so that each vertex 23 of the square 22 constituting each base 21 is shared by four of the bases 21 as vertices 23 thereof. The two orientation directions of the reinforcing fibers F are parallel to any lateral edge 24 of each regular square pyramid 20 as seen in the Z direction. The regular square pyramid 20 of each depression 2 and the regular square pyramid 20 of each protrusion 1 have plane-symmetric shapes with respect to the reference plane R.

In the second modification, the positional relationship (the order of arrangement) between the protrusions 1 and depressions 2 is not limited. Irrespective of in which order the protrusions 1 and depressions 2 are arranged, the planar elements of each segment Sg include only symmetrical pairs, so that the symmetry of the planar elements in each segment Sg (see (C3) above) is maintained.

In the pattern element $PE_{10}$ illustrated in FIG. 17, for example, it is assumed that the regular square pyramid 20 including the lateral faces $S_{57}$ is one of the depressions 2. In the left segment Sg of the pattern element $PE_{10}$, the lateral faces $S_{57}$ and $S_{59}$ have axisymmetric shapes with respect to the central axis A of the segment Sg including the lateral faces $S_{57}$ and $S_{59}$ and constitute a symmetrical pair. In such a manner, the planar elements of each segment Sg include only symmetrical pairs irrespective of which protrusions 1 in the fourth embodiment are replaced with the depressions 2.

The uniformity of the actual lengths of the reinforcing fibers F in each pattern element $PE_n$ (see (C4) above) is maintained irrespective of the order of arrangement of the protrusions 1 and depressions 2. The other configurations (see (C1), (C2), and (C5) to (C9) above) are the same as those of the fourth embodiment. The second modification therefore provides the same effects as the fourth embodiment.

As for the first modification, the description of the fourth embodiment is incorporated in the description of the first modification by replacing the protrusions 1 with the depressions 2. The first modification thus provides the same effects as the fourth embodiment.

Fifth Embodiment

A panel material PM according to a fifth embodiment is described with reference to FIGS. 20 and 21. In the fifth embodiment, different configurations from the fourth embodiment are described, and the configurations including the same functions as those of the configurations already described are given the same reference numerals and are not described.

Figure 20:
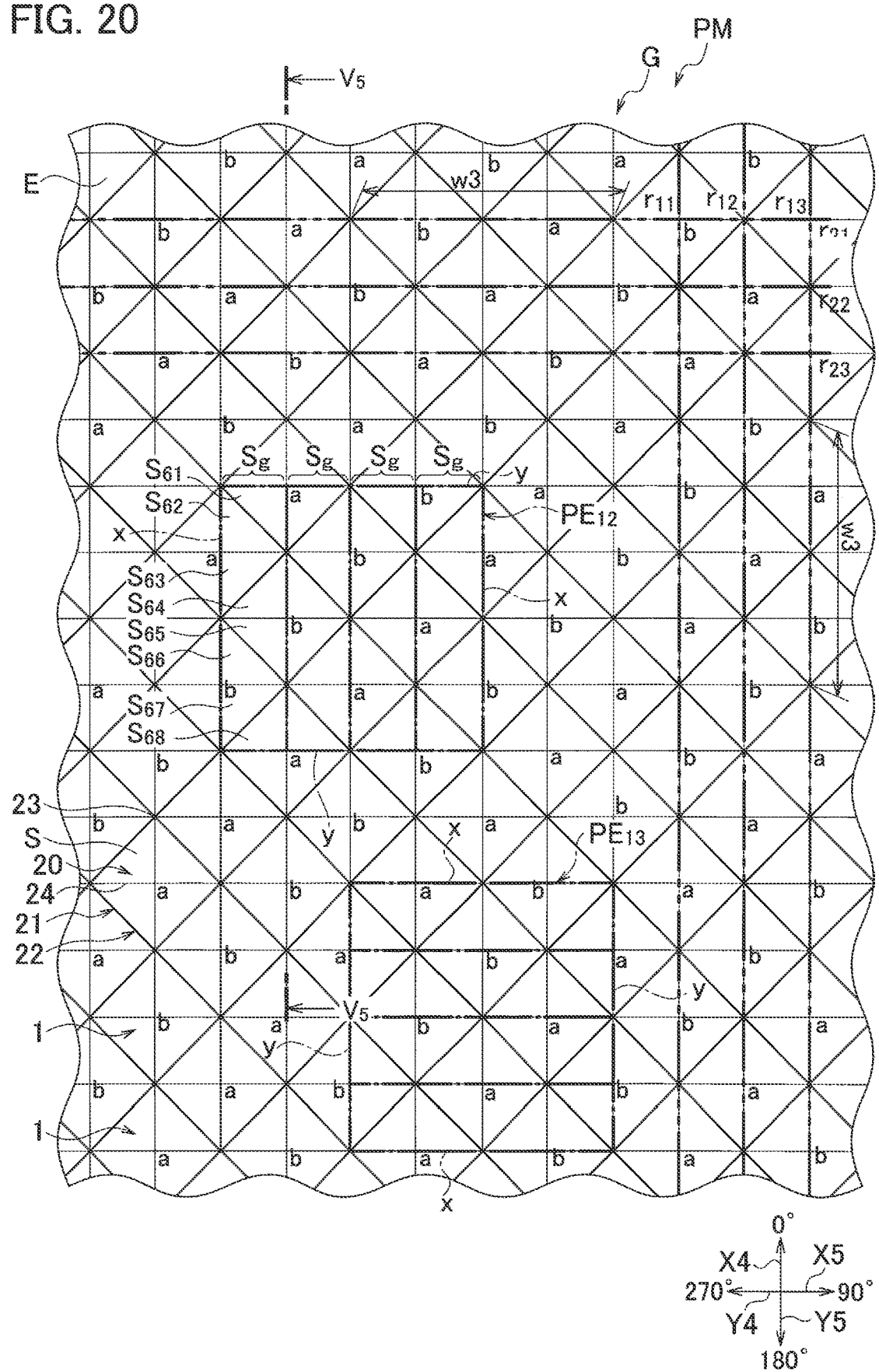
FIG. 20 is a view of main part of a texture pattern according to a fifth embodiment.
Figure 21:
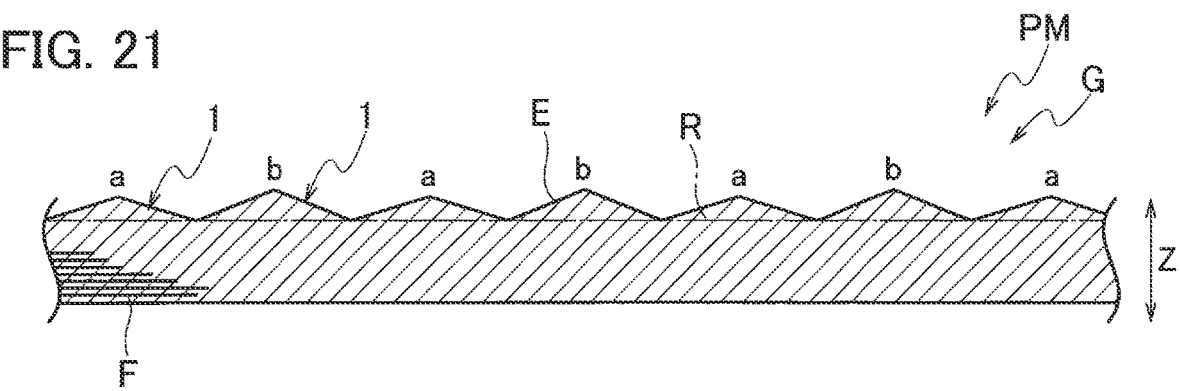
FIG. 21 is a cross-sectional view taken along a line $V_5$-$V_5$ in FIG. 20.

In the fifth embodiment, a plurality of protrusions 1 constituting the texture pattern G have shapes of regular square pyramids 20 with bases 21 on the reference plane R as illustrated in FIGS. 20 and 21. The bases 21 of the regular square pyramids 20 are congruent squares 22 that are arranged on the reference plane R with no gap or overlap so that each vertex 23 is shared by four of the squares 22 as vertices 23 thereof. The regular square pyramids 20 are not identical in height.

In the fifth embodiment, ratios $L_4/L_3$, which are defined for respective lines $r_{ij}$ (i is 1 or 2; and j is an integer) including diagonals of the squares 22, are identical across the lines $r_{ij}$. Herein, $L_3$ is the length of each section w3 corresponding to the core in the X4 or X5 direction in the texture pattern G, on the line of intersection of the surface F and a plane that includes the corresponding line $r_{ij}$ and is parallel to the Z direction. $L_3$ is substantially equal to the actual length of a reinforcing fiber F extending along the section w3 near the surface E in the section w3. $L_4$ is the apparent length of the section w3 as seen in the Z direction, which is equal to the length of one side x of each pattern element $PE_n$. $L_4$ is also substantially equal to the apparent length of the reinforcing fiber F extending along the section w3 near the surface E in the section w3. The values i of the lines $r_{ij}$ correspond to the respective orientation directions. The lines $r_{ij}$ with the same i value are parallel to each other. Specifically, the lines $r_{ij}$ include lines $r_{11}$ to $r_{13}$ and $r_{21}$ to $r_{23}$ illustrated in FIG. 20. The lines $r_{ij}$ with j values of not greater than 0 and not less than 4 are not illustrated.

FIGS. 20 and 21 illustrate an example in which the ratios $L_4/L_3$ are identical across the lines $r_{ij}$. In these drawings, the regular square pyramids 20 given a same alphabetic character are identical in height (or distance from the apex of each regular square pyramid 20 to the base 21 on the reference plane R in the Z direction). The relationship in height between the regular square pyramids 20 given a reference symbol a and the regular square pyramids 20 given a reference symbol b is not limited and can be set arbitrarily.

(D1) Shape of Pattern Element $PE_n$

Each of the pattern elements $PE_{12}$ and $PE_{13}$ of the fifth embodiment has a rectangular shape defined by sides x parallel to any orientation direction of the reinforcing fibers F and sides y parallel to the corresponding orientation perpendicular direction in a similar manner to the pattern elements $PE_{10}$ to $PE_{11}$ of the fourth embodiment.

(D2) Size of Pattern Element $PE_n$

The pattern elements $PE_{12}$ and $PE_{13}$ are identical in size across the two orientation directions (the X4 and X5 directions). As illustrated in FIG. 20, the lengths of the sides x and y individually correspond to double the diagonal lengths of each square 22.

(D3) Symmetry of Planar Element in Each Segment Sg

As illustrated in FIG. 20, the planar elements of each segment Sg include only symmetrical pairs also in the fifth embodiment. In the leftmost segment Sg of the pattern element $PE_{12}$, for example, lateral faces $S_{61}$ and $S_{63}$ have plane-symmetric shapes and constitute a symmetrical pair. In a similar manner, lateral faces $S_{62}$ and $S_{68}$, lateral faces $S_{64}$ and $S_{66}$, lateral faces $S_{65}$ and $S_{67}$ constitute symmetrical pairs.

(D4) Uniformity of Apparent Shrinkage Rate in Each Segment Sg

In each segment Sg, the overall actual lengths of the reinforcing fibers Fx are identical irrespective of the positions thereof in the y direction. Furthermore, the pattern elements $PE_n$ are rectangular, and the segments Sg are also rectangular. In each segment Sg, therefore, the apparent lengths of the reinforcing fibers Fx extending between the sides y are also identical irrespective of the positions thereof in the y direction. In each segment Sg, the reinforcing fibers Fx extending between the sides y are therefore identical in ratio of apparent length to actual length irrespective of the positions thereof in the y direction.

(D5) Uniformity of Apparent Shrinkage Rate in Each Pattern Element $PE_n$

Since the ratios $L_4/L_3$ are identical across the lines $r_{ij}$, the apparent length to actual length ratios of the reinforcing fibers Fx extending between the sides y are identical on the boundaries between the segments Sg. In each pattern element $PE_n$, the apparent length to actual length ratios of the reinforcing fibers Fx extending between the sides y are therefore identical irrespective of the positions thereof in the y direction throughout the pattern element $PE_n$.

(D6) Uniformity of Apparent Shrinkage Rate for Each Orientation Direction

In the entire texture pattern G, therefore, the apparent shrinkage rates of the reinforcing fibers Fx in the X4 direction are identical irrespective of the positions thereof in the Y4 direction, and the apparent shrinkage rates in the X5 direction are identical irrespective of the positions thereof in the Y5 direction. This means that the apparent shrinkage rates of the reinforcing fibers F oriented in each orientation direction are identical irrespective of which sections of each protrusion 1 the reinforcing fibers F pass through.

(D7) Isotropy of Apparent Shrinkage Rate of Reinforcing Fibers F

Since the ratios $L_4/L_3$ are identical across the lines $r_{1j}$ and $r_{2j}$ (j is an integer), the apparent length to actual length ratios of the reinforcing fibers F are identical across the reinforcing fibers F oriented in the different orientation directions. The apparent shrinkage rates of the reinforcing fibers F in planar directions at the process of forming the texture pattern G in the surface E are therefore isotropic.

In the fifth embodiment, in the surface F of the panel material PM including the reinforcing fibers F oriented in the predetermined two orientation directions, the plurality of protrusions 1, which protrude upward with respect to the reference plane R along the surface E, are provided. The protrusions 1 have the shapes of the regular square pyramids 20 with the bases 21 on the reference plane R. The bases 21 of the regular square pyramids 20 are the plural congruent squares 22 that are arranged on the reference plane R with no gap or overlap so that each vertex 23 is shared by four of the squares 22 as vertices 23 thereof. Each of the two orientation directions of the reinforcing fibers F is parallel to any lateral edge 24 of each regular square pyramid 20 as seen in the Z direction. Furthermore, the ratios $L_4/L_3$, which are defined for the respective lines including diagonals of the squares 22, are identical across the lines $r_{ij}$.

According to this configuration, as described above, the apparent length to actual length ratios of the reinforcing fibers F are identical irrespective of which sections of each protrusion 1 the reinforcing fibers F pass through. This prevents irregularities of positions of the edges of the panel material PM and wrinkles in the surface E from forming at the process of forming the protrusions 1 in the surface F of the panel material PM including the reinforcing fibers F.

According to the aforementioned configuration, furthermore, the apparent length to actual length ratios of the reinforcing fibers F are identical across the reinforcing fibers F oriented in the two orientation directions. The apparent shrinkage rates of the reinforcing fibers F at the process of forming the texture pattern G, which includes the plural protrusions 1, in the surface E are therefore isotropic. This ensures to prevent wrinkles in the surface F from forming.

<Modification>

Figure 22:
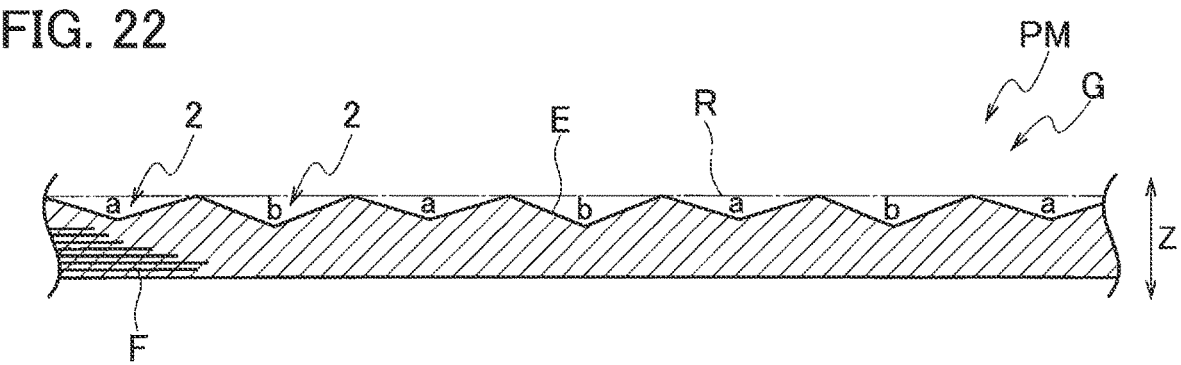
FIG. 22 is a cross-sectional view of a first modification of the fifth embodiment, corresponding to FIG. 21.
Figure 23:
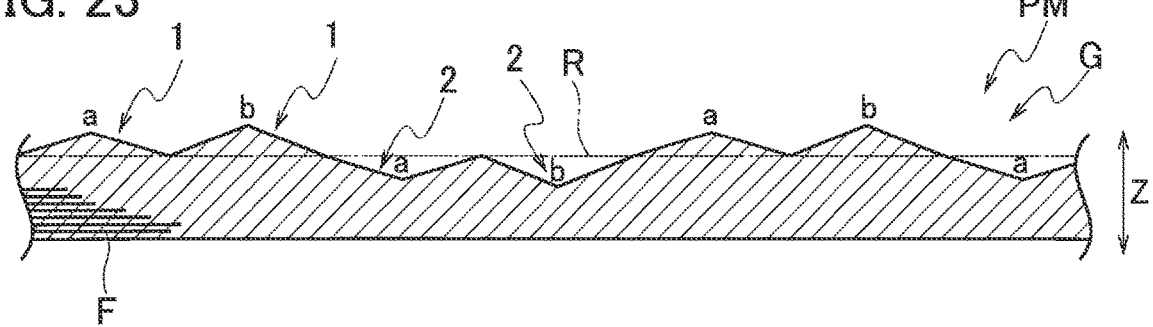
FIG. 23 is a cross-sectional view of a second modification of the fifth embodiment, corresponding to FIG. 21.

In the fifth embodiment, the plurality of protrusions 1, which protrude upward with respect to the reference plane R, are provided in the surface E. The panel material PM may be provided with a plurality of depressions 2, which are depressed downward with respect to the reference plane R as illustrated in FIG. 22. This modification is referred to as a first modification. Alternatively, the panel material PM may be provided with both of the protrusions 1 and depressions 2 as illustrated in FIG. 23. This modification is referred to as a second modification.

The plural depressions 2 according to the first modification have the shapes of the regular square pyramids 20 with the bases 21 on the reference plane R. The plural protrusions 1 and depressions 2 according to the second modification have the shapes of the regular square pyramids 20 with the bases 21 on the reference plane R. The bases 21 of the regular square pyramids 20 are the plural congruent squares 22 that are arranged on the reference plane R with no gap or overlap so that each vertex 23 is shared by four of the squares 22 as vertices 23 thereof. Each of the two orientation directions of the reinforcing fibers F is parallel to any lateral edge 24 of each regular square pyramid 20 as seen in the Z direction. The ratios $L_4/L_3$, which are defined for the respective lines $r_{ij}$ including diagonals of the squares 22, are identical across the lines $r_{ij}$. The regular square pyramid 20 of each depression 2 and the regular square pyramid 20 of each protrusion 1 have plane-symmetric shapes with respect to the reference plane R.

In the second modification, the positional relationship (the order of arrangement) between the protrusions 1 and depressions 2 is not limited. Irrespective of in which order the protrusions 1 and depressions 2 are arranged, the planar elements of each segment Sg include only symmetrical pairs, so that the symmetry of the planar elements in each segment Sg (see (D3) above) is maintained.

In the pattern element $PE_{12}$ illustrated in FIG. 20, for example, it is assumed that the regular square pyramid 20 including the lateral faces $S_{64}$ and $S_{65}$ is one of the depressions 2. In the leftmost segment Sg of the pattern element $PE_{12}$, the lateral faces $S_{64}$ and $S_{68}$ have axisymmetric shapes with respect to the central axis A of the segment Sg including the lateral faces $S_{64}$ and $S_{68}$ and constitute a symmetrical pair. In a similar manner, the lateral faces $S_{65}$ and $S_{67}$ constitute a symmetrical pair that is axisymmetric with respect to the central axis A. In such a manner, the planar elements of each segment Sg include only symmetrical pairs irrespective of which protrusions 1 in the fifth embodiment are replaced with the depressions 2.

The uniformity of the apparent shrinkage rates in each pattern segment Sg (see (D4) above) is thereby provided irrespective of the order of arrangement of the protrusions 1 and depressions 2. The other configurations (see (D1), (D2), and (D5) to (D7) above) are the same as those of the fifth embodiment. The second modification thus provides the same effects as the fifth embodiment.

As for the first modification, the description of the fifth embodiment is incorporated in the description of the first modification by replacing the protrusions 1 with the depressions 2. The first modification thus provides the same effects as the fifth embodiment.

Sixth Embodiment

A panel material PM according to a sixth embodiment is described with reference to FIGS. 24 and 25. In the sixth embodiment, different configurations from the fifth embodiment are described, and the configurations including the same functions as those of the configurations already described are given the same reference numerals and are not described.

In the sixth embodiment, in a similar manner to the fifth embodiment, ratios $L_4/L_3$, which are defined for respective lines $r_{ij}$ (i is 1 or 2; and j is an integer) including diagonals of the squares 22, are identical across the lines $r_{ij}$. Herein, $L_3$ is the length of each section w4 corresponding to the core in the X4 or X5 direction in the texture pattern G, on the line of intersection of the surface E and a plane that includes the corresponding line $r_{ij}$ and is parallel to the Z direction. $L_3$ is substantially equal to the actual length of a reinforcing fiber F extending along the section w4 near the surface E in the section w4. $L_4$ is the apparent length of the section w4 as seen in the Z direction, which is equal to the length of one side x of each pattern element $PE_n$. $L_4$ is also substantially equal to the apparent length of the reinforcing fiber F extending along the section w4 near the surface E in the section w4. The regular square pyramids 20 of the sixth embodiment include three types of regular square pyramids 20 different in height unlike the fifth embodiment.

Figure 24:
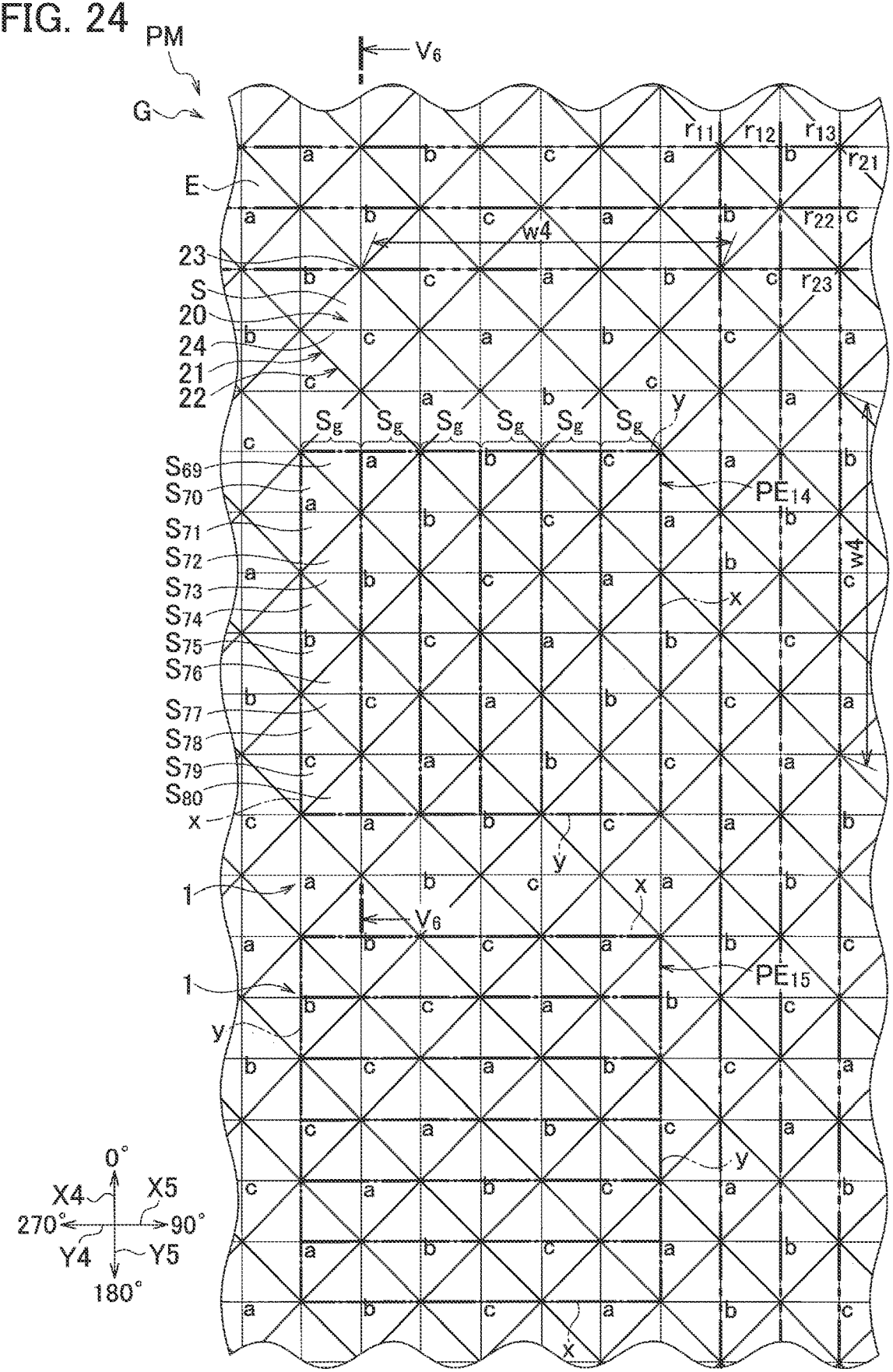
FIG. 24 is a view of main part of a texture pattern according to a sixth embodiment.
Figure 25:
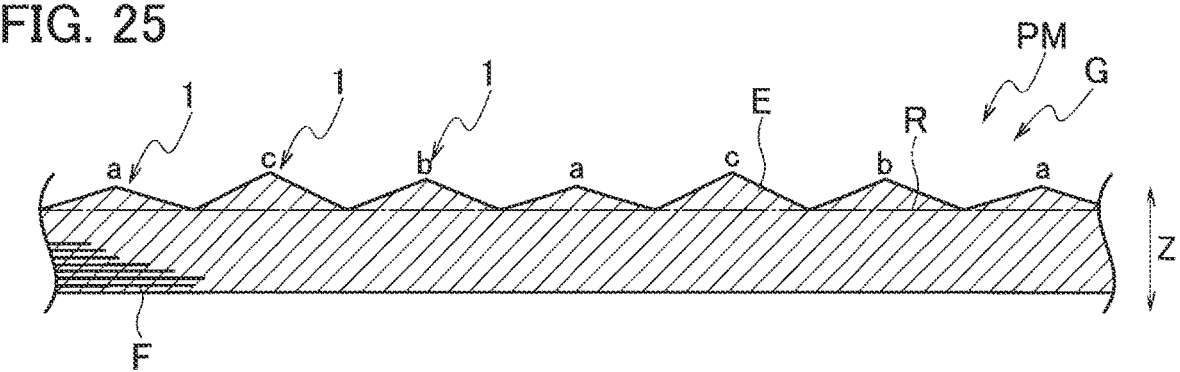
FIG. 25 is a cross-sectional view taken along a line $V_6$-$V_6$ in FIG. 24.

FIGS. 24 and 25 illustrate an example in which the ratios $L_4/L_3$ are identical across the lines $r_{ij}$. In these drawings, the regular square pyramids 20 given a same alphabetic character are identical in height (or distance from the apex of each regular square pyramid 20 to the base 21 on the reference plane R in the Z direction). The relationship in height between the regular square pyramids 20 given a reference symbol a, the regular square pyramids 20 given a reference symbol b, and the regular square pyramids 20 given a reference symbol c is not limited and can be set arbitrarily.

(D1) Shape of Pattern Element $PE_n$

Each of pattern elements $PE_{14}$ and $PE_{15}$ of the sixth embodiment has a rectangular shape defined by sides x parallel to any orientation direction of the reinforcing fibers F and sides y parallel to the corresponding orientation perpendicular direction in a similar manner to the pattern elements $PE_{12}$ and $PE_{13}$ of the fifth embodiment.

(D2) Size of Pattern Element $PE_n$

The patterns $PE_{14}$ to $PE_{15}$ are identical in size across the two orientation directions (X4 and X5 directions). As illustrated in FIG. 24, the lengths of the sides x and y individually correspond to three times the diagonal length of each square 22.

(D3) Symmetry of Planar Element in Each Segment Sg

As illustrated in FIG. 24, the planar elements of each segment Sg include only symmetrical pairs also in the sixth embodiment. In the leftmost segment Sg of the pattern element $PE_{14}$, for example, lateral faces $S_{69}$ and $S_{71}$ have plane-symmetric shapes and constitute a symmetrical pair. In a similar manner, lateral faces $S_{70}$ and $S_{80}$, lateral faces $S_{72}$ and $S_{74}$, lateral faces $S_{73}$ and $S_{75}$, lateral faces $S_{76}$ and $S_{78}$, and lateral faces $S_{77}$ and $S_{79}$ constitute symmetrical pairs.

The configurations relating to the uniformity of the apparent shrinkage rates in each segment Sg, the uniformity of the apparent shrinkage rates in each pattern element $PE_n$, the uniformity of the apparent shrinkage rates for each orientation direction, and the isotropy of the apparent shrinkage rates of the reinforcing fibers F are the same as those described in (D4) to (D7) of the fifth embodiment, and the description thereof is omitted. The operation effects of the sixth embodiment are the same as those of the fifth embodiment, and the description thereof is omitted.

<Modification>

Figure 26:
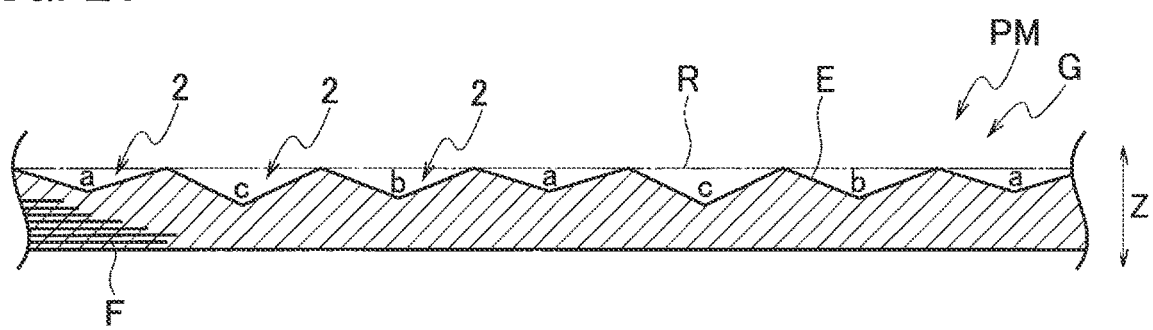
FIG. 26 is a cross-sectional view of a first modification of the sixth embodiment, corresponding to FIG. 25.
Figure 27:
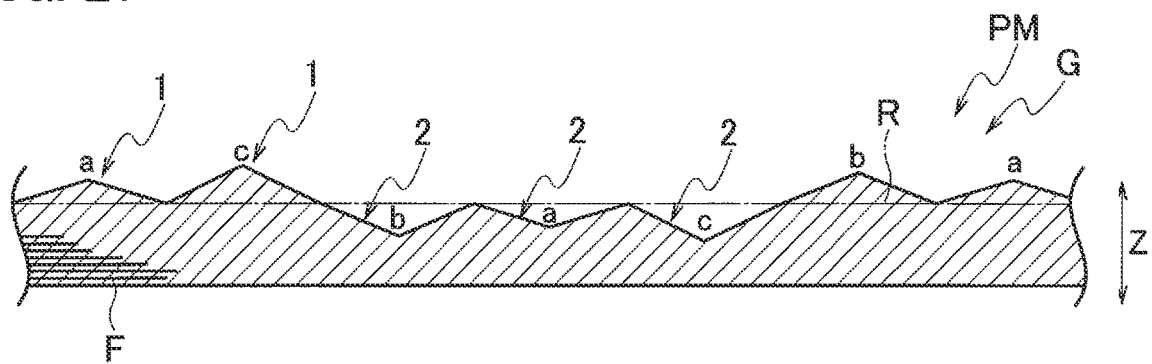
FIG. 27 is a cross-sectional view of a second modification of the sixth embodiment, corresponding to FIG. 25.

In the sixth embodiment, the plurality of protrusions 1, which protrude upward with respect to the reference plane R, are provided in the surface E. The panel material PM may be provided with a plurality of depressions 2, which are depressed downward with respect to the reference plane R, as illustrated in FIG. 26. This modification is referred to as a first modification. Alternatively, the panel material PM may be provided with both of the protrusions 1 and depressions 2 as illustrated in FIG. 27. This modification is referred to as a second modification.

The relationship between the plural protrusions 1 of the sixth embodiment and the plural depressions 2 of the first modification is the same as that of the fifth embodiment, and the description thereof is omitted. The relationship between the plural protrusions 1 of the sixth embodiment and the plural protrusions 1 and depressions 2 of the second modification is the same as that of the fifth embodiment, and the description thereof is omitted.

Seventh Embodiment

A panel material PM according to a seventh embodiment is described with reference to FIGS. 28 to 30. In the seventh embodiment, different configurations from the fourth embodiment are described, and the configurations including the same functions as those of the configurations already described are given the same reference numerals and are not described.

Figure 28:
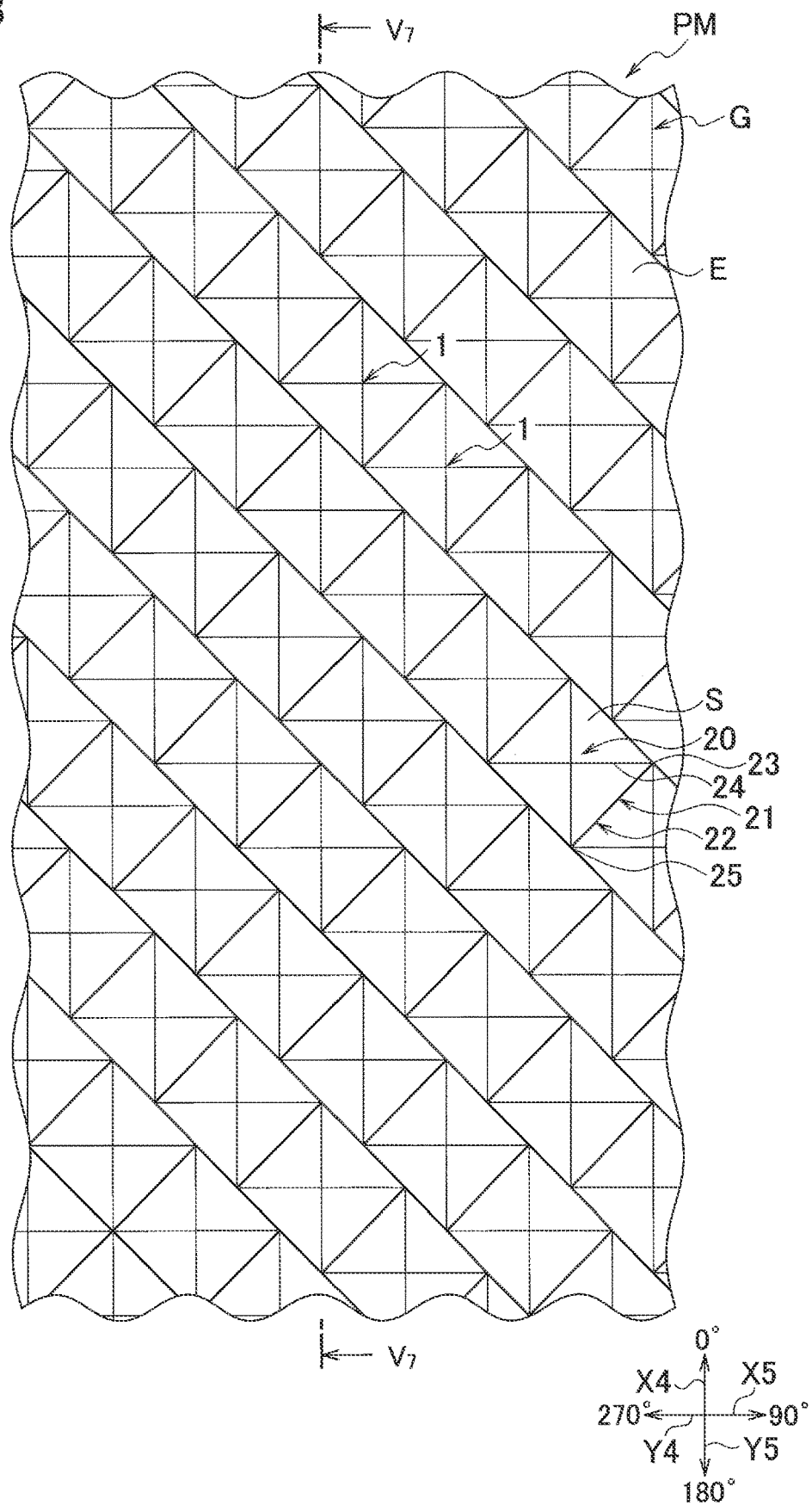
FIG. 28 is a plan view of a panel material according to a seventh embodiment.
Figure 29:
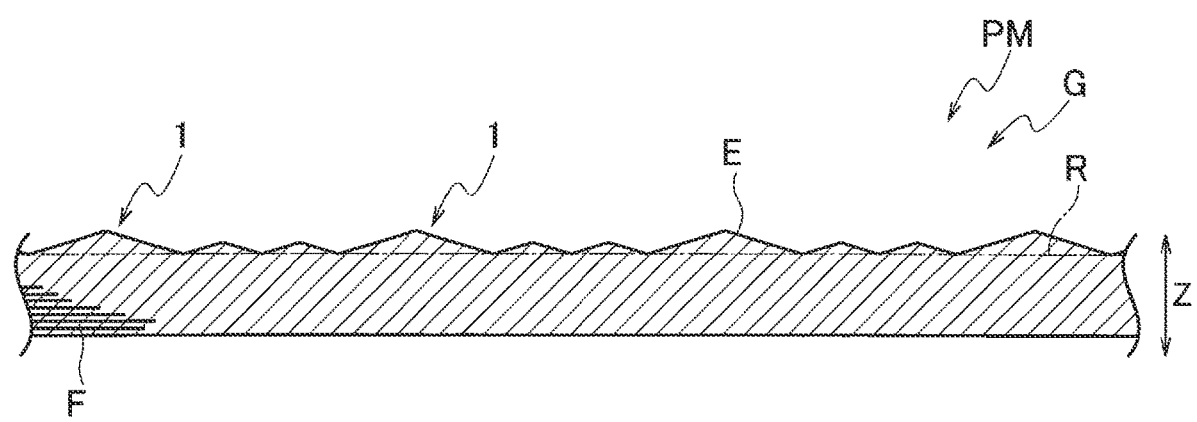
FIG. 29 is a cross-sectional view taken along a line $V_7$-$V_7$ in FIG. 28.
Figure 30:
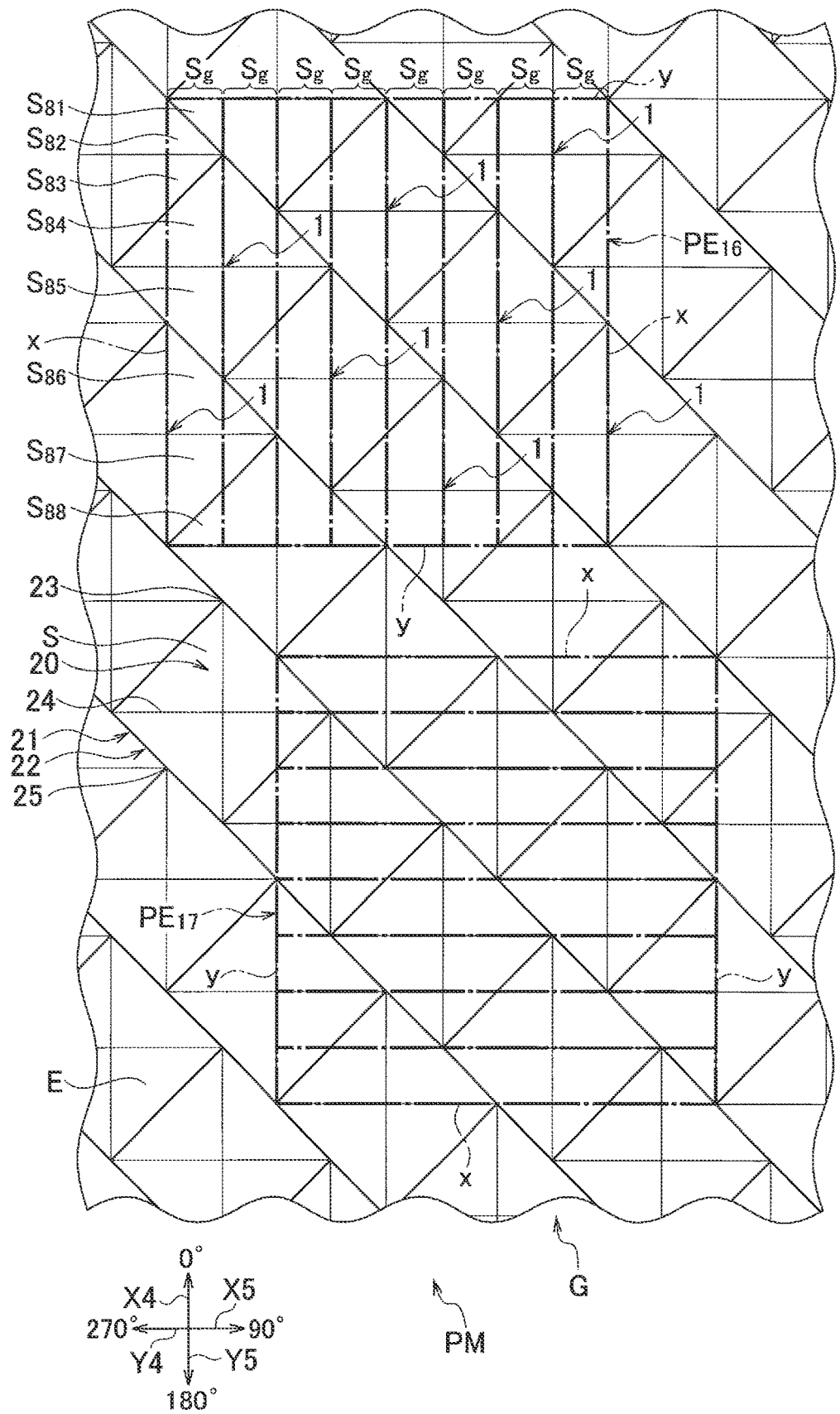
FIG. 30 is a view of main part of a texture pattern according to the seventh embodiment.

In the seventh embodiment, as illustrated in FIGS. 28 and 30, a plurality of protrusions 1 constituting the texture pattern G have shapes of congruent regular square pyramids 20 with bases 21 on the reference plane R. The bases 21 of the regular square pyramids 20 are arranged on the reference plane R with no gap or overlap so that each vertex 23 of the square 22 constituting each base 21 is shared by two of the bases 21 as vertices 23 thereof and is located at a midpoint 25 of one side of any base 21.

As illustrated in FIG. 30, the texture pattern G includes pattern elements $PE_{16}$ closely arranged in the X4 and Y4 directions with the same orientation or includes pattern elements $PE_{17}$ closely arranged in the X5 and Y5 directions with the same orientation.

(E1) Shape of Pattern Element $PE_n$

Each of the pattern elements $PE_{16}$ and $PE_{17}$ of the seventh embodiment has a rectangular shape defined by sides x parallel to any orientation direction of the reinforcing fibers F and sides y parallel to the corresponding orientation perpendicular direction in a similar manner to the pattern elements $PE_{10}$ to $PE_{11}$ of the fourth embodiment.

(E2) Size of Pattern Element $PE_n$

The pattern elements $PE_{16}$ and $PE_{17}$ are identical in size across the two orientation directions (the X4 and X5 directions). As illustrated in FIG. 30, the lengths of the sides x and y individually correspond to double the diagonal length of each square 22.

(E3) Symmetry of Planar Element in Each Segment Sg

As illustrated in FIG. 30, the planar elements of each segment Sg include only symmetrical pairs also in the seventh embodiment. In the leftmost segment Sg of the pattern element $PE_{16}$, for example, lateral faces $S_{81}$ and $S_{83}$ have plane-symmetric shapes and constitute a symmetrical pair. In a similar manner, lateral faces $S_{82}$ and $S_{88}$, lateral faces $S_{84}$ and $S_{86}$, and lateral faces $S_{85}$ and $S_{87}$ constitute symmetrical pairs.

(E7) Commonality of Actual Length of Reinforcing Fiber F Across Pattern Elements $PE_n$ Next, the actual lengths of the reinforcing fibers F oriented in each orientation direction are compared against those of the reinforcing fibers F oriented in the other orientation directions, or the actual lengths of the reinforcing fibers Fx in each patter element PE, are compared against those in the other pattern elements $PE_n$. For example, the actual length of each reinforcing fiber Fx in the pattern element $PE_{16}$ corresponds to four lateral edges 24 of the regular square pyramids 20 as calculated from the length of part corresponding to one side x, on the line of intersection of the surface E and any plane P in the pattern element $PE_{16}$. The same applies to the actual lengths of the reinforcing fibers Fx in the pattern element $PE_{17}$. The actual lengths of the reinforcing fibers Fx are therefore identical across the pattern elements $PE_n$.

(E5) Commonality of Apparent Length of Reinforcing Fiber F Across Pattern Element $PE_n$ Since the pattern elements $PE_{16}$ and $PE_{17}$ are identical in shape and size as described above, the apparent lengths of the reinforcing fibers are identical across the two pattern elements $PE_n$.

The configurations relating to the uniformity of the actual lengths of the reinforcing fibers F in each pattern element $PE_n$, the uniformity of the apparent lengths of the reinforcing fibers F in each pattern element $PE_n$, the uniformity of the apparent shrinkage rates for each orientation direction, and the isotropy of the apparent shrinkage rates of the reinforcing fibers F are the same as those described in (C4) to (C6) and (C9) of the fourth embodiment, and the description thereof is omitted.

In the seventh embodiment, in the surface E of the panel material PM including the reinforcing fibers F oriented in the predetermined two orientation directions, the plurality of protrusions 1, which protrude upward with respect to the reference plane R along the surface E, are provided. The protrusions 1 have the shapes of the congruent regular square pyramids 20 with the bases 21 on the reference plane R. The bases 21 of the regular square pyramids 20 are arranged on the reference plane R with no gap or overlap so that each vertex 23 of the square 22 constituting each base 21 is shared by two of the bases 21 as vertices 23 thereof and is located at the midpoint 25 of one side of any base 21. Each of the two orientation directions of the reinforcing fibers F is parallel to any lateral edges 24 of each regular square pyramid 20 as seen in the Z direction.

According to this configuration, as described above, the apparent length to actual length ratios of the reinforcing fibers F are identical irrespective of which sections of each protrusion 1 the reinforcing fibers F pass through. This prevents irregularities of positions of the edges of the panel material PM and wrinkles in the surface E from forming at the process of forming the protrusions 1 in the surface E of the panel material PM including the reinforcing fibers F.

According to the aforementioned configuration, furthermore, the apparent length to actual length ratios of the reinforcing fibers F are identical across the reinforcing fibers F oriented in the two orientation directions. The apparent shrinkage rates of the reinforcing fibers F at the process of forming the texture pattern G, which includes the plural protrusions 1, in the surface E are therefore isotropic. This ensures to prevent wrinkles in the surface E from forming.

<Modification>

Figure 31:
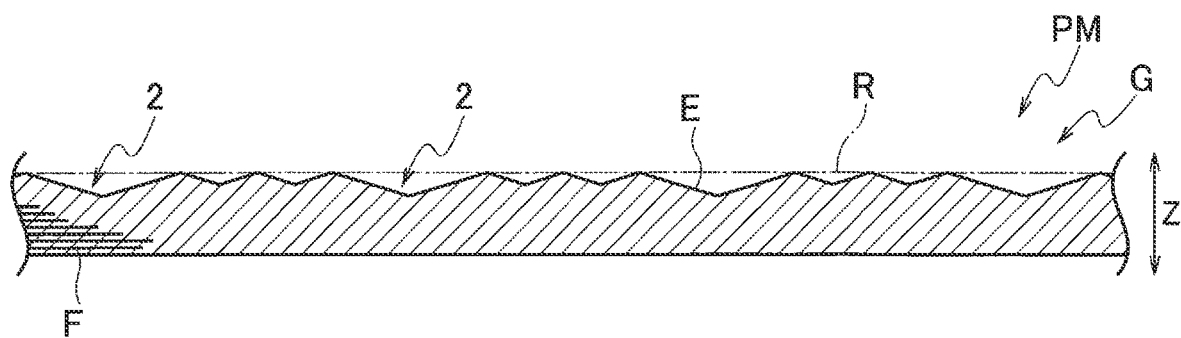
FIG. 31 is a cross-sectional view of a first modification of the seventh embodiment, corresponding to FIG. 29.
Figure 32:
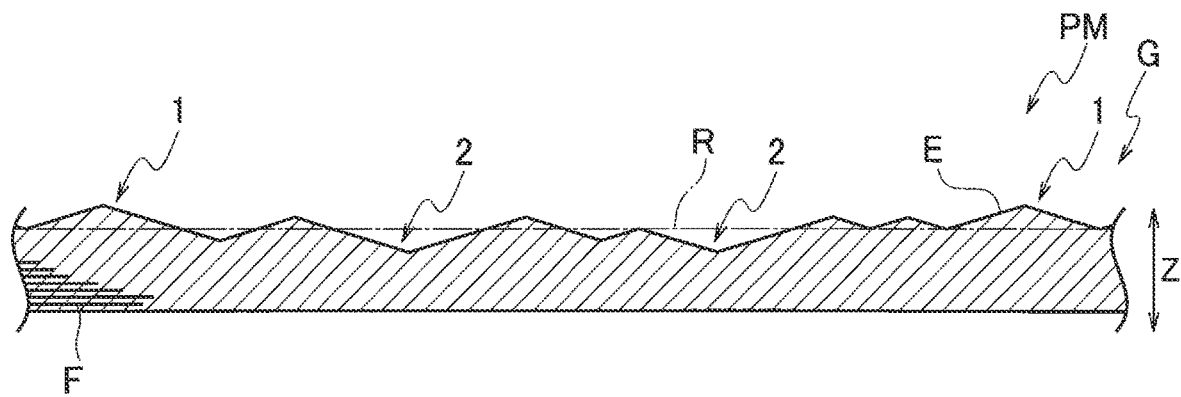
FIG. 32 is a cross-sectional view of a second modification of the seventh embodiment, corresponding to FIG. 29.

In the seventh embodiment, the plurality of protrusions 1, which protrude upward with respect to the reference plane R, are provided in the surface E. The panel material PM may be provided with a plurality of depressions 2, which are depressed downward with respect to the reference plane R, as illustrated in FIG. 31. This modification is referred to as a first modification. Alternatively, the panel material PM may be provided with both of the protrusions 1 and depressions 2 as illustrated in FIG. 32. This modification is referred to as a second modification.

The plural depressions 2 according to the first modification have the shapes of the congruent regular square pyramids 20 with the bases 21 on the reference plane R. The plural protrusions 1 and depressions 2 according to the second modification have the shapes of the congruent regular square pyramids 20 with the bases 21 on the reference plane R. The bases 21 of the regular square pyramids 20 are arranged on the reference plane R with no gap or overlap so that each vertex 23 of the square 22 constituting each base 21 is shared by two of the bases 21 as vertices 23 thereof and is located at the midpoint 25 of one side of any base 21. Each of the two orientation directions of the reinforcing fibers F is parallel to any lateral edge 24 of each regular square pyramid 20 as seen in the Z direction. The regular square pyramid 20 of each depression 2 and the regular square pyramid 20 of each protrusion 1 have plane-symmetric shapes with respect to the reference plane R.

In the second modification, the positional relationship (the order of arrangement) between the protrusions 1 and depressions 2 is not limited. Irrespective of in which order the protrusions 1 and depressions 2 are arranged, the planar elements of each segment Sg include only symmetrical pairs, so that the symmetry of the planar elements in each segment Sg (see (E3) above) is maintained.

In the pattern element $PE_{16}$ illustrated in FIG. 30, for example, it is assumed that the regular square pyramid 20 including the lateral faces $S_{84}$ and $S_{85}$ is one of the depressions 2. In the leftmost segment Sg of the pattern element $PE_{16}$, the lateral faces $S_{84}$ and $S_{86}$ have axisymmetric shapes with respect to the central axis A of the segment Sg including the lateral faces $S_{84}$ and $S_{86}$ and constitute a symmetrical pair. In a similar manner, the lateral faces $S_{85}$ and $S_{87}$ constitute a symmetrical pair that is axisymmetric with respect to the central axis A. In such a manner, the planar elements of each segment Sg include only symmetrical pairs irrespective of which protrusions 1 in the seventh embodiment are replaced with the depressions 2.

The uniformity of the actual lengths of the reinforcing fibers F in each pattern element $PE_n$ (see (C4) in the fourth embodiment) is thereby maintained irrespective of the order of arrangement of the protrusions 1 and depressions 2. The other configurations (see (E1), (E2), (E7), (E8), (C5), (C6), and (C9) above) are the same as those of the seventh embodiment. The second modification thus provides the same effects as the seventh embodiment.

As for the first modification, the description of the seventh embodiment is incorporated in the description of the first modification by replacing the protrusions 1 with the depressions 2. The first modification thus provides the same effects as the seventh embodiment.

Eighth Embodiment

A panel material PM according to an eighth embodiment is described with reference to FIGS. 33 and 34. In the eighth embodiment, different configurations from the seventh embodiment are described, and the configurations including the same functions as those of the configurations already described are given the same reference numerals and are not described.

Figure 33:
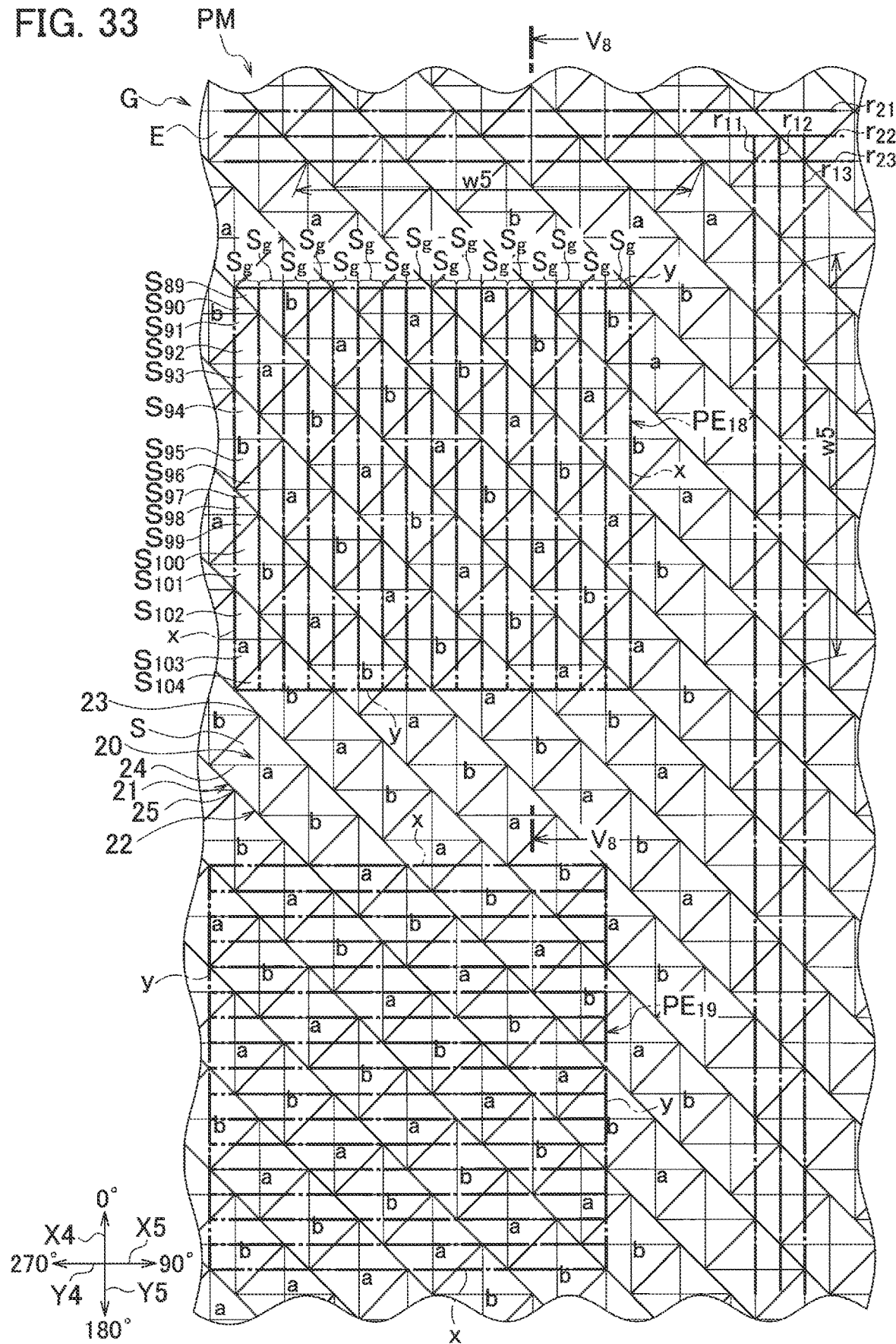
FIG. 33 is a view of main part of a texture pattern according to an eighth embodiment.
Figure 34:
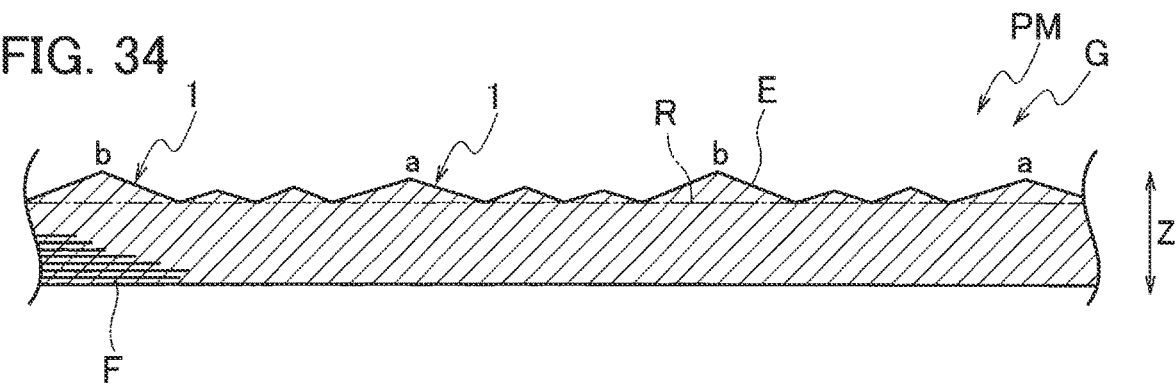
FIG. 34 is a cross-sectional view taken along a line $V_8$-$V_8$ in FIG. 33.

In the eighth embodiment, a plurality of protrusions 1 constituting the texture pattern G have shapes of regular square pyramids 20 with bases 21 on the reference plane R as illustrated in FIGS. 33 and 34. The bases 21 of the regular square pyramids are plural congruent squares 22 that are arranged on the reference plane R with no gap or overlap so that each vertex 23 thereof is shared by two of the squares 22 as vertices 23 thereof and is located at a midpoint 25 of one side of any square 22. The regular square pyramids 20 are not identical in height.

In the eighth embodiment, ratios $L_6/L_5$, which are defined for respective lines r (i is 1 or 2; and j is an integer) including diagonals of the squares 22, are identical across the lines $r_{ij}$. Herein, $L_5$ is the length of each section w5 corresponding to the core in the X4 or X5 direction in the texture pattern G, on the line of intersection of the surface E and a plane that includes the corresponding line $r_{ij}$ and is parallel to the Z direction. $L_5$ is substantially equal to the actual length of a reinforcing fiber F extending along the section w5 near the surface E in the section w5. $L_6$ is the apparent length of the section w5 as seen in the Z direction, which is equal to the length of one side x of each pattern element $PE_n$. $L_6$ is also substantially equal to the apparent length of the reinforcing fiber F extending along the section w5 near the surface E in the section w5. The i values of the lines correspond to the respective orientation directions. The lines $r_{ij}$ with the same i value are parallel to each other. Specifically, the lines $r_{ij}$ include lines $r_{11}$ to $r_{13}$ and $r_{21}$ to $r_{23}$ illustrated in FIG. 33. The lines $r_{ij}$ with j values of not greater than 0 and not less than 4 are not illustrated.

FIGS. 33 and 34 illustrate an example in which the ratios $L_6/L_5$ are identical across the lines $r_{ij}$. In these drawings, the regular square pyramids 20 given a same alphabetic character are identical in height (or distance from the apex of each regular square pyramid 20 to the base 21 on the reference plane R in the Z direction). The relationship in height between the regular square pyramids 20 given a reference symbol a and the regular square pyramids 20 given a reference symbol b is not limited and can be set arbitrarily.

(F1) Shape of Pattern Element $PE_n$

Each of the pattern elements $PE_{18}$ and $PE_{19}$ of the eighth embodiment has a rectangular shape defined by sides x parallel to any orientation direction of the reinforcing fibers F and sides y parallel to the corresponding orientation perpendicular direction in a similar manner to the pattern elements $PE_{16}$ to $PE_{17}$ of the seventh embodiment.

(F2) Size of Pattern Element $PE_n$

The pattern elements $PE_{18}$ and $PE_{19}$ are identical in size across the two orientation directions (the X4 and X5 directions). As illustrated in FIG. 33, the lengths of the sides x and y individually correspond to four times the diagonal length of each square 22.

(F3) Symmetry of Planar Element in Each Segment Sg

As illustrated in FIG. 33, the planar elements of each segment Sg include only symmetrical pairs also in the eighth embodiment. In the leftmost segment Sg of the pattern element $PE_{18}$, for example, lateral faces $S_{89}$ and $S_{91}$ have plane-symmetric shapes and constitute a symmetrical pair. In a similar manner, lateral faces $S_{90}$ and $S_{104}$, lateral faces $S_{92}$ and $S_{102}$, lateral faces $S_{93}$ and $S_{103}$, lateral faces $S_{94}$ and $S_{100}$, lateral faces $S_{95}$ and $S_{101}$, lateral faces $S_{96}$ and $S_{98}$, and lateral faces $S_{97}$ and $S_{99}$ constitute symmetrical pairs.

(F4) Uniformity of Apparent Shrinkage Rate in Each Segment $Sg_n$

In each segment Sg, the overall actual lengths of the reinforcing fibers Fx are identical irrespective of the positions thereof in the y direction. Furthermore, the pattern elements $PE_n$ are rectangular, and the segments Sg are also rectangular. In each segment Sg, the apparent lengths of the reinforcing fibers Fx extending between the sides y are identical irrespective of the positions thereof in the y direction. In each segment Sg, therefore, the reinforcing fibers Fx extending between the sides y are also identical in ratio of apparent length to actual length irrespective of the positions thereof in they direction.

(F5) Uniformity of Apparent Shrinkage Rate in Each Pattern Element $PE_n$

Since the ratios $L_6/L_5$ are identical across the lines $r_{ij}$, the apparent length to actual length ratios of the reinforcing fibers Fx extending between the sides y are identical on the boundaries between the segments Sg. In each pattern element $PE_n$, the apparent length to actual length ratios of the reinforcing fibers Fx extending between the sides y are therefore identical irrespective of the positions thereof in the y direction throughout the pattern element $PE_n$.

(F6) Uniformity of Apparent Shrinkage Rate for Each Orientation Direction

In the entire texture pattern G, therefore, the apparent shrinkage rates of the reinforcing fibers F in the X4 direction are identical irrespective of the positions thereof in the Y4 direction, and the apparent shrinkage rates in the X5 direction are identical irrespective of the positions in the Y5 direction. This means that the apparent shrinkage rates of the reinforcing fibers F oriented in each orientation direction are identical irrespective of which sections of each protrusion 1 the reinforcing fibers F pass through.

(F7) Isotropy of Apparent Shrinkage Rate of Reinforcing Fiber F

Since the ratios $L_6/L_5$ are identical across the lines $r_{1j}$ and $r_{2j}$ (j is an integer), the apparent length to actual length ratios of the reinforcing fibers F are identical across the reinforcing fibers F oriented in the different orientation directions. The apparent shrinkage rates of the reinforcing fibers F in planar directions at the process of forming the texture patterns in the surface E are therefore isotropic.

In the eighth embodiment, in the surface E of the panel material PM including the reinforcing fibers F oriented in the predetermined two orientation directions, the plurality of protrusions 1, which protrude upward with respect to the reference plane R along the surface E, are provided. The protrusions 1 have the shapes of the regular square pyramids 20 with the bases 21 on the reference plane R. The bases 21 of the regular square pyramids 20 are the plural congruent squares 22 that are arranged on the reference plane R with no gap or overlap so that each vertex 23 is shared by two of the squares 22 as vertices 23 thereof and is located at the midpoint 25 of one side of any square 22. Each of the two orientation directions of the reinforcing fibers F is parallel to any lateral edge 24 of each regular square pyramid 20 as seen in the Z direction. Furthermore, the ratios $L_6/L_5$, which are defined for the respective lines $r_{ij}$ including diagonals of the squares 22, are identical across the lines $r_{ij}$.

According to this configuration, as described above, the apparent length to actual length ratios of the reinforcing fibers F are identical irrespective of which sections of each protrusion 1 the reinforcing fibers F pass through. This prevents irregularities of positions of the edges of the panel material PM and wrinkles in the surface E from forming at the process of forming the protrusions 1 in the surface E of the panel material PM including the reinforcing fibers F.

According to the aforementioned configuration, furthermore, the apparent length to actual length ratios of the reinforcing fibers F are identical across the reinforcing fibers F oriented in the two orientation directions. The apparent shrinkage rates of the reinforcing fibers F at the process of forming the texture pattern G, which includes the plural protrusions 1, in the surface E are ore isotropic. This ensures to prevent wrinkles in the surface E from forming.

<Modification>

Figure 35:
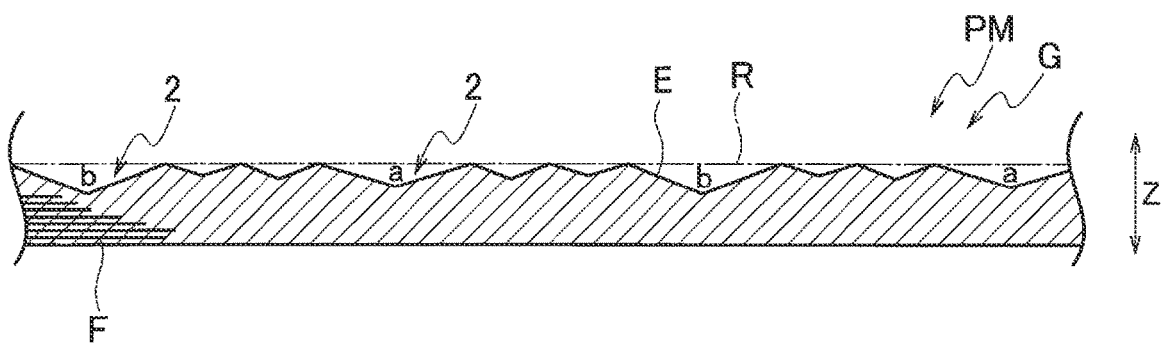
FIG. 35 is a cross-sectional view of a first modification of the eighth embodiment, corresponding to FIG. 34.
Figure 36:
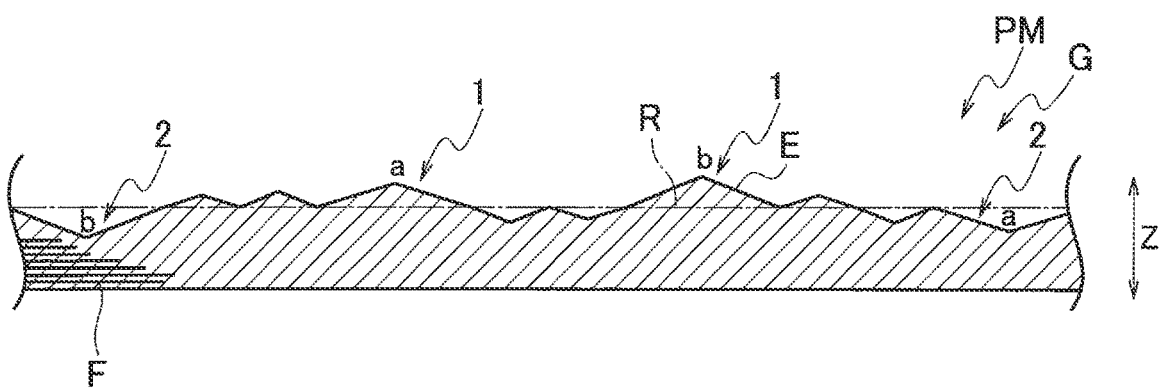
FIG. 36 is a cross-sectional view of a second modification of the eighth embodiment, corresponding to FIG. 34.

In the eighth embodiment, the plurality of protrusions 1, which protrude upward with respect to the reference plane R, are provided in the surface E. The panel material PM may be provided with a plurality of depressions 2, which are depressed downward with respect to the reference plane R, as illustrated in FIG. 35. This modification is referred to as a first modification. Alternatively, the panel material PM may be provided with both of the protrusions 1 and depressions 2 as illustrated in FIG. 36. This modification is referred to as a second modification.

The plural depressions 2 according to the first modification have the shapes of the regular square pyramids 20 with the bases 21 on the reference plane R. The plural protrusions 1 and depressions 2 according to the second modification have the shapes of the regular square pyramids 20 with the bases 21 on the reference plane R. The bases 21 of the regular square pyramids 20 are the plural congruent squares 22 that are arranged on the reference plane R with no gap or overlap so that each vertex 23 is shared by two of the squares 22 as vertices 23 thereof and is located at the midpoint 25 of one side of any square 22. Each of the two orientation directions of the reinforcing fibers F is parallel to any lateral edge 24 of each regular square pyramid 20 as seen in the Z direction. The ratios $L_6/L_5$, which are defined for the respective lines including diagonals of the squares 22, are identical across the lines $r_{ij}$. The regular square pyramid 20 of each depression 2 and the regular square pyramid 20 of each protrusion 1 have plane-symmetric shapes with respect to the reference plane R.

In the second modification, the positional relationship (the order of arrangement) between the protrusions 1 and depressions 2 is not limited. Irrespective of in which order the protrusions 1 and depressions 2 are arranged, the planar elements of each segment Sg include only symmetrical pairs, so that the symmetry of the planar elements in each segment Sg (see (F3) above) is maintained.

In the pattern element $PE_{18}$ illustrated in FIG. 33, for example, it is assumed that the regular square pyramid 20 including the lateral faces $S_{92}$ and $S_{93}$ is one of the depressions 2. In the leftmost segment Sg of the pattern element $PE_{18}$, the lateral faces $S_{92}$ and $S_{102}$ have axisymmetric shapes with respect to the central axis A of the segment Sg including the lateral faces $S_{92}$ and $S_{102}$ and constitute a symmetrical pair. In a similar manner, the lateral faces $S_{93}$ and $S_{103}$ constitute a symmetrical pair that is axisymmetric with respect to the central axis A. In such a mariner, the planar elements of each segment Sg include only symmetrical pairs irrespective of which protrusions 1 in the eighth embodiment are replaced with the depressions 2.

The uniformity of the apparent shrinkage rates in each pattern segment Sg (see (F4) above) is thereby provided irrespective of the order of arrangement of the protrusions 1 and depressions 2. The other configurations (see (F1), (F2), and (F5) to (F7) above) are the same as those of the eighth embodiment. The second modification thus provides the same effects as the eighth embodiment.

As for the first modification, the description of the eighth embodiment is incorporated in the description of the first modification by replacing the protrusions 1 with the depressions 2. The first modification thus provides the same effects as the eighth embodiment.

<Other Modification>

In the fourth to eighth embodiments and the modifications thereof the reinforcing fibers F are oriented in the two orientation directions parallel to the reference plane R, or in the X4 and X5 directions. However, the reinforcing fibers F may be oriented in any one of these two orientation directions.

In addition, the regular square pyramids 20 denoted by any one or two of the reference symbols a, b, and c according to the sixth embodiment and the modifications thereof may be identical in height.

In addition, the regular square pyramids 20 denoted by any one of the reference symbols a and b according to the fifth and eighth embodiments and the modifications thereof may have a height of 0. The regular square pyramids 20 denoted by any one or two of the reference symbols a, b, and c according to the sixth embodiment and the modifications thereof may have a height of 0. In the regions of the surface E corresponding to the regular square pyramids 20 with a height of 0, planes corresponding to the squares 22 exist at the level of the reference plane R.

The regular square pyramids 20 according to the fifth, sixth, and eighth embodiments and the modifications thereof include two or three types of regular square pyramids 20 different in height from each other. However, the number of types of the regular square pyramids 20 is not limited to two or three. The regular square pyramids 20 may include four or more types of regular square pyramids 20 different in height from each other as long as the ratios $L_4/L_3$ or $L_6/L_5$ are identical across the lines $r_{ij}$.

Ninth Embodiment

A panel material PM according to a ninth embodiment is described with reference to FIGS. 37 to 39. In the ninth embodiment, different configurations from the first embodiment are described, and the configurations including the same functions as those of the configurations already described are given the same reference numerals and are not described.

Figure 37:
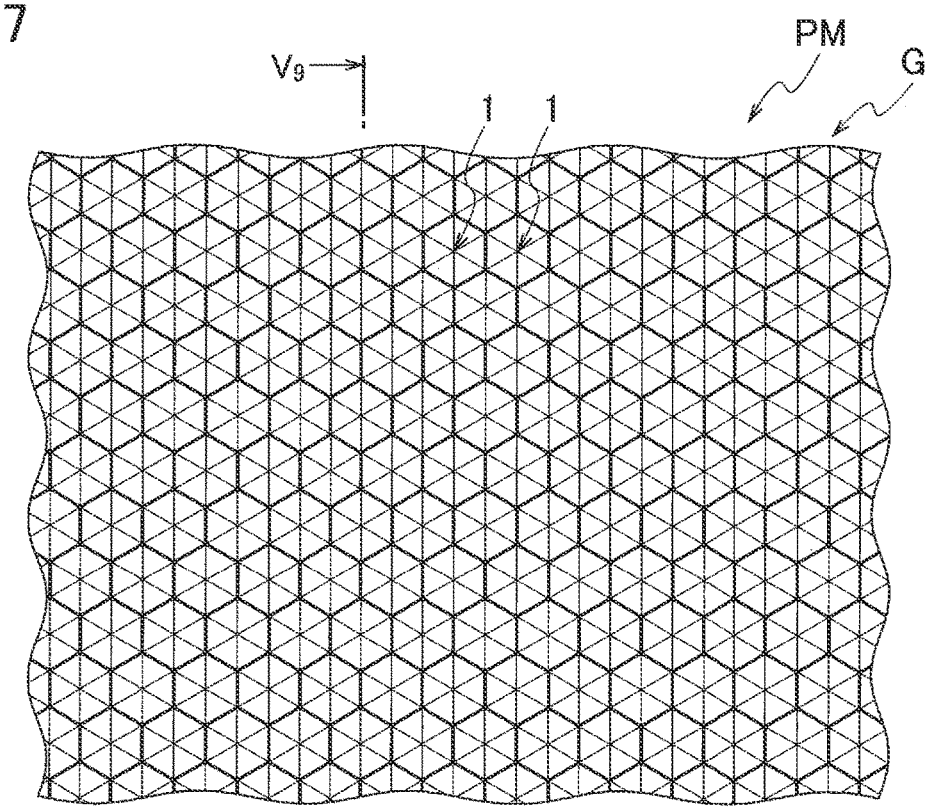
FIG. 37 is a plan view of a panel material according to a ninth embodiment.
Figure 38:
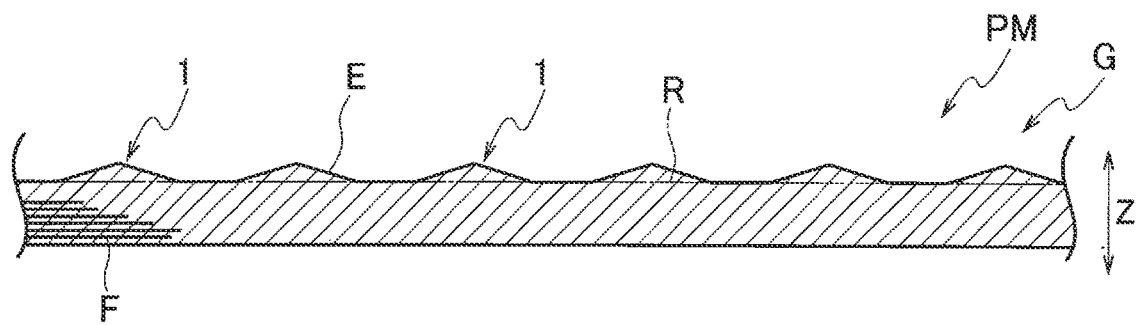
FIG. 38 is a cross-sectional view taken along a line $V_9$-$V_9$ in FIG. 37.
Figure 39:
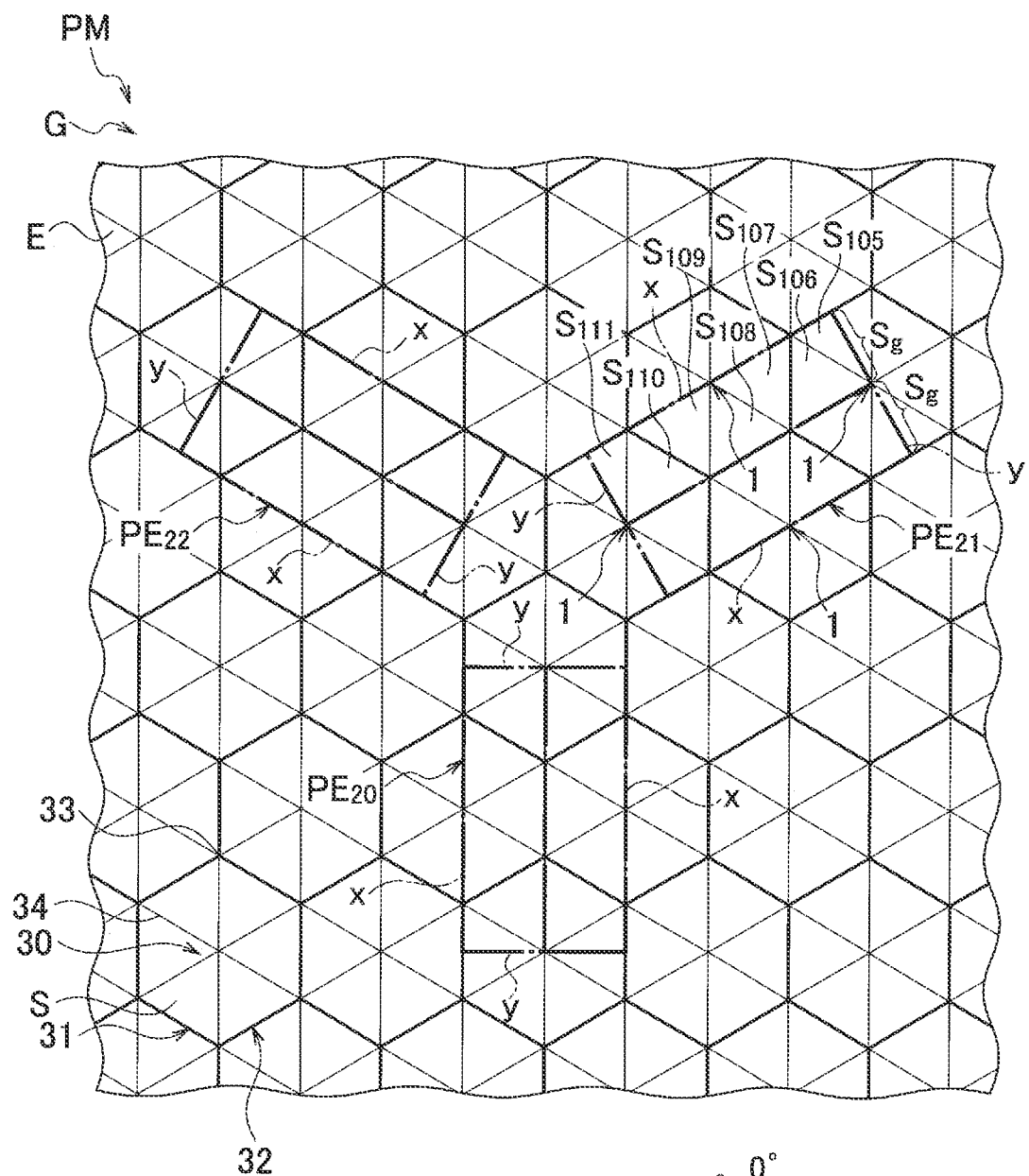
FIG. 39 is a view of main part of a texture pattern according to the ninth embodiment.
Figure 39:
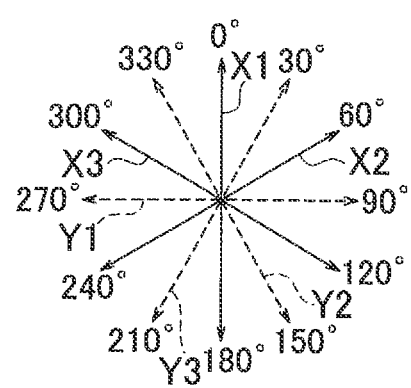

As illustrated in FIGS. 37 to 39, a plurality of protrusions 1 constituting the texture pattern G in the ninth embodiment have shapes of congruent regular hexagonal pyramids 30 with bases on the reference plane R. The bases 31 of the regular hexagonal pyramids 30 are arranged on the reference plane R with no gap or overlap so that each vertex 33 of a rectangular hexagon 32 constituting each base 31 is shared by three of the bases 31 as vertices 33 thereof.

As illustrated in FIGS. 37 and 39, each of three orientation directions (the X1, X2, and X3 directions) of the reinforcing fibers F is parallel to any lateral edge 34 of each regular hexagonal pyramid 30 as seen in the Z direction. The lateral edges 34 of each regular hexagonal pyramid 30 are lines of intersection of lateral faces S of the regular hexagonal pyramid 30.

As illustrated in FIG. 39, the texture pattern G includes pattern elements $PE_{20}$ closely arranged in the X1 and Y1 directions with the same orientation, pattern elements $PE_{21}$ closely arranged in the X2 and Y2 directions with the same orientation, or pattern elements $PE_{22}$ closely arranged in the X3 and Y3 directions with the same orientation.

(G1) Shape of Pattern Element $PE_n$

Each of the pattern elements $PE_{20}$ to $PE_{22}$ of the ninth embodiment has a rectangular shape defined by sides x parallel to any orientation direction of the reinforcing fibers F and sides y parallel to corresponding orientation perpendicular direction in a similar manner to the pattern elements $PE_1$ to $PE_3$ of the first embodiment.

(G2) Size of Pattern Element $PE_n$

The pattern elements $PE_{20}$ to $PE_{22}$ are identical in size across the three orientation directions (the X1, X2, ad X3 directions). As illustrated in FIG. 39, the length of each side x corresponds to three times the side length of each regular hexagon 32, and the length of each side y corresponds to the width of each regular hexagon 32 ($\sqrt{3}$ times the side length of each regular hexagon 32).

(G3) Symmetry of Planar Element in Each Segment Sg

As illustrated in FIG. 39, the planar elements of each segment Sg include only symmetrical pairs also in the ninth embodiment. In the upper left segment Sg of the pattern element $PE_{21}$ for example, lateral faces $S_{106}$ and $S_{109}$ have plane-symmetric shapes and constitute a symmetrical pair. In a similar manner, lateral faces $S_{107}$ and $S_{110}$ constitute a symmetrical pair, and a lateral face $S_{108}$ and lateral faces $S_{105}$ and $S_{111}$, which are considered as one lateral face, constitute a symmetrical pair.

(G4) Uniformity of Actual Length of Reinforcing Fiber F in Each Pattern Element $PE_n$ In each segment Sg, the overall actual lengths of the reinforcing fibers Fx are identical irrespective of the positions thereof in the y direction. Furthermore, the overall actual lengths of the reinforcing fibers Fx are identical across the segments Sg adjacent to each other. This is because the surface E is continuous in the y direction across the boundary between the segments Sg adjacent to each other. In other words, in each pattern element $PE_n$, the actual lengths of the reinforcing fibers Fx extending between the sides y are identical irrespective of the positions thereof in the y direction throughout the pattern element $PE_n$.

(G5) Uniformity of Apparent Length of Reinforcing Fiber F in Each Pattern Element $PE_n$ Since the pattern elements $PE_n$ are rectangular, the apparent lengths of the reinforcing fibers Fx extending between the sides y are identical irrespective of the positions thereof in the y direction in each pattern element $PE_n$.

(G6) Uniformity of Apparent Shrinkage Rate for Each Orientation Direction

The reinforcing fibers Fx that extend between the sides y in each pattern element $PE_n$ are therefore identical in ratio of apparent length to actual length irrespective of the positions thereof in the y direction. In the entire texture pattern G, therefore, the apparent shrinkage rates of the reinforcing fibers F in the X1 direction are identical irrespective of the positions thereof in the Y1 direction; the apparent shrinkage rates of the reinforcing fibers F in the X2 direction are identical irrespective of the positions thereof in the Y2 direction; and the apparent shrinkage rates of the reinforcing fibers F in the X3 direction are identical irrespective of the positions thereof in the Y3 direction. This means that the apparent shrinkage rates of the reinforcing fibers F in each orientation direction are identical irrespective of which sections of each protrusion 1 the reinforcing fibers F pass through.

(G7) Commonality of Actual Length of Reinforcing Fiber F Across Pattern Elements $PE_n$ Next, the actual lengths of the reinforcing fibers F oriented in each orientation direction are compared against those of the reinforcing fibers F oriented in the other orientation directions, or the actual lengths of the reinforcing fibers Fx in each patter element $PE_n$ are compared against those in the other pattern elements $PE_n$. For example, the actual length of each reinforcing fiber Fx in the pattern element $PE_{21}$ is the sum of two lateral edges 34 of the regular hexagonal pyramids 30 and the side length of each regular hexagon 32 constituting any base 31 as calculated from the length of part corresponding to one side x on the line of intersection of the surface F and any plane P in the pattern element $PE_{21}$. The same applies to the actual lengths of the reinforcing fibers Fx in the pattern elements $PE_{20}$ and $PE_{22}$. The actual lengths of the reinforcing fibers Fx are therefore identical across the pattern elements $PE_n$.

(G8) Commonality of Apparent Length of Reinforcing Fiber F Across Pattern Element $PE_n$ Since the pattern elements $PE_{20}$, $PE_{21}$, and $PE_{22}$ are identical in shape and size as described above, the apparent lengths of the reinforcing fibers Fx are identical across the pattern elements $PE_n$.

(G9) Isotropy of Apparent Shrinkage Rate of Reinforcing Fiber F

The apparent length to actual length ratios of the reinforcing fibers F are identical across the reinforcing fibers F oriented in the different orientation directions. The apparent shrinkage rates of the reinforcing fibers F in the planar directions at the process of forming the texture pattern G in the surface E are thus isotropic.

In the ninth embodiment, in the surface E of the panel material PM including the reinforcing fibers F oriented in the predetermined three orientation directions, the plurality of protrusions 1, which protrude upward with respect to the reference plane R along the surface E, are provided. The protrusions 1 have the shapes of the congruent regular hexagonal pyramids 30 with the bases 31 on the reference plane R. The bases 31 of the regular hexagonal pyramids 30 are arranged on the reference plane R with no overlap or gap so that each vertex 33 of the regular hexagon 32 constituting each base 31 is shared by three of the bases 31 as vertices 33 thereof. Each of the three orientation directions of the reinforcing fibers F is parallel to any lateral edge 34 of each regular hexagonal pyramid 30 as seen in the Z direction.

According to this configuration, as described above, the apparent length to actual length ratios of the reinforcing fibers F are identical irrespective of which sections of each protrusion 1 the reinforcing fibers F pass through. This prevents irregularities of positions of the edges of the panel material PM and wrinkles in the surface E from forming at the process of forming the protrusions 1 in the surface E of the panel material PM including the reinforcing fibers F.

According to the aforementioned configuration, furthermore, the apparent length to actual length ratios of the reinforcing fibers F are identical across the reinforcing fibers F oriented in the three orientation directions. The apparent shrinkage rates of the reinforcing fibers F at the process of forming the texture pattern G, which includes the plural protrusions 1 in the surface E, are therefore isotropic. This ensures to prevent wrinkles in the surface E from forming.

According to the aforementioned configuration, each protrusion 1 is provided with six lateral edges. The number of lateral edges of each protrusion 1 of the ninth embodiment is greater than that of the aforementioned embodiments and modifications thereof, which is three or four. If the projected area of each protrusion 1 of the ninth embodiment is the same as that of the aforementioned embodiments and modifications thereof as seen in the Z direction, employing the configuration of the ninth embodiment increases the density of lateral edges (the number of lateral edges per unit area of the surface E), thereby improving the surface stiffness of the panel material PM or shifting the resonance frequency to a higher frequency.

<Modification>

Figure 40:
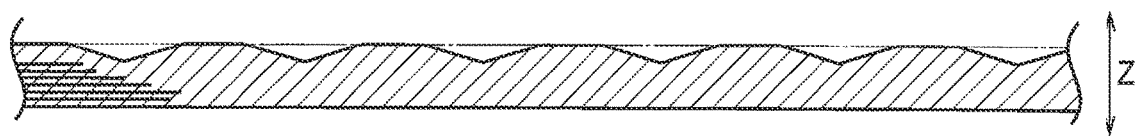
FIG. 40 is a cross-sectional view of a first modification of the ninth embodiment, corresponding to FIG. 38.
Figure 41:
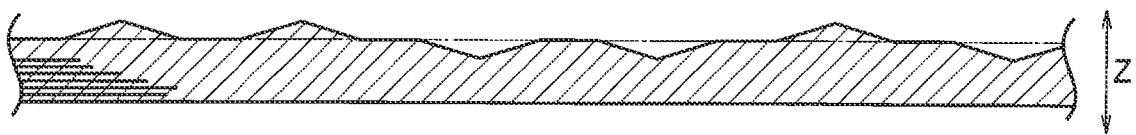
FIG. 41 is a cross-sectional view of a second modification of the ninth embodiment, corresponding to FIG. 38.

In the ninth embodiment, the plurality of protrusions 1, which protrude upward with respect to the reference plane R, are provided in the surface E. The panel material PM may be provided with a plurality of depressions 2, which are depressed downward with respect to the reference plane R as illustrated in FIG. 40. This modification is referred to as a first modification. Alternatively, the panel material PM may be provided with both of the protrusions 1 and depressions 2 as illustrated in FIG. 41. This modification is referred to as a second modification.

The plural depressions 2 according to the first modification have the shapes of the congruent regular hexagonal pyramids 30 with the bases 31 on the reference plane R. The plural protrusions 1 and depressions 2 according to the second modification have the shapes of the congruent regular hexagonal pyramids 30 with the bases 31 on the reference plane R. The bases 31 of the regular hexagonal pyramids 30 are arranged on the reference plane R with no gap or overlap so that each vertex 33 of the regular hexagon 32 constituting each base 31 is shared by three of the bases 31 as vertices 33 thereof. Each of the three orientation directions of the reinforcing fibers F is parallel to any lateral edge 34 of each regular hexagonal pyramid 30 as seen in the Z direction. The regular hexagonal pyramid 30 of each depression 2 and the regular hexagonal pyramid 30 of each protrusion 1 have plane-symmetric shapes with respect to the reference plane R.

In the second modification, the positional relationship (the order of arrangement) between the protrusions 1 and depressions 2 is not limited. Irrespective of in which order the protrusions 1 and depressions 2 are arranged, the planar elements of each segment Sg include only symmetrical pairs, so that the symmetry of the planar elements in each segment Sg (see (G3) above) is maintained.

In the pattern element $PE_{21}$ illustrated in FIG. 39, for example, it is assumed that the regular hexagonal pyramid 30 including the lateral faces $S_{107}$, $S_{108}$, and $S_{109}$ is one of the depressions 2. In the upper left segment Sg, of the pattern element $PE_{21}$, the lateral faces $S_{107}$ and $S_{110}$ have axisymmetric shapes with respect to the central axis A of the segment Sg including the lateral faces $S_{107}$ and $S_{110}$ and constitute a symmetrical pair. In a similar manner, the lateral faces $S_{106}$ and $S_{109}$ constitute a symmetrical pair which is axisymmetric with respect to the central axis A, and the lateral face $S_{108}$ and lateral faces $S_{105}$ and $S_{111}$, which are considered as one lateral face, constitute a symmetrical pair. In such a manner, the planar elements of each segment Sg include only symmetrical pairs irrespective of which protrusions 1 in the ninth embodiment are replaced with the depressions 2.

The uniformity of the actual lengths of the reinforcing fibers F in each pattern element $PE_n$ (see (G4) above) is maintained irrespective of the order of arrangement of the protrusions 1 and depressions 2. The other configurations (see (G1), (G2), and (G5) to (G9) above) are the same as those of the ninth embodiment. The second modification therefore provides the same effects as the ninth embodiment.

As for the first modification, the description of the ninth embodiment is incorporated in the description of the first modification by replacing the protrusions 1 with the depressions 2. The first modification thus provides the same effects as the ninth embodiment.

10th Embodiment

A panel material PM according to a 10th embodiment is described with reference to FIGS. 42 to 44. In the 10th embodiment, different configurations from the ninth embodiment are described, and the configurations including the same functions as those of the configurations already described are given the same reference numerals and are not described.

Figure 42:
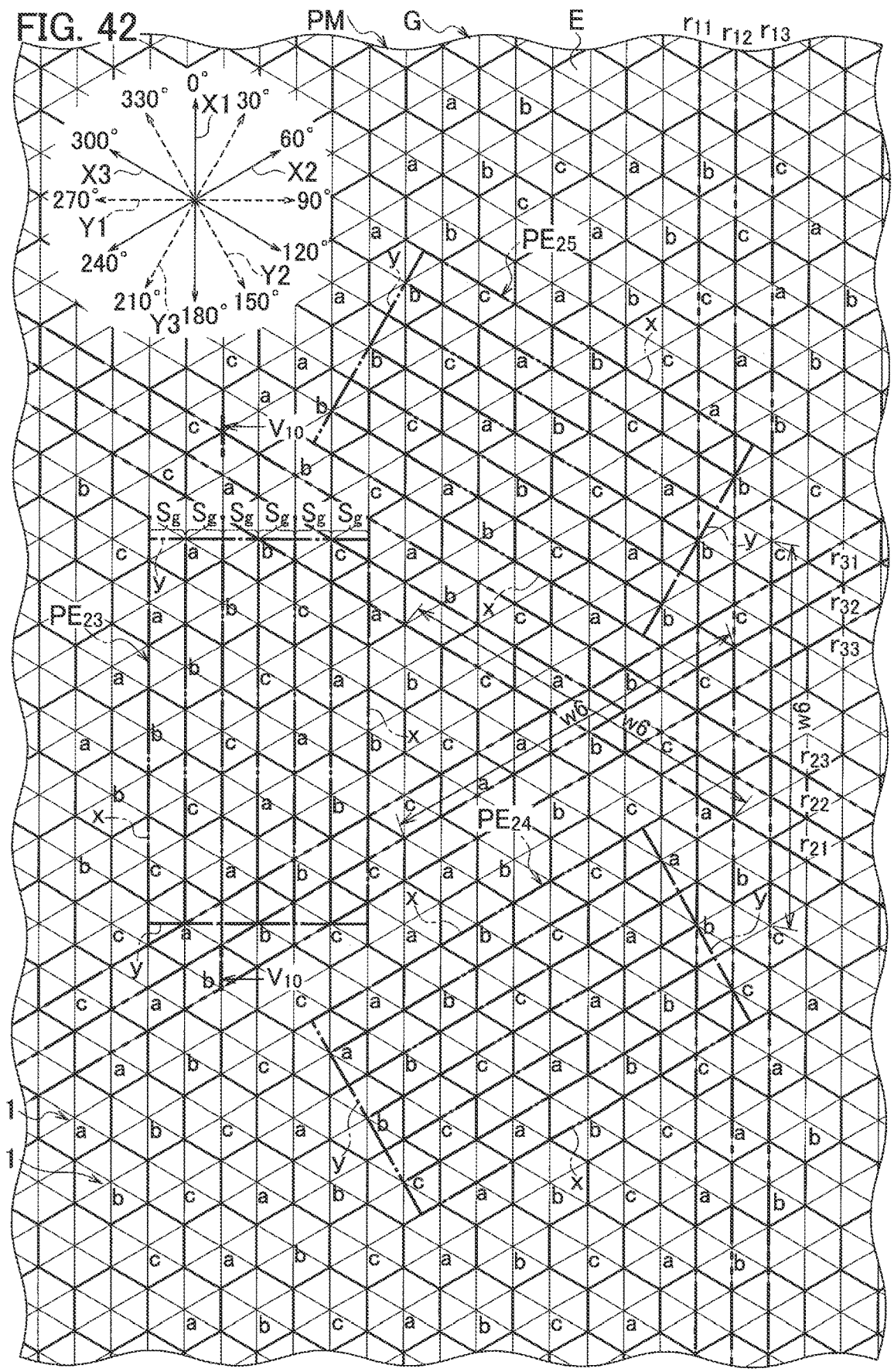
FIG. 42 is a view of main part of a texture pattern according to a 10th embodiment.
Figure 43:
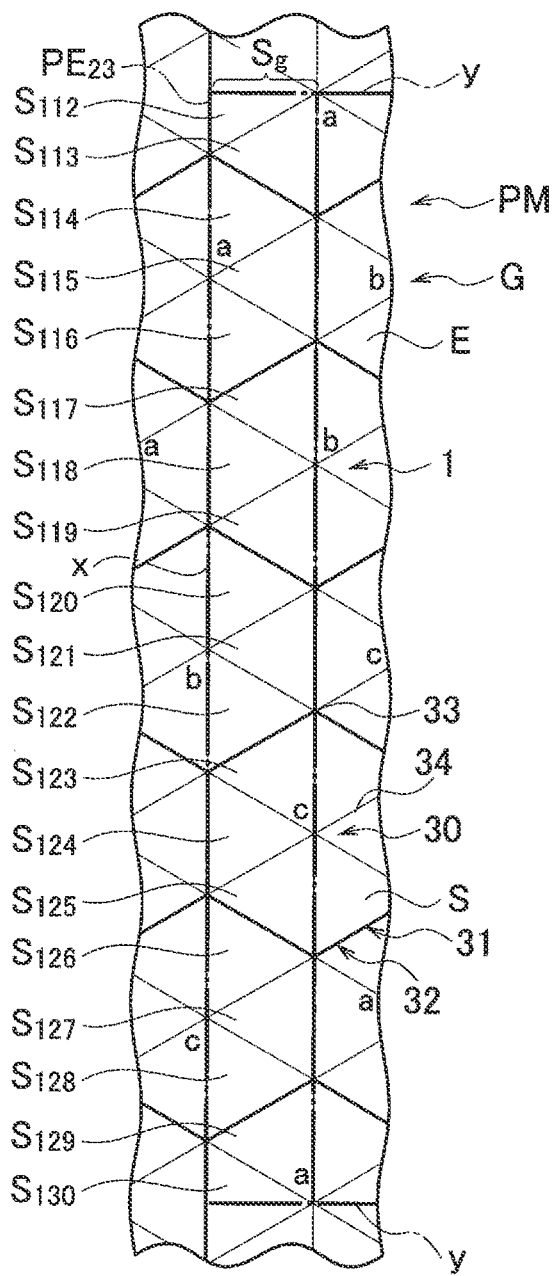
FIG. 43 is an enlarged view of main part of the texture pattern in FIG. 42.
Figure 43:
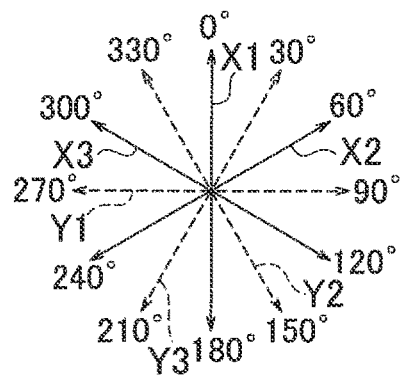
Figure 44:
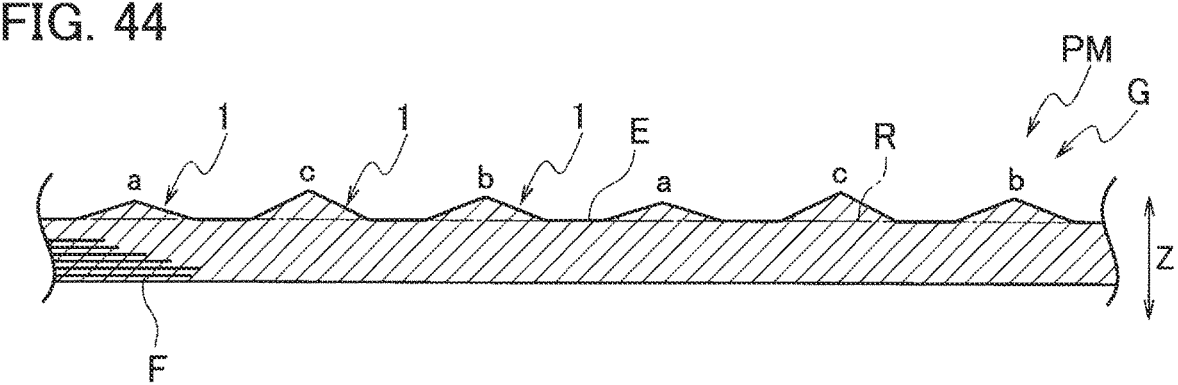
FIG. 44 is a cross-sectional view taken along a line $V_{10}$-$V_{10}$ in FIG. 42.

In the 10th embodiment, a plurality of protrusions 1 constituting the texture pattern G have shapes of regular hexagonal pyramids 30 with bases 31 on the reference plane R as illustrated in FIGS. 42 to 44. The bases 31 of the regular hexagonal pyramids 30 are plural congruent regular hexagons 32 that are arranged on the reference plane R with no gap or overlap so that each vertex 33 is shared by three of the regular hexagons 32 as vertices 33 thereof. The regular hexagonal pyramids 30 are not identical in height.

In the 10th embodiment, ratios $L_8/L_7$, which are defined for respective lines (i is not less than 1 and not greater than 3; and j is an integer) including diagonals of the regular hexagons 32 that pass through the centers thereof, are identical across the lines $r_{ij}$. Herein, $L_7$ is the length of each section w6 corresponding to the core in the X1, X2, or X3 direction in the texture pattern G, on the line of intersection of the surface E and a plane that includes the corresponding line $r_{ij}$ and is parallel to the Z direction. $L_7$ is substantially equal to the actual length of a reinforcing fiber F extending along the section w6 near the surface E in the section w6. $L_8$ is the apparent length of the section w6 as seen in the Z direction, which is equal to the length of one side x of each pattern element $PE_n$. $L_8$ is also substantially equal to the apparent length of the reinforcing fiber F extending along the section w6 near the suffice E in the section w6. The i values of the line $r_{ij}$ correspond to the respective orientation directions. The lines $r_{ij}$ with the same i value are parallel to each other. Specifically, the lines $r_{ij}$ include lines $r_{11}$ to $r_{13}$, $r_{21}$ to $r_{23}$, and $r_{31}$ to $r_{33}$ illustrated in FIG. 42. The lines $r_{ij}$ with j values of not greater than 0 and not less than 4 are not illustrated.

FIGS. 42 to 44 illustrate an example in which the ratios $L_8/L_7$ are identical across the lines $r_{ij}$. In these drawings, the regular hexagonal pyramids 30 given a same alphabetic character are identical in height (or distance from the apex of each regular hexagonal pyramid 30 to the base 31 on the reference plane R in the Z direction). The relationships among the height of the regular hexagonal pyramids 30 given a reference symbol a, the height of the regular hexagonal pyramids 30 given a reference symbol b, and the height of the regular hexagonal pyramids 30 given a reference symbol c are not limited and can be set arbitrarily.

(H1) Shape of Pattern Element $PE_n$

Each of the pattern elements $PE_{23}$ to $PE_{25}$ of the 10th embodiment has a rectangular shape defined by sides x parallel to any orientation direction of the reinforcing fibers F and sides y parallel to the corresponding orientation perpendicular direction in a similar manner to the pattern elements $PE_{20}$ to $PE_{22}$ of the ninth embodiment.

(H2) Size of Pattern Element $PE_n$

The pattern elements $PE_{23}$ and $PE_{25}$ are identical in size across the three orientation directions (the X1, X2, and X3 directions). As illustrated in FIGS. 42 and 43, the length of each side x corresponds to nine times the side length of each regular hexagon 32, and the length of each side y corresponds to three times the width of each regular hexagon 32 ($3\sqrt{3}$ times the side length of each regular hexagon 32).

(H3) Symmetry of Planar Element in Each Segment Sg

As illustrated in FIGS. 42 and 43, the planar elements of each segment Sg include only symmetrical pairs also in the 10th embodiment. In the leftmost segment Sg of the pattern element $PE_{23}$, for example, lateral faces $S_{113}$ and $S_{116}$ have plane-symmetric shapes and constitute a symmetrical pair. In a similar manner, lateral faces $S_{114}$ and $S_{129}$, lateral faces $S_{117}$ and $S_{120}$, lateral faces $S_{118}$ and $S_{121}$, lateral faces $S_{119}$ and $S_{122}$, lateral faces $S_{123}$ and $S_{126}$, lateral faces $S_{124}$ and $S_{127}$, and lateral faces $S_{125}$ and $S_{128}$ constitute symmetrical pairs. In addition, lateral face $S_{115}$ and lateral faces $S_{112}$ and $S_{130}$, which are considered as one lateral face, constitute a symmetrical pair.

(H4) Uniformity of Apparent Shrinkage Rate in Each Segment Sg

In each segment Sg, the overall actual lengths of the reinforcing fibers Fx are identical irrespective of the positions thereof in the y direction. Furthermore, the pattern elements $PE_n$ are rectangular, and the segments Sg are also rectangular. In each segment Sg, the apparent lengths of the reinforcing fibers Fx extending between the sides y are identical irrespective of the positions thereof in the y direction. In each segment Sg, the reinforcing fibers Fx extending between the sides y are therefore identical in ratio of apparent length to actual length irrespective of the positions thereof in the y direction.

(H5) Uniformity of Apparent Shrinkage Rate in Each Pattern Element $PE_n$

Since the ratios $L_8/L_7$ are identical across the lines $r_{ij}$, the apparent length to actual length ratios of the reinforcing fibers Fx extending between the sides y are also identical on the boundaries between the segments Sg. In each pattern element $PE_n$, the apparent length to actual length ratios of the reinforcing fibers Fx extending between the sides y are also identical irrespective of the positions thereof in the y direction throughout the pattern element $PE_n$.

(H6) Uniformity of Apparent Shrinkage Rate for Each Orientation Direction

In the entire texture pattern G, therefore, the apparent shrinkage rates of the reinforcing fibers F in the X1 direction are identical irrespective of the positions thereof in the Y1 direction; the apparent shrinkage rates in the X2 direction are identical irrespective of the positions thereof in the Y2 direction; and the apparent shrinkage rates in the X3 direction are identical irrespective of the positions thereof in the Y3 direction. This means that the apparent shrinkage rates of the reinforcing fibers F oriented in each orientation direction are identical irrespective of which sections of each protrusion 1 the reinforcing fibers F pass through.

(H7) Isotropy of Apparent Shrinkage Rate of Reinforcing Fibers F

Since the ratios $L_8/L_7$ are identical across the lines $r_{1j}$, $r_{2j}$, and $r_{3j}$ (j is an integer), the apparent length to actual length ratios of the reinforcing fibers F are identical across the reinforcing fibers F oriented in the different orientation directions. The apparent shrinkage rates of the reinforcing fibers F in planar directions at the process of forming the texture pattern G in the surface E are therefore isotropic.

In the 10th embodiment, in the surface E of the panel material PM including the reinforcing fibers F oriented in predetermined three orientation directions, the plurality of protrusions 1, which protrude upward with respect to the reference plane R along the surface E, are provided. The protrusions 1 have the shapes of the regular hexagonal pyramids 30 with the bases 31 on the reference plane R. The bases 31 of the regular hexagonal pyramids 30 are the plural congruent regular hexagons 32 that are arranged on the reference plane R with no gap or overlap so that each vertex 33 is shared by three of the regular hexagons 32 as vertices 33 thereof. Each of the three orientation directions of the reinforcing fibers F is parallel to any lateral edge 34 of each regular hexagonal pyramid 30 as seen in the Z direction. Furthermore, the ratios $L_8/L_7$, which are defined for the respective lines $r_{ij}$ including the diagonals of the regular hexagons 32 that pass through the centers thereof, are identical across the lines $r_{ij}$.

According to this configuration, as described above, the apparent length to actual length ratios of the reinforcing fibers F are identical irrespective of which sections of each protrusion 1 the reinforcing fibers F pass through. This prevents irregularities of positions of edges and wrinkles in the surface E from forming in the panel material PM at the process of forming the protrusions 1 in the surface E of the panel material PM including the reinforcing fibers F.

According to the aforementioned configuration, furthermore, the apparent length to actual length ratios of the reinforcing fibers F are identical across the reinforcing fibers F oriented in the three orientation directions. The apparent shrinkage rates of the reinforcing fibers F at the process of forming the texture pattern G, which includes the plural protrusions 1, in the surface F are therefore isotropic. This ensures to prevent wrinkles in the surface E from forming.

<Modification>

Figure 45:
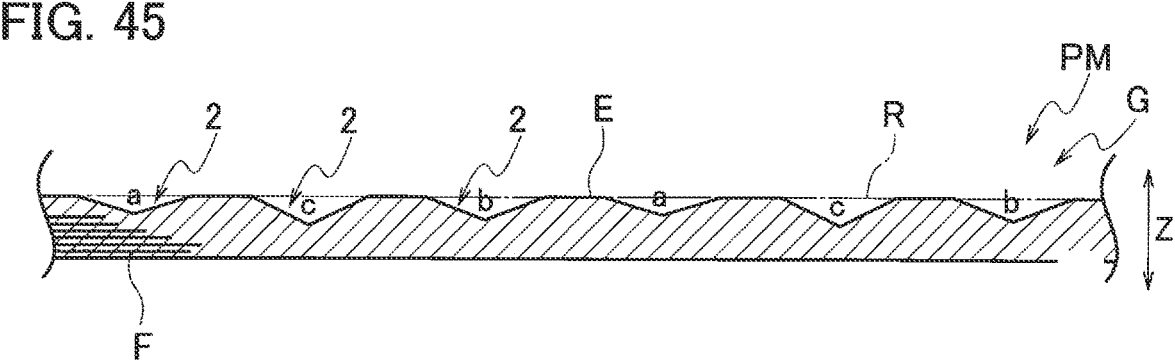
FIG. 45 is a cross-sectional view of a first modification of the 10th embodiment, corresponding to FIG. 44.
Figure 46:
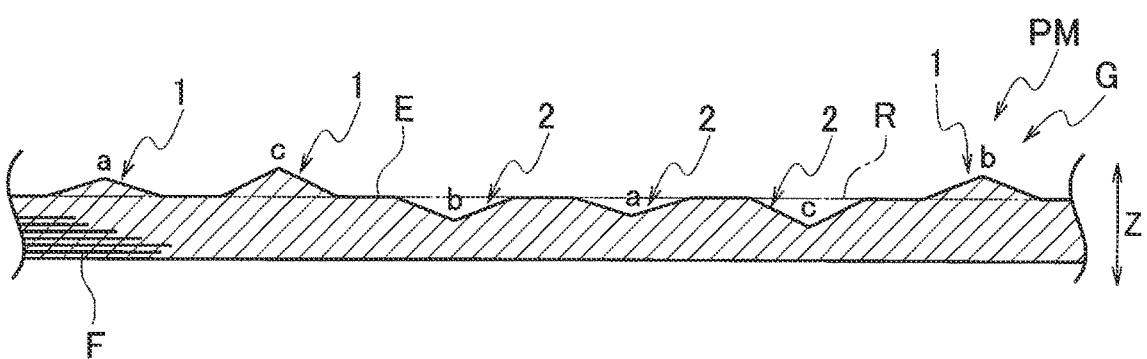
FIG. 46 is a cross-sectional view of a second modification of the 10th embodiment, corresponding to FIG. 44.

In the 10th embodiment, the plurality of protrusions 1, which protrude upward with respect to the reference plane R, are provided in the surface E. The panel material PM may be provided with a plurality of depressions 2, which are depressed downward with respect to the reference plane R, as illustrated in FIG. 45. This modification is referred to as a first modification. Alternatively, the panel material PM may be provided with both of the protrusions 1 and depressions 2 as illustrated in FIG. 46. This modification is referred to as a second modification.

The plural depressions 2 according to the first modification have the shapes of the congruent regular hexagonal pyramids 30 with the bases 31 on the reference plane R. The plural protrusions 1 and depressions 2 according to the second modification have the shapes of the regular hexagonal pyramids 30 with the bases 31 on the reference plane R. The bases 31 of the regular hexagonal pyramids 30 are the plural congruent regular hexagons 32 that are arranged on the reference plane R with no gap or overlap so that each vertex 33 is shared by three of the regular hexagons 32 as vertices 33 thereof. Each of the three orientation directions of the reinforcing fibers F is parallel to any lateral edge 34 of each regular hexagonal pyramid 30 as seen in the Z direction. The ratios $L_8/L_7$, which are defined for the respective lines including the diagonals of the regular hexagons 32 that pass through the centers thereof, are identical across the lines $r_{ij}$. The regular hexagonal pyramid 30 of each depression 2 and the regular hexagonal pyramid 30 of each protrusion 1 have plane-symmetric shapes with respect to the reference plane R.

In the second modification, the positional relationship (the order of arrangement) between the protrusions 1 and depressions 2 is not limited. Irrespective of in which order the protrusions 1 and depressions 2 are arranged, the planar elements of each segment Sg include only symmetrical pairs, so that the symmetry of the planar elements in each segment Sg (see (H3) above) is maintained.

In the pattern element $PE_{23}$ illustrated in FIG. 43, for example, it is assumed that the regular hexagonal pyramid 30 including the lateral faces $S_{117}$, $S_{118}$, and $S_{119}$ is one of the depressions 2. In the leftmost segment Sg of the pattern element $PE_{23}$, the lateral faces $S_{117}$ and $S_{120}$ have axisymmetric shapes with respect to the central axis A of the segment Sg including the lateral faces $S_{117}$ and $S_{120}$ and constitute a symmetrical pair. In a similar manner, the lateral faces $S_{118}$ and $S_{121}$ and lateral faces $S_{119}$ and $S_{122}$ constitute symmetrical pairs that are each axisymmetric with respect to the central axis A. In such a manner, the planar elements of each segment Sg include only symmetrical pairs irrespective of which protrusions I in the 10th embodiment are replaced with the depressions 2.

The uniformity of the apparent shrinkage rates in each pattern segment Sg (see (H4) above) is thereby provided irrespective of the order of arrangement of the protrusions 1 and depressions 2. The other configurations (see (H1), (H2), and (H5) to (H7) above) are the same as those of the 10th embodiment. The second modification thus provides the same effects as the 10th embodiment.

As for the first modification, the description of the 10th embodiment is incorporated in the description of the first modification by replacing the protrusions 1 with the depressions 2. The first modification thus provides the same effects as the 10th embodiment.

<Other Modification>

In the ninth and 10th embodiments and the modifications thereof, the reinforcing fibers F are oriented in the three orientation directions parallel to the reference plane R, or in the X1, X2, and X3 directions. However, the reinforcing fibers F may be oriented in any one or two of these three orientation directions.

The regular hexagonal pyramids 30 denoted by any two of the reference symbols a, b, and c according to the 10th embodiments and the modifications thereof may be identical in height.

In addition, the regular hexagonal pyramids 30 denoted by any one or two of the reference symbols a, b, and c according to the 10th embodiment and the modifications thereof may have a height of 0. In the regions of the surface E corresponding to the regular hexagonal pyramids 30 with a height of 0, regular hexagonal planes exist at the level of the reference plane R.

The regular hexagonal pyramids 30 according to the 10th embodiment and the modifications thereof include three types of regular hexagonal pyramids 30 different in height from each other. However, the number of types of the regular hexagonal pyramids 30 is not limited to three. The regular hexagonal pyramids 30 may include two or four or more types of regular hexagonal pyramids 30 different in height from each other as long as the ratios $L_8/L_7$ are identical across the lines $r_{ij}$.

11th Embodiment

A panel material PM according to an 11th embodiment is described with reference to FIGS. 47 to 49. In the 11th embodiment, different configurations from the ninth embodiment are described, and the configurations including the same functions as those of the configurations already described are given the same reference numerals and are not described.

Figure 47:
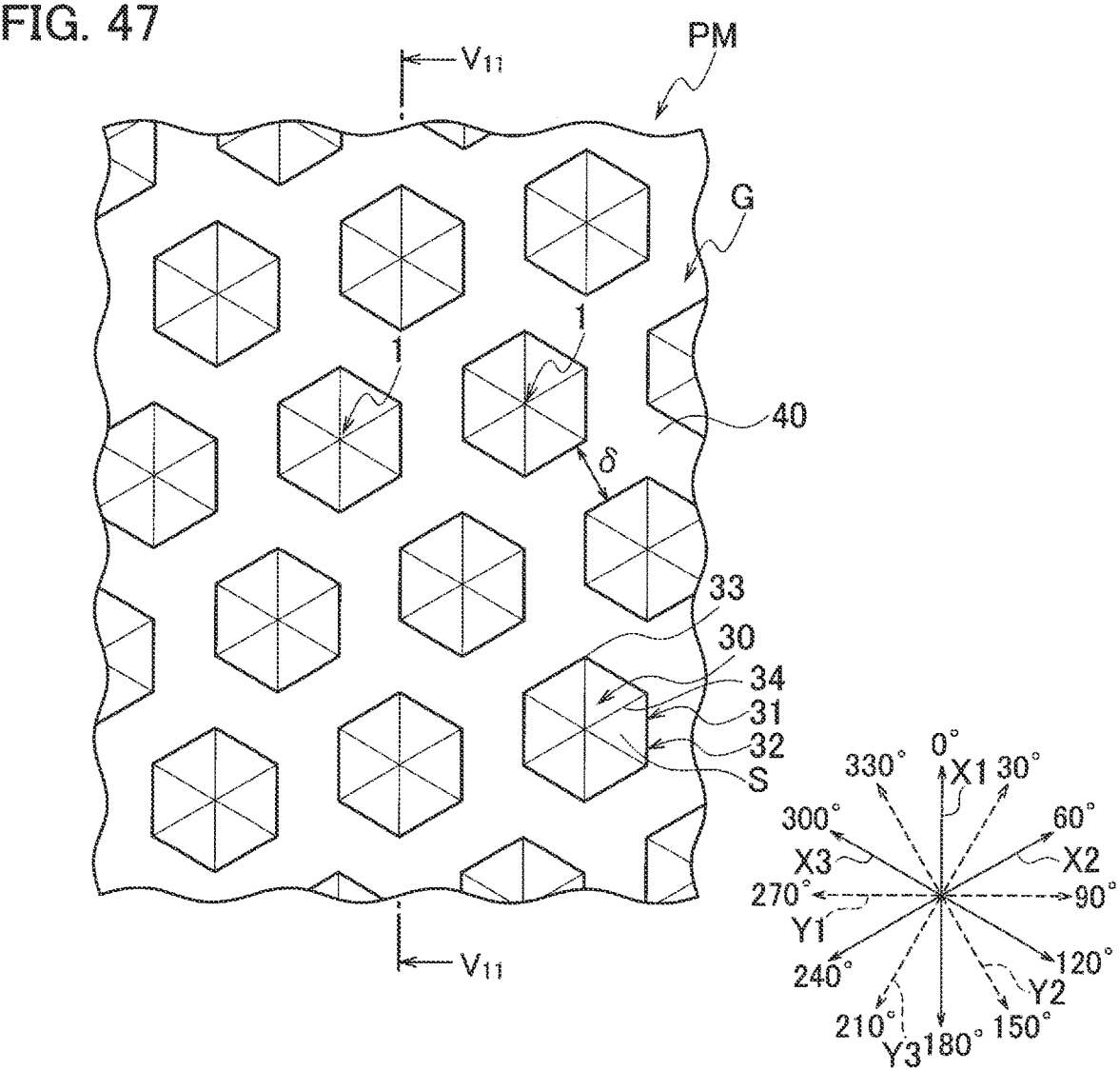
FIG. 47 is a plan view of a panel material according to an 11th embodiment.
Figure 48:
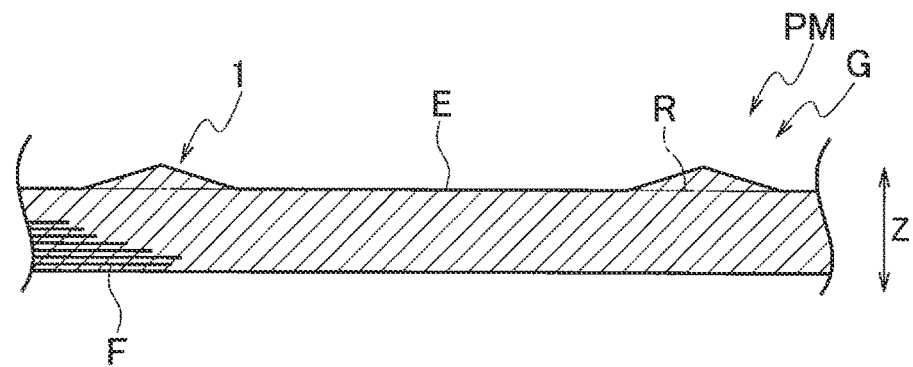
FIG. 48 is a cross-sectional view taken along a line $V_{11}$-$V_{11}$ in FIG. 47.
Figure 49:
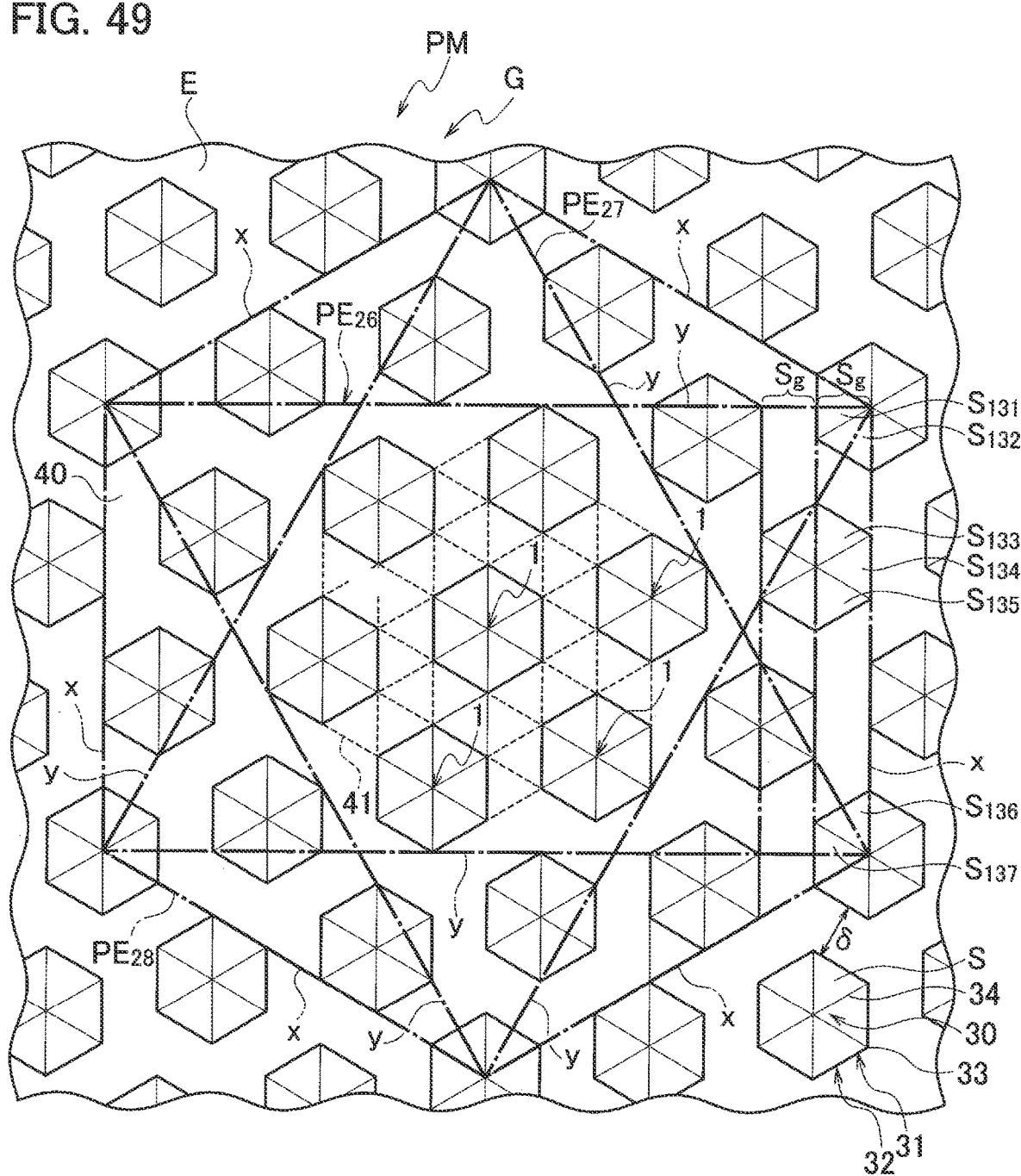
FIG. 49 is an enlarged view of main part of the texture pattern in FIG. 47.
Figure 49:
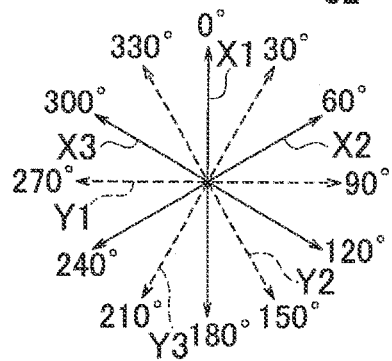

In the 11th embodiment, a plurality of protrusions 1 constituting the texture pattern G have shapes of congruent regular hexagonal pyramids 30 with bases 31 on the reference plane R as illustrated in FIGS. 47 to 49. The bases 31 of the regular hexagonal pyramids 30 are arranged on the reference plane R so that each side of each base 31 is parallel to the closest side of any adjacent base 31, leaving a predetermined distance δ therebetween.

As illustrated in FIG. 49, a hollow region 40 formed between the bases 31 on the reference plane R has a shape that can be covered with plural congruent equilateral triangles 41 arranged with no gap or overlap. The side length of each equilateral triangle 41 is equal to the side length of each regular hexagon 32, which constitutes the base 31 of any regular hexagonal pyramid 30. The height of each equilateral triangle 41 is equal to the predetermined distance 6. The height of each equilateral triangle 41 is equal to $\sqrt{3}/2$ times the side length of the equilateral triangle 41.

As illustrated in FIGS. 47 and 49, the three orientation directions (the X1, X2, and X3 directions) of the reinforcing fibers F are parallel to any lateral edge 34 of each regular hexagonal pyramid 30 as seen in the Z direction.

As illustrated in FIG. 49, the texture pattern G includes pattern elements $PE_{26}$ closely arranged in the X1 and Y1 directions with the same orientation; pattern elements $PE_{27}$ closely arranged in the X2 and Y2 directions with the same orientation; or pattern elements $PE_{28}$ closely arranged in the X3 and Y3 directions with the same orientation.

(I1) Shape of Pattern Element $PE_n$

Each of the pattern elements $PE_{26}$ to $PE_{28}$ of the 11th embodiment has a rectangular shape defined by sides x parallel to any orientation direction of the reinforcing fibers F and sides y parallel to the corresponding orientation perpendicular direction in a similar manner to the pattern elements $PE_{20}$ to $PE_{22}$ of the ninth embodiment.

(I2) Size of Pattern Element $PE_n$

The pattern elements $PE_{26}$ to $PE_{28}$ are identical in size across the three orientation directions (the X1, X2, and X3 directions). As illustrated in FIG. 49, the length of each side x corresponds to seven times the side length of each regular hexagon 32, and the length of each side y corresponds to seven times the width of each regular hexagon 32 ($7\sqrt{3}$ times the side length of each regular hexagon 32).

(I3) Symmetry of Planar Elements in Each Segment Sg

As illustrated in FIG. 49, the planar elements of each segment Sg include only symmetrical pairs also in the 11th embodiment. In the rightmost segment Sg of the pattern element $PE_{26}$, for example, lateral faces $S_{132}$ and $S_{135}$ have plane-symmetric shapes and constitute a symmetrical pair. In a similar manner, lateral faces $S_{133}$ and $S_{136}$ constitute a symmetrical pair, and lateral face $S_{134}$ and lateral faces $S_{131}$ and $S_{137}$, which are considered as one lateral face, constitute a symmetrical pair.

(I4) Uniformity of Actual Length of Reinforcing Fiber F in Each Pattern Element $PE_n$ The overall actual lengths of the reinforcing fibers Fx in each segment Sg are therefore identical irrespective of the positions thereof in the y direction. Furthermore, the actual overall lengths of the reinforcing fibers Fx are identical across the segments Sg adjacent to each other. This is because the surface E is continuous in the y direction across the boundary between the segments Sg adjacent to each other. In other words, in each pattern element $PE_n$, the actual lengths of the reinforcing fibers Fx extending between the sides y are identical irrespective of the positions thereof in the y direction throughout the pattern element $PE_n$.

(I5) Uniformity of Apparent Length of Reinforcing Fiber F in Each Pattern Element $PE_n$ Since the pattern elements $PE_n$ are rectangular, in each pattern element $PE_n$, the apparent lengths of the reinforcing fibers Fx extending between the sides y are identical irrespective of the positions thereof in the y direction.

(I6) Uniformity of Apparent Shrinkage Rate for Each Orientation Direction

The reinforcing fibers Fx extending between the sides y in each pattern element $PE_n$ are therefore identical in ratio of apparent length to actual length irrespective of the positions thereof in the y direction. In the entire texture pattern G, therefore, the apparent shrinkage rates of the reinforcing fibers F in the X1 direction are identical irrespective of the positions thereof in the Y1 direction; the apparent shrinkage rates in the X2 direction are identical irrespective of the positions thereof in the Y2 direction; and the apparent shrinkage rates in the X3 direction are identical irrespective of the positions thereof in the Y3 direction. This means that the apparent shrinkage rates of the reinforcing fibers F in each orientation direction are identical irrespective of which sections of each protrusion 1 the reinforcing fibers F pass through.

(I7) Commonality of Actual Length of Reinforcing Fiber F Across Pattern Element $PE_n$ Next, the actual lengths of the reinforcing fibers F oriented in each orientation direction are compared against those of the reinforcing fibers F oriented in the other orientation directions, or the actual lengths of the reinforcing fibers Fx in each patter element $PE_n$ are compared against those in the other pattern elements $PE_n$. For example, the actual length of each reinforcing fiber Fx in the pattern element $PE_{26}$ is the sum of two lateral edges 34 of the regular hexagonal pyramids 30 and five times the side length of each regular hexagon 32 constituting any base 31 as calculated from the length of part corresponding to one side x on the line of intersection of the surface E and any plane P in the pattern element $PE_{26}$. The same applies to the actual lengths of the reinforcing fibers Fx in the pattern elements $PE_{27}$ and $PE_{28}$. The actual lengths of the reinforcing fibers Fx are therefore identical across the pattern elements $PE_n$.

(I8) Commonality of Apparent Length of Reinforcing Fiber F Across Pattern Element $PE_n$ Since the pattern elements $PE_{26}$, $PE_{27}$, and $PE_{28}$ are identical in shape and size as described above, the apparent lengths of the reinforcing fibers Fx are identical across the pattern elements $PE_n$.

(I9) Isotropy of Apparent Shrinkage Rate of Reinforcing Fiber F

The apparent length to actual length ratios of the reinforcing fibers F are therefore identical across the reinforcing fibers F oriented in the different orientation directions. The apparent shrinkage rates of the reinforcing fibers F in the planar directions at the process of forming the texture pattern G in the surface E are thus isotropic.

In the 11th embodiment, in the surface E of the panel material PM including the reinforcing fibers F oriented in the predetermined three orientation directions, the plurality of protrusions 1, which protrude upward with respect to the reference plane R along the surface E, are provided. The protrusions 1 have the shapes of the congruent regular hexagonal pyramids 30 with the bases 31 on the reference plane R. The bases 31 of the regular hexagonal pyramids 30 are arranged on the reference plane R so that each side of each base 31 is parallel to the closest side of the adjacent base 31, leaving the predetermined distanced therebetween. The hollow region 40 formed between the bases 31 on the reference plane R has a shape that can be covered with the plural congruent equilateral triangles 41 arranged with no gap or overlap. The side length of each equilateral triangle 41 is equal to the side length of each regular hexagon 32, which constitutes the base 31 of any regular hexagonal pyramid 30. The height of each equilateral triangle 41 is equal to the predetermined distance δ. Each of the three orientation directions of the reinforcing fibers F is parallel to any lateral edge 34 of each regular hexagonal pyramid 30 as seen in the Z direction.

According to this configuration, as described above, the apparent length to actual length ratios of the reinforcing fibers F are identical irrespective of which sections of each protrusion 1 the reinforcing fibers F pass through. This prevents irregularities of positions of the edges of the panel material PM and wrinkles in the surface E from forming at the process of forming the protrusions 1 in the surface E of the panel material PM including the reinforcing fibers F.

According to the aforementioned configuration, furthermore, the apparent length to actual length ratios of the reinforcing fibers F are identical across the reinforcing fibers F oriented in the three orientation directions. The apparent shrinkage rates of the reinforcing fibers F at the process of forming the texture pattern G, which includes the plural protrusions 1 in the surface E, are therefore isotropic. This ensures to prevent wrinkles in the surface E from forming.

<Modification>

Figure 50:
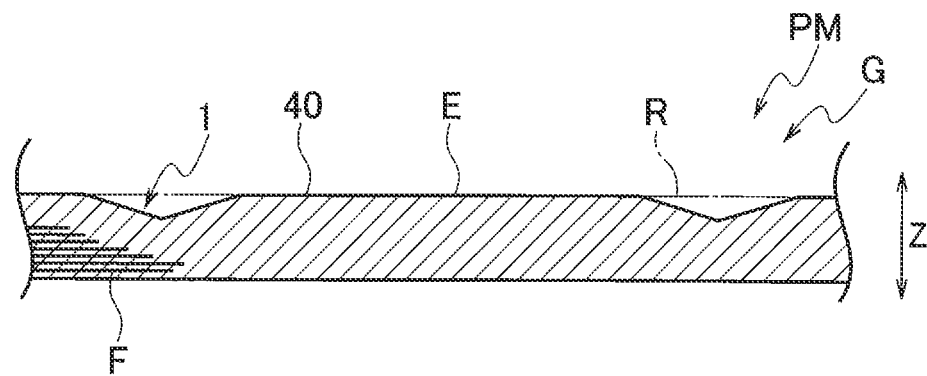
FIG. 50 is a cross-sectional view of a first modification of the 11th embodiment, corresponding to FIG. 48.
Figure 51:
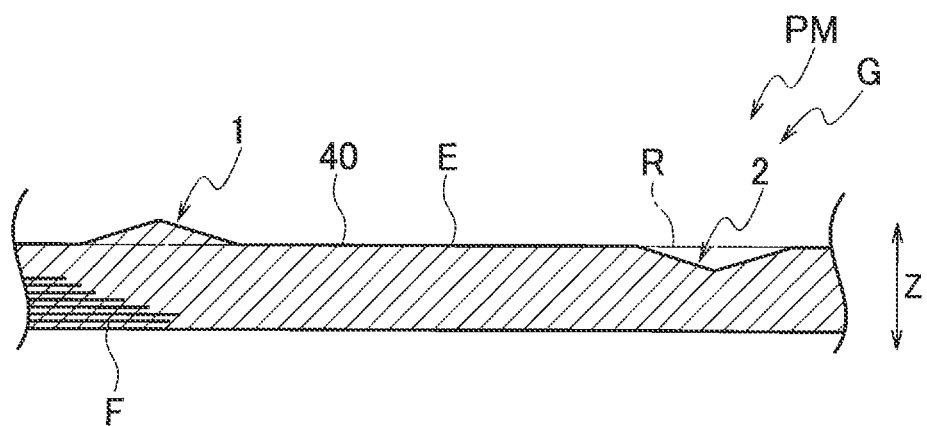
FIG. 51 is a cross-sectional view of a second modification of the 11th embodiment, corresponding to FIG. 48.

In the 11th embodiment, the plurality of protrusions 1, which protrude upward with respect to the reference plane R, are provided in the surface E. The panel material PM may be provided with a plurality of depressions 2, which are depressed downward with respect to the reference plane R, as illustrated in FIG. 50. This modification is referred to as a first modification. Alternatively, the panel material PM may be provided with both of the protrusions 1 and depressions 2 as illustrated in FIG. 51. This modification is referred to as a second modification.

The plural depressions 2 according to the first modification have the shapes of the congruent regular hexagonal pyramids 30 with the bases 31 on the reference plane R. The plural protrusions 1 and depressions 2 according to the second modification have the shapes of the congruent regular hexagonal pyramids 30 with the bases 31 on the reference plane R. The bases 31 of the regular hexagonal pyramids 30 are arranged on the reference plane R so that each side of each base 31 is parallel to the closest side of any adjacent base 31, leaving the predetermined distance δ therebetween. The hollow region 40 formed between the bases 31 on the reference plane R has a shape that can be covered with the plural congruent equilateral triangles 41 arranged with no gap or overlap. The side length of each equilateral triangle 41 is equal to the side length of each regular hexagon 32, which constitutes the base 31 of any regular hexagonal pyramid 30. The height of each equilateral triangle 41 is equal to the predetermined distance δ. Each of the three orientation directions of the reinforcing fibers F is parallel to any lateral edge 34 of each regular hexagonal pyramid 30 as seen in the Z direction. The regular hexagonal pyramid 30 of each depression 2 and the regular hexagonal pyramid 30 of each protrusion 1 have plane-symmetric shapes with respect to the reference plane R.

In the second modification, the positional relationship (the order of arrangement) between the protrusions 1 and depressions 2 is not limited. Irrespective of in which order the protrusions 1 and depressions 2 are arranged, the planar elements of each segment Sg include only symmetrical pairs, so that the symmetry of the planar elements in each segment Sg (see (I3) above) is maintained.

In the pattern element $PE_{26}$ illustrated in FIG. 49, for example, it is assumed that the regular hexagonal pyramid 30 including the lateral faces $S_{133}$, $S_{134}$, and $S_{135}$ is one of the depressions 2. In the rightmost segment Sg of the pattern element $PE_{26}$, for example, the lateral faces $S_{133}$ and $S_{136}$ have axisymmetric shapes with respect to the central axis A of the segment SE including the lateral faces $S_{133}$ and $S_{136}$ and constitute a symmetrical pair. In a similar manner, the lateral faces $S_{135}$ and $S_{132}$ have axisymmetric shapes with respect to the central axis A and constitute a symmetrical pair, and the lateral face $S_{134}$ and the lateral faces $S_{131}$ and $S_{137}$, which are considered as one lateral face, have axisymmetric shapes with respect to the central axis A and constitute a symmetrical pair. In such a manner, the planar elements of each segment Sg include only symmetrical pairs irrespective of which protrusions 1 in the 11th embodiment are replaced with the depressions 2.

The uniformity of the actual lengths of the reinforcing fibers F in each pattern element $PE_n$ (see (I4) above) is maintained irrespective of the order of arrangement of the protrusions 1 and depressions 2. The other configurations (see (I1), (I2), and (I5) to (I9) above) are the same as those of the 11th embodiment. The second modification therefore provides the same effects as the 11th embodiment.

As for the first modification, the description of the 11th embodiment is incorporated in the description of the first modification by replacing the protrusions 1 with the depressions 2. The first modification thus provides the same effects as the 11th embodiment.

In the 11th embodiment and the modifications thereof, the reinforcing fibers F are oriented in the three orientation directions parallel to the reference plane R, or in the X1, X2, and X3 directions. However, the reinforcing fibers F may be oriented in one or two of those three orientation directions.

12th Embodiment

A panel material PM according to a 12th embodiment is different from the panel material according to the 11th embodiment (including the modifications thereof) in width of the hollow region 40. Specifically, in the 11th embodiment, the side length of each of the regular triangles 41, which can cover the hollow region 40, is equal to that of one side of each regular hexagon 32 constituting the base 31 of any regular hexagonal pyramid 30. In the 12th embodiment, the side length of each regular triangle 41 is set equal to 1/n (n is an integer not less than 2) of the side length of each regular hexagon 32. In the 12th embodiment, hereinafter, different configurations as those of the 11th embodiment are described, and the configurations including the same functions as those of the configurations already described are given the same reference numerals and are not described.

(J2) Size of Pattern Element $PE_n$

The pattern elements $PE_n$ are identical in size across the three orientation directions (the X1, X2, and X3 directions). The length of each side x of each pattern element $PE_n$ of the 12th embodiment corresponds to $J_1$ times the side length of each regular hexagon 32, and the length of each side y corresponds to $J_2$ times the width of each regular hexagon 32 ($J_2 \times \sqrt{3}$ times the side length of each regular hexagon 32). Herein, $J_1$ and $J_2$ are expressed by the following formulae (1) and (2), respectively.

$$J_1 = 2(n+1) + 1/n \quad (1)$$

$$J_2 = 3(n+1) + 1/n \quad (2)$$

Figure 52:
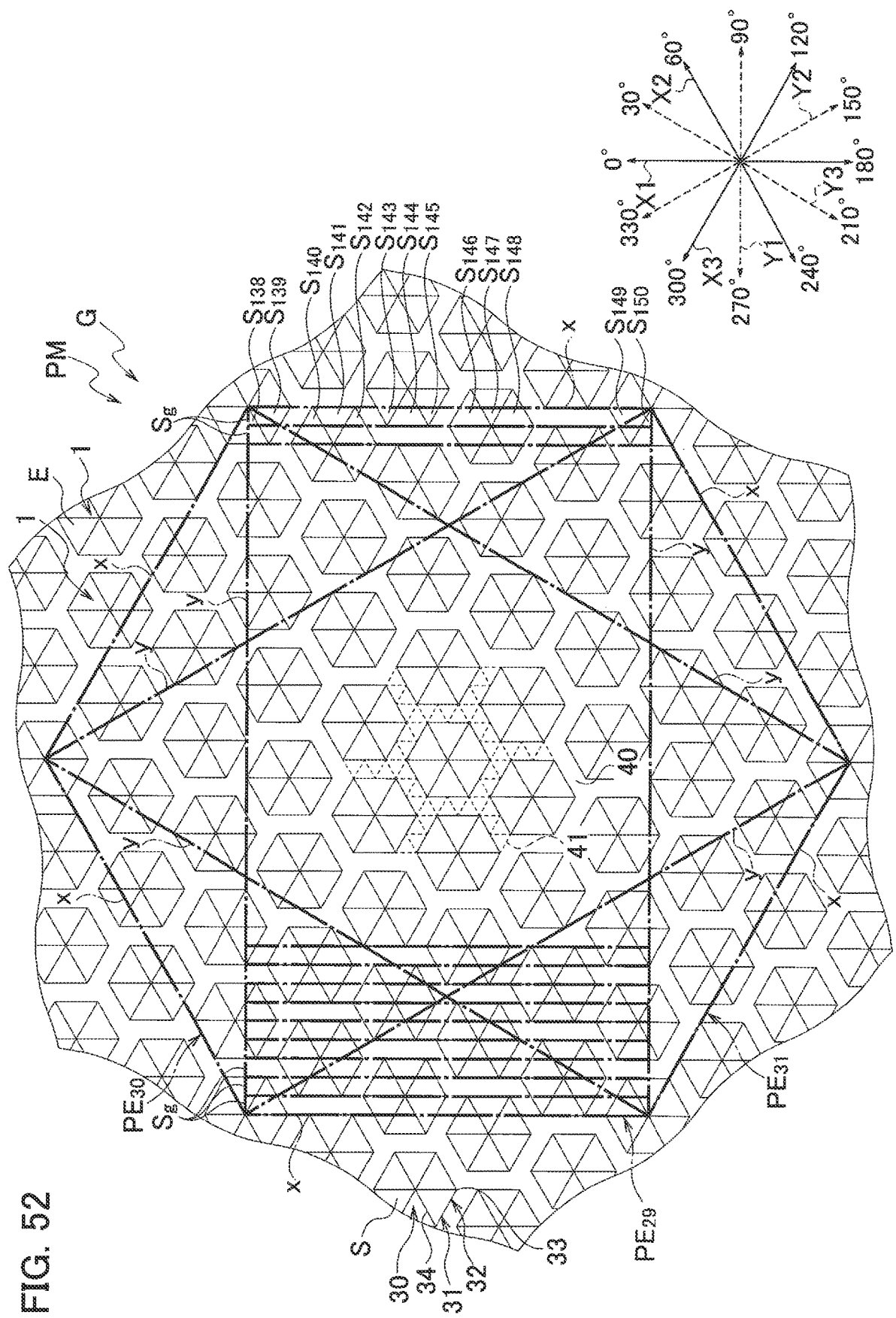
FIG. 52 is a view of main part of a texture pattern according to a 12th embodiment.

As for the sizes of the pattern elements $PE_{29}$ to $PE_{31}$, when n=2, for example, the length of each side x corresponds to 9.5 times the side length of each regular hexagon 32, and the length of each side y corresponds to 9.5 times the width of each regular hexagon 32 ($9.5\sqrt{3}$ times the side length of each regular hexagon 32), as illustrated in FIG. 52.

(J3) Symmetry of Planar Element in Each Segment Sg

The planar elements of each segment Sg include only symmetrical pairs also in the 12th embodiment. When n=2, for example, in the rightmost segment Sg of the pattern element $PE_{29}$, lateral faces $S_{138}$ and $S_{150}$, which are considered as one lateral face, and a lateral face $S_{147}$ have plane-symmetric shapes and constitute a symmetrical pair as illustrated in FIG. 52. In a similar manner, lateral faces $S_{139}$ and $S_{148}$, lateral face $S_{140}$ and $S_{143}$, lateral faces $S_{141}$ and $S_{144}$, lateral faces $S_{142}$ and $S_{145}$, and lateral faces $S_{146}$ and $S_{149}$ constitute symmetrical pairs.

(J7) Commonality of Actual Length of Reinforcing Fiber F across Pattern Elements $PE_n$ The reinforcing fibers F oriented in different orientation directions are identical in actual length, or the reinforcing fibers Fx in the pattern elements $PE_n$, are identical in actual length. Specifically, the actual length of each reinforcing fiber Fx is the sum of $J_3$ lateral edges 34 of the regular hexagons 32 hexagonal pyramids 30 and $J_4$ times the side length of each regular hexagon 32 constituting any base 31 in each pattern element PE, Herein, $J_3$ and $J_4$ are expressed by the following formulae (3) and (4).

$$J_3 = J_2 \quad (3)$$

$$J_4 = (n+3+1/n) \quad (4)$$

$$J_3 2n \quad (3)$$

$$J_4 = (n+3) + 1/n \quad (4)$$

When n=2, for example, as illustrated in FIG. 52, the actual length of each reinforcing fiber Fx in the pattern element $PE_{29}$ is the sum of four lateral edges 34 of the regular hexagonal pyramids 30 and 5.5 times the side length of each regular hexagon 32 constituting any base 31 as calculated from the length of part corresponding to one side x on the line of intersection of the surface E and any plane P in the pattern element $PE_{29}$. The same applies to the actual lengths of the reinforcing fibers Fx in the pattern elements $PE_{30}$ and $PE_{31}$.

The configurations relating to the shape of the pattern elements $PE_n$, the uniformity of the actual lengths of the reinforcing fibers F in each pattern element $PE_n$, the uniformity of the apparent lengths of the reinforcing fibers F in each pattern element $PE_n$, the uniformity of the apparent shrinkage rates for each pattern element $PE_n$, the commonality of the apparent lengths of the reinforcing fibers F across the pattern elements $PE_n$, and the isotropy of the apparent shrinkage rates of the reinforcing fibers F are the same as those described in (I1), (I4) to (I6), (I8), and (I9) of the 11th embodiment, and the description thereof is omitted. The operation effects of the 12th embodiment are the same as those of the 11th embodiment, and the description thereof is omitted.

Other Embodiments

As another embodiment, the texture pattern G according to one of the aforementioned embodiments and modifications thereof (hereinafter, referred to as the embodiments and the like) may be provided for both surfaces of the panel material PM. In particular, the texture pattern G is formed in the surface E on one side while the texture pattern G including the inverted profile therefrom in the surface E on the other side so that the protrusions 1 and depressions 2 are located at opposite positions in the both surfaces of the panel material PM. In this case, the panel material PM includes consistent thickness in the region where the texture pattern G is formed (thickness of the section sandwiched by the protrusions 1 and depressions 2 that are provided at the opposite positions). This prevents the matrix resin from flowing during the molding process, thereby further ensuring to prevent wrinkles in the surfaces E from forming.

As still another embodiment, two or more embodiments or the like selected from the aforementioned embodiments and the like may be combined. Specifically, the patterns G according to two or more selected from the first to third embodiments, the ninth to 12th embodiments, and the like may be provided side by side in the surface E of the panel material PM, for example. Furthermore, the patterns G according to two or more embodiments or the like selected from the fourth to eighth embodiments and the like may be provided side by side in the surface E of the panel material PM. These embodiments relating to such combinations provide the effects of the embodiments and the like corresponding to the combined elements.

In the aforementioned embodiments and the like, the heights of the protrusions I and the depths of the depressions 2, that is, the heights of the regular triangular pyramids 10, regular square pyramids 20, and regular hexagonal pyramids 30 are not limited and are properly selected according to the intended use and specifications of the panel material PM. The dimension of the same is at least greater than the thickness of resin film formed between the surface E and the reinforcing fibers F located closest to the surface of the panel material PM. The dimension of the protrusions 1 and depressions 2 may be greater than the thickness of the panel material PM itself.

Hereinabove, some of the embodiments are described. However, those embodiments are just illustrated by way of example for easy understanding of the invention. The technical scope of the invention includes not only the specific technical matters disclosed in the above-described embodiments and the modifications thereof but also various modifications, alternations, and technical substitutions easily achieved from the same.

INDUSTRIAL APPLICABILITY

The panel materials PM can be used as constituent members of vehicles (automobiles and the like), such as hoods, floor panels, door panels, bumpers, trunk lids, rear gates, fender panels, side body panels, and roof panels. Furthermore, the panel material PM can be used as constituent members of transportations, including aircrafts, ships, and railroad cars, home electric appliances, power generation facilities, production machinery, residential materials, furniture, and leisure goods.

REFERENCE SIGNS LIST

PM PANEL MATERIAL
F REINFORCING FIBER
E SURFACE
R VIRTUAL REFERENCE PLANE
G TEXTURE PATTERN
1 PROTRUSION
2 DEPRESSION
10 REGULAR TRIANGULAR PYRAMID
  11 BASE
  12 EQUILATERAL TRIANGLE
  13 VERTEX
  14 LATERAL EDGE
20 REGULAR SQUARE PYRAMID
  21 BASE
  22 SQUARE
  23 VERTEX
  24 LATERAL EDGE
  25 MIDPOINT
30 REGULAR HEXAGONAL PYRAMID
  31 BASE
  32 REGULAR HEXAGON
  33 VERTEX
  34 LATERAL EDGE
δ DISTANCE
40 HOLLOW REGION
  41 EQUILATERAL TRIANGLE
X1 TO X5 DIRECTIONS (ORIENTATION DIRECTIONS)
Z DIRECTION (THICKNESS DIRECTION)
rij LINE
w1 to w6 SECTION CORRESPONDING TO THE CORE OF TEXTURE PATTERN IN ORIENTATION DIRECTION, ON LINE OF INTERSECTION OF SURFACE AND PLANE THAT INCLUDES CORRESPONDING LINE AND IS PARALLEL TO THICKNESS DIRECTION

The invention claimed is:

1. An FRP panel material comprising reinforcing fibers at least near a surface, wherein
a plurality of either or both of protrusions and depressions are provided in the surface and form a repeating texture pattern, the protrusions protruding outward in a thickness direction of the panel material with respect to a virtual reference plane along the surface, the depressions being depressed inward in the thickness direction with respect to the virtual reference plane,
the protrusions and depressions have shapes of congruent regular triangular pyramids with bases thereof on the virtual reference plane,
the bases are arranged on the virtual reference plane with no gap or overlap so that each vertex of an equilateral triangle constituting each base is shared by six of the bases as vertices thereof,
the reinforcing fibers are oriented in not less than one and not more than three predetermined orientation directions parallel to the virtual reference plane as seen in the thickness direction,
each of the orientation directions is parallel to any lateral edge of each regular triangular pyramid as seen in the thickness direction, and
a fiber layer of the reinforcing fibers nearest to the surface is undulating following texture profile of the texture pattern.

2. An FRP panel material comprising reinforcing fibers at least near a surface, wherein
a plurality of either or both of protrusions and depressions are provided in the surface and form a repeating texture pattern, the protrusions protruding outward in a thickness direction of the panel material with respect to a virtual reference plane along the surface, the depressions being depressed inward in the thickness direction with respect to the virtual reference plane,
each of the protrusions and depressions has a shape of a regular triangular pyramid with a base thereof on the virtual reference plane,
the base is composed of one of a plurality of congruent equilateral triangles which are arranged on the virtual reference plane with no gap or overlap so that each vertex is shared by six of the equilateral triangles as vertices thereof,
the reinforcing fibers are oriented in not less than one and not more than three predetermined orientation directions parallel to the virtual reference plane as seen in the thickness direction,
each of the orientation directions is parallel to any lateral edge of each regular triangular pyramid as seen in the thickness direction,
ratios $L_2/L_1$ which are defined for respective lines each including a median of any equilateral triangle are identical across the lines,
where $L_1$ is a length of a section corresponding to the core of the texture pattern in each orientation direction, on the line of intersection of the surface and a plane which includes the corresponding one of the lines and is parallel to the thickness direction and $L_2$ is an apparent length of the section as seen in the thickness direction, and
a fiber layer of the reinforcing fibers nearest to the surface is undulating following texture profile of the texture pattern.

3. An FRP panel material comprising reinforcing fibers at least near a surface, wherein
a plurality of either or both of protrusions and depressions are provided in the surface and form a repeating texture pattern, the protrusions protruding outward in a thickness direction of the panel material with respect to a virtual reference plane along the surface, the depressions being depressed inward in the thickness direction with respect to the virtual reference plane,
the protrusions and depressions have shapes of congruent regular square pyramids with bases thereof on the virtual reference plane,
the bases are arranged on the virtual reference plane with no gap or overlap so that each vertex of a square constituting each base is shared by four of the bases as vertices thereof,
the reinforcing fibers are oriented in one or two predetermined orientation directions parallel to the virtual reference plane as seen in the thickness direction,
each of the orientation directions is parallel to any lateral edge of each regular square pyramid as seen in the thickness direction, and
a fiber layer of the reinforcing fibers nearest to the surface is undulating following texture profile of the texture pattern.

4. An FRP panel material comprising reinforcing fibers at least near a surface, wherein
- a plurality of either or both of protrusions and depressions are provided in the surface and form a repeating texture pattern, the protrusions protruding outward in a thickness direction of the panel material with respect to a virtual reference plane along the surface, the depressions being depressed inward in the thickness direction with respect to the virtual reference plane,
- each of the protrusions and depressions has a shape of a regular square pyramid with a base thereof on the virtual reference plane,
- the base is composed of one of a plurality of congruent squares which are arranged on the virtual reference plane with no gap or overlap so that each vertex is shared by four of the squares as vertices thereof,
- the reinforcing fibers are oriented in one or two predetermined orientation directions parallel to the virtual reference plane as seen in the thickness direction,
- each of the orientation directions is parallel to any lateral edge of each regular square pyramid as seen in the thickness direction,
- ratios $L_4/L_3$ which are defined for respective lines each including a diagonal of any square are identical across the lines,
- where $L_3$ is a length of a section corresponding to the core of the texture pattern in each orientation direction, on the line of intersection of the surface and a plane which includes the corresponding one of the lines and is parallel to the thickness direction and $L_4$ is an apparent length of the section as seen in the thickness direction, and
- a fiber layer of the reinforcing fibers nearest to the surface is undulating following texture profile of the texture pattern.

5. An FRP panel material comprising reinforcing fibers at least near a surface, wherein
- a plurality of either or both of protrusions and depressions are provided in the surface and form a repeating texture pattern, the protrusions protruding outward in a thickness direction of the panel material with respect to a virtual reference plane along the surface, the depressions being depressed inward in the thickness direction with respect to the virtual reference plane,
- the protrusions and depressions have shapes of congruent regular square pyramids with bases thereof on the virtual reference plane,
- the bases are arranged on the virtual reference plane with no gap or overlap so that each vertex of a square constituting each base is shared by two of the bases as vertices thereof and is located at the midpoint of one side of any one of the bases,
- the reinforcing fibers are oriented in one or two predetermined orientation directions parallel to the virtual reference plane as seen in the thickness direction,
- each of the orientation directions is parallel to any lateral edge of each regular square pyramid as seen in the thickness direction, and
- a fiber layer of the reinforcing fibers nearest to the surface is undulating following texture profile of the texture pattern.

6. An FRP panel material comprising reinforcing fibers at least near a surface, wherein
- a plurality of either or both of protrusions and depressions are provided in the surface and form a repeating texture pattern, the protrusions protruding outward in a thickness direction of the panel material with respect to a virtual reference plane along the surface, the depressions being depressed inward in the thickness direction with respect to the virtual reference plane,
- each of the protrusions and depressions has a shape of a regular square pyramid with a base thereof on the virtual reference plane,
- the base is composed of one of a plurality of congruent squares which are arranged on the virtual reference plane with no gap or overlap so that each vertex is shared by two of the squares as vertices thereof and is located at the midpoint of one side of any one of the bases,
- the reinforcing fibers are oriented in one or two predetermined orientation directions parallel to the virtual reference plane as seen in the thickness direction,
- each of the orientation directions is parallel to any lateral edge of each regular square pyramid as seen in the thickness direction,
- ratios $L_6/L_5$ which are defined for respective lines each including a diagonal of any square are identical across the lines,
- where $L_5$ is a length of a section corresponding to the core of the texture pattern in each orientation direction, on the line of intersection of the surface and a plane which includes the corresponding one of the lines and is parallel to the thickness direction and $L_6$ is an apparent length of the section as seen in the thickness direction, and
- a fiber layer of the reinforcing fibers nearest to the surface is undulating following texture profile of the texture pattern.

7. An FRP panel material comprising reinforcing fibers at least near a surface, wherein
- a plurality of either or both of protrusions and depressions are provided in the surface and form a repeating texture pattern, the protrusions protruding outward in a thickness direction of the panel material with respect to a virtual reference plane along the surface, the depressions being depressed inward in the thickness direction with respect to the virtual reference plane,
- the protrusions and depressions have shapes of congruent regular hexagonal pyramids with bases thereof on the virtual reference plane,
- the bases are arranged on the virtual reference plane with no gap or overlap so that each vertex of a regular hexagon constituting each base is shared by three of the bases as vertices thereof,
- the reinforcing fibers are oriented in not less than one and not more than three predetermined orientation directions parallel to the virtual reference plane as seen in the thickness direction,
- each of the orientation directions is parallel to any lateral edge of each regular hexagonal pyramid as seen in the thickness direction, and
- a fiber layer of the reinforcing fibers nearest to the surface is undulating following texture profile of the texture pattern.

8. An FRP panel material comprising reinforcing fibers at least near a surface, wherein
- a plurality of either or both of protrusions and depressions are provided in the surface and form a repeating texture pattern, the protrusions protruding outward in a thickness direction of the panel material with respect to a virtual reference plane along the surface, the depressions being depressed inward in the thickness direction with respect to the virtual reference plane, each of the protrusions and depressions has a shape of a regular hexagonal pyramid with a base thereof on the virtual reference plane, the base is composed of one of a plurality of congruent regular hexagons which are arranged on the virtual reference plane with no gap or overlap so that each vertex is shared by three of the regular hexagons as vertices thereof, the reinforcing fibers are oriented in not less than one and not more than three predetermined orientation directions parallel to the virtual reference plane as seen in the thickness direction, each of the orientation directions is parallel to any lateral edge of each regular hexagonal pyramid as seen in the thickness direction, ratios $L_8/L_7$ which are defined for respective lines each including a diagonal of any regular hexagon that passes through the center thereof are identical across the lines, where $L_7$ is a length of a section corresponding to the core of the texture pattern in each orientation direction, on the line of intersection of the surface and a plane which includes the corresponding one of the lines and is parallel to the thickness direction and $L_8$ is an apparent length of the section as seen in the thickness direction, and a fiber layer of the reinforcing fibers nearest to the surface is undulating following texture profile of the texture pattern.

9. An FRP panel material comprising reinforcing fibers at least near a surface, wherein a plurality of either or both of protrusions and depressions are provided in the surface and form a repeating texture pattern, the protrusions protruding outward in a thickness direction of the panel material with respect to a virtual reference plane along the surface, the depressions being depressed inward in the thickness direction with respect to the virtual reference plane, the protrusions and depressions have shapes of congruent regular hexagonal pyramids with bases thereof on the virtual reference plane, the bases are arranged on the virtual reference plane so that a side of each base is parallel to the closest side of one of the bases adjacent thereto, leaving a predetermined distance therebetween, a hollow region formed between the bases on the virtual reference plane has a shape that can be covered with a plurality of congruent equilateral triangles arranged with no gap or overlap, each of the plurality of equilateral triangles having a side length equal to 1/n (n is a natural number not less than 1) of the side length of a regular hexagon constituting each of the bases and a height equal to the predetermined distance, the reinforcing fibers are oriented in not less than one and not more than three predetermined orientation directions parallel to the virtual reference plane as seen in the thickness direction, each of the orientation directions is parallel to any lateral edge of each regular hexagonal pyramid as seen in the thickness direction, and a fiber layer of the reinforcing fibers nearest to the surface is undulating following texture profile of the texture pattern.

* * * * *